(12) United States Patent
Zhang et al.

(10) Patent No.: US 12,452,572 B2
(45) Date of Patent: Oct. 21, 2025

(54) EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 241 days.

(21) Appl. No.: 18/334,401

(22) Filed: Jun. 14, 2023

(65) Prior Publication Data
US 2024/0147108 A1 May 2, 2024

Related U.S. Application Data

(63) Continuation of application No. PCT/CN2023/083546, filed on Mar. 24, 2023.

(30) Foreign Application Priority Data

Oct. 28, 2022 (CN) .......................... 202211336918.4
Dec. 1, 2022 (CN) .......................... 202223239628.6
(Continued)

(51) Int. Cl.
*H04R 25/00* (2006.01)
*H04R 1/10* (2006.01)
(Continued)

(52) U.S. Cl.
CPC ........... *H04R 1/1008* (2013.01); *H04R 1/105* (2013.01); *H04R 1/1075* (2013.01);
(Continued)

(58) Field of Classification Search
CPC ...................................................... H04R 1/105
(Continued)

(56) References Cited

U.S. PATENT DOCUMENTS

2003/0235321 A1   12/2003   Lu
2007/0009133 A1   1/2007    Gerkinsmeyer
(Continued)

FOREIGN PATENT DOCUMENTS

CN    212909891 U    4/2021
CN    113573215 A    10/2021
(Continued)

OTHER PUBLICATIONS

Notice of Allowance in Japanese Application No. 2024-550246 mailed on Sep. 2, 2025, 5 pages.
(Continued)

*Primary Examiner* — Phylesha Dabney
(74) *Attorney, Agent, or Firm* — METIS IP LLC

(57) ABSTRACT

The present disclosure provides an earphone comprising a sound production component and a suspension structure. The sound production component includes a diaphragm and a housing. In a wearing state, the suspension structure is used to place the sound production component at a position near but not blocking an ear canal, wherein an inner side surface of the housing facing an auricle is provided with a sound outlet, at least another side surface of the housing is provided with a first pressure relief hole, and a distance between a center of the sound outlet and a midpoint of an upper boundary of the inner side surface is greater than a distance between a center of the first pressure relief hole and the midpoint of the upper boundary of the inner side surface.

20 Claims, 19 Drawing Sheets

| (30) | Foreign Application Priority Data | | |
|---|---|---|---|
| Dec. 30, 2022 | (WO) | ................ | PCT/CN2022/144339 |
| Mar. 2, 2023 | (WO) | ................ | PCT/CN2023/079404 |
| Mar. 2, 2023 | (WO) | ................ | PCT/CN2023/079410 |
| Mar. 2, 2023 | (WO) | ................ | PCT/CN2023/079411 |

(51) Int. Cl.
*H04R 1/28* (2006.01)
*H04R 9/02* (2006.01)
*H04R 9/06* (2006.01)

(52) U.S. Cl.
CPC ........... *H04R 1/2811* (2013.01); *H04R 9/025* (2013.01); *H04R 9/06* (2013.01); *H04R 2460/11* (2013.01)

(58) Field of Classification Search
USPC ........................................................ 381/381
See application file for complete search history.

(56) References Cited

U.S. PATENT DOCUMENTS

| 2013/0188803 | A1* | 7/2013 | Shaanan | ................. | H04R 1/10 381/74 |
|---|---|---|---|---|---|
| 2017/0289667 | A1 | 10/2017 | Okita | | |
| 2018/0054670 | A1 | 2/2018 | Struzik et al. | | |
| 2020/0196062 | A1 | 6/2020 | Zhang | | |
| 2021/0067857 | A1 | 3/2021 | Struzik | | |
| 2021/0392430 | A1 | 12/2021 | Peeters | | |
| 2022/0095029 | A1 | 3/2022 | Zheng et al. | | |
| 2022/0312108 | A1 | 9/2022 | Zhang et al. | | |
| 2023/0082738 | A1 | 3/2023 | Zheng et al. | | |
| 2023/0130211 | A1 | 4/2023 | Li et al. | | |
| 2023/0179907 | A1 | 6/2023 | Zhang et al. | | |
| 2024/0107219 | A1 | 3/2024 | He | | |

FOREIGN PATENT DOCUMENTS

| CN | 113905304 A | 1/2022 |
|---|---|---|
| CN | 114286228 A | 4/2022 |
| CN | 114286237 A | 4/2022 |
| CN | 216357224 U | 4/2022 |
| CN | 115175069 A | 10/2022 |
| CN | 115209267 A | 10/2022 |
| CN | 115209268 A | 10/2022 |
| CN | 115209285 A | 10/2022 |
| JP | 2001326986 A | 11/2001 |

OTHER PUBLICATIONS

Notice of Preliminary Rejection in Korean Application No. 10-2024-7027447 mailed on Aug. 13, 2025, 10 pages.

The Extended European Search Report in European Application No. 23881092.3 mailed on Jun. 30, 2025, 9 pages.

* cited by examiner

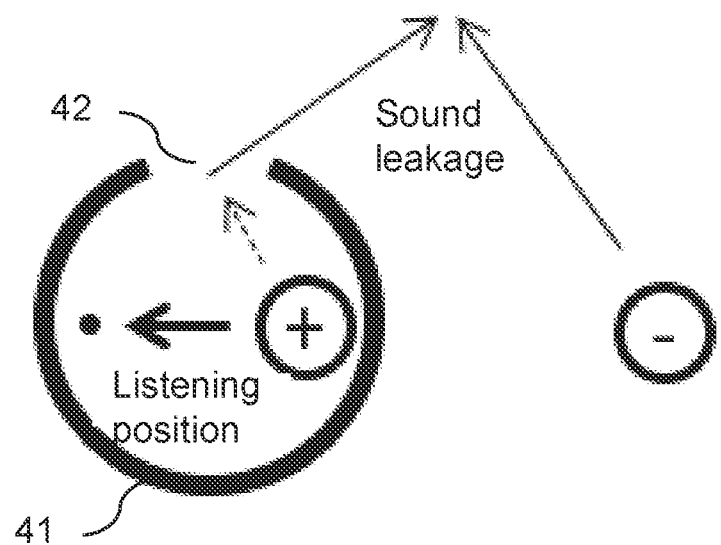
FIG. 10
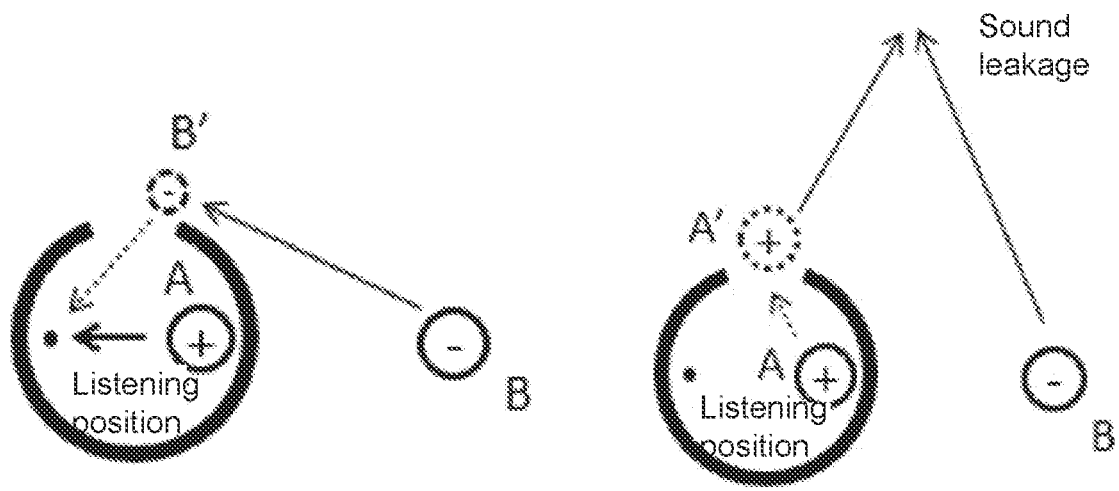
FIG. 11A
FIG. 11B

EARPHONES

CROSS-REFERENCE TO RELATED APPLICATIONS

This application is a continuation of International Patent Application No. PCT/CN2023/083546, filed on Mar. 24, 2023, which claims priority of Chinese Patent Application No. 202211336918.4, filed on Oct. 28, 2022, Chinese Patent Application No. 202223239628.6, filed on Dec. 1, 2022, International Application No. PCT/CN2022/144339, filed on Dec. 30, 2022, International Application No. PCT/CN2023/079411, filed on Mar. 2, 2023, International Application No. PCT/CN2023/079404, filed on Mar. 2, 2023, and International Application No. PCT/CN2023/079410, filed on Mar. 2, 2023, the entire contents of each of which are hereby incorporated by reference.

TECHNICAL FIELD

The present disclosure relates to the field of acoustic technology, and in particular to an earphone.

BACKGROUND

With the development of acoustic output technology, acoustic devices (e.g., headphones) have been widely used in people's daily lives, and can be used in conjunction with electronic devices such as cell phones and computers to provide users with an auditory feast. According to the users' wearing manner, acoustic devices can generally be classified into in-ear earphones, headphones, and ear-mounted earphones.

Therefore, it is necessary to provide an earphone that can improve the user's wearing comfort and has a better output performance.

SUMMARY

Embodiments of the present disclosure provide an earphone, comprising a sound production component including: a transducer including a diaphragm used to produce a sound under an action of an excitation signal; and a housing, the housing forming a cavity used to accommodate the transducer; and a suspension structure, wherein in a wearing state, the suspension structure is used to place the sound production component at a position near but not blocking an ear canal, wherein an inner side surface of the housing facing an auricle is provided with a sound outlet that is configured to transmit a sound generated at a front side of the diaphragm to the ear canal, at least another side surface of the housing is provided with a first pressure relief hole that is configured to guide a sound generated at a rear side of the diaphragm out of the housing, and a distance between a center of the sound outlet and a midpoint of an upper boundary of the inner side surface is greater than a distance between a center of the first pressure relief hole and the midpoint of the upper boundary of the inner side surface.

In some embodiments, a ratio of the distance between the center of the sound outlet and the midpoint of the upper boundary of the inner side surface to the distance between the center of the first pressure relief hole and the midpoint of the upper boundary of the inner side surface is in a range of 1.3 to 2.1.

In some embodiments, a ratio of a ratio of an area of the sound outlet to a depth of the sound outlet to a ratio of an area of the first pressure relief hole to a depth of the first pressure relief hole is in a range of 1.10 to 1.75.

In some embodiments, a ratio of an area of the sound outlet to an area of the first pressure relief hole is in a range of 0.5 to 1.5.

In some embodiments, in the wearing state, a ratio of a distance between a projection point of the center of the sound outlet on a sagittal plane and a centroid of a projection of an ear canal opening of the ear canal on the sagittal plane to a distance between a projection point of the center of the first pressure relief hole on the sagittal plane and the centroid of the projection of the ear canal opening on the sagittal plane is in a range of 0.10-0.35.

In some embodiments, the suspension structure includes an ear hook, in the wearing state, a first portion of the ear hook is hung between an ear and a head of a user, a second portion of the ear hook extends towards a side of the auricle away from the head and connects to the sound production component, and a ratio of a distance between the center of the sound outlet and an upper vertex of the ear hook to a distance between the center of the first pressure relief hole and the upper vertex of the ear hook is in a range of 1.10 to 1.70.

In some embodiments, the transducer further includes a magnetic circuit assembly, the magnetic circuit assembly is used to provide a magnetic field, and an absolute value of a difference between a distance between the center of the sound outlet and a long-axis center plane of the magnetic circuit assembly and a distance between the center of the first pressure relief hole and the long-axis center plane is in a range of 4.0 mm to 6.1 mm.

In some embodiments, a difference between a distance between the center of the sound outlet and a bottom surface of the magnetic circuit assembly and a distance between the center of the first pressure relief hole and the bottom surface of the magnetic circuit assembly is in a range of 3.65 mm to 7.05 mm.

In some embodiments, the at least another side surface of the housing is further provided with a second pressure relief hole, and an area of the first pressure relief hole is larger than an area of the second pressure relief hole.

In some embodiments, a distance from the center of the sound outlet to a perpendicular bisection-plane of a line segment connecting the center of the first pressure relief hole and a center of the second pressure relief hole is in a range of 0 mm-2 mm.

In some embodiments, the first pressure relief hole is provided on an upper side surface of the housing and the second pressure relief hole is provided on a lower side surface of the housing.

In some embodiments, in the wearing state, a ratio of a distance between a projection point of the center of the sound outlet on a sagittal plane and a projection point of a ⅓ point of an lower boundary of the inner side surface on the sagittal plane to a distance between a projection point of the center of the second pressure relief hole on the sagittal plane and the projection point of the ⅓ point of the lower boundary of the inner side surface on the sagittal plane is in a range of 0.65-1.05.

In some embodiments, an angle between a line connecting the center of the sound outlet to the center of the first pressure relief hole and a line connecting the center of the sound outlet to the center of the second pressure relief hole is in a range of 46.40° to 114.04°.

In some embodiments, a ratio of a distance between the center of the sound outlet and the center of the first pressure relief hole to a distance between the center of the sound outlet and the center of the second pressure relief hole is in a range of 0.9 to 1.1.

In some embodiments, a ratio of the area of the sound outlet to a total area of the first pressure relief hole and the second pressure relief hole is in a range of 0.1 to 0.99.

In some embodiments, the diaphragm divides the cavity into a front cavity and a rear cavity corresponding to the front side and the rear side of the diaphragm, respectively, wherein a ratio of a volume of the rear cavity to a volume of the front cavity is in a range of 0.1 to 10.

In some embodiments, the diaphragm divides the cavity into a front cavity and a rear cavity corresponding to the front side and the rear side of the diaphragm, respectively, wherein a ratio of a resonance frequency of the front cavity to a resonance frequency of the rear cavity is in a range of 0.1 to 5.

In some embodiments, a ratio of the area of the sound outlet to a total area of the first pressure relief hole and the second pressure relief hole is in a range of 1 to 10.

In some embodiments, the diaphragm divides the cavity into a front cavity and a rear cavity corresponding to the front side and the rear side of the diaphragm, respectively, wherein a ratio of a volume of the rear cavity to a volume of the front cavity is in a range of 0.1 to 10.

In some embodiments, the diaphragm divides the cavity into a front cavity and a rear cavity corresponding to the front side and the rear side of the diaphragm, respectively, wherein a ratio of a resonance frequency of the front cavity to a resonance frequency of the rear cavity is in a range of 0.5 to 10.

In some embodiments, a ratio of a sound pressure at the sound outlet to a total sound pressure at the first pressure relief hole and at the second pressure relief hole is in a range of 0.4 to 0.6.

In some embodiments, a ratio of a difference between the area of the first pressure relief hole and the area of the second pressure relief hole to the area of the sound outlet is in a range of 2.5 to 3.9.

In some embodiments, an acoustic resistance net is provided at a position of at least one of the sound outlet, the first pressure relief hole, and the second pressure relief hole, and a thickness of the acoustic resistance net is in a range of 40 μm to 150 μm.

In some embodiments, the acoustic resistance net at the sound outlet includes a steel mesh, and a mesh number of the steel mesh is in a range of 60-100.

In some embodiments, the acoustic resistance net at the sound outlet includes a steel mesh, and a mesh number of the steel mesh is in a range of 70-90.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein:

FIG. 10 is a distribution schematic diagram of a cavity structure arranged around one sound source of a dipole sound source according to some embodiments of the present disclosure;

FIG. 11A is a schematic diagram illustrating a listening principle of a dipole sound source structure and a cavity structure constructed around one sound source of the dipole sound source according to some embodiments of the present disclosure;

FIG. 11B is a schematic diagram illustrating a sound leakage principle of a dipole sound source structure and a cavity structure constructed around one sound source of the dipole sound source according to some embodiments of the present disclosure;

DETAILED DESCRIPTION

Figure 1:
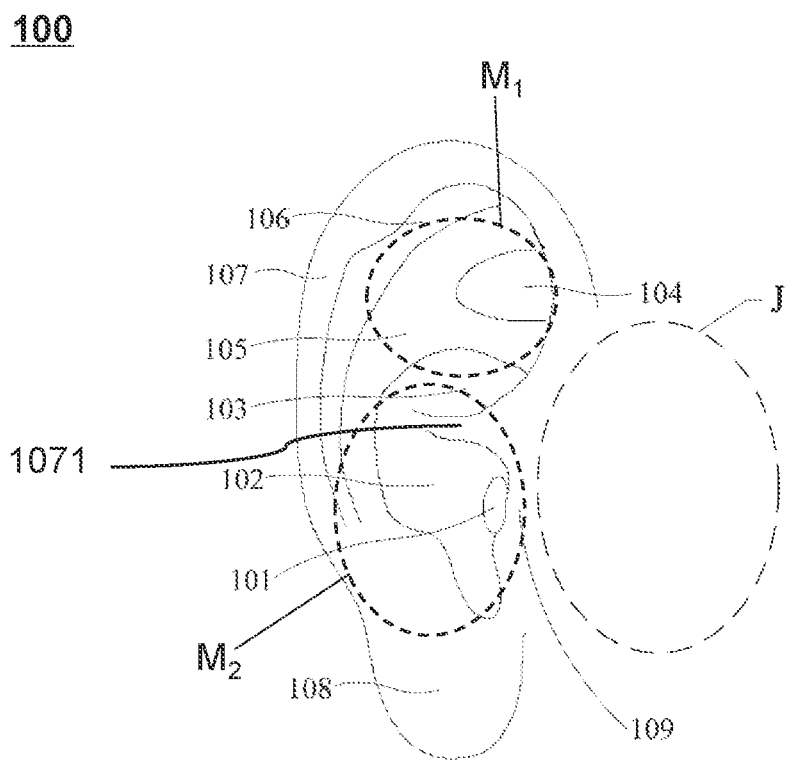
FIG. 1 is a schematic diagram illustrating an exemplary ear according to some embodiments of the present disclosure.

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system," "device," "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a," "one," and/or "the" is not specifically singular, and the plural may be included. It will be further understood that the terms "comprise," "comprises," and/or "comprising," "include," "includes," and/or "including," when used in the present disclosure, specify the presence of stated features, integers, steps, operations, elements, and/or components, but do not preclude the presence or addition of one or more other features, integers, steps, operations, elements, components, and/or groups thereof.

In the description of the present disclosure, it should be understood that the terms "first," "second," "third," and "fourth" are used for descriptive purposes only and are not to be understood as indicating or implying relative importance or implicitly specifying the number of technical features indicated. Thus, the features qualified with "first," "second," "third," and "fourth" may expressly or implicitly include at least one such feature. In the description of the present disclosure, "multiple" means at least two, such as two, three, etc., unless otherwise expressly and specifically limited.

In the present disclosure, unless otherwise expressly specified and limited, the terms "connection," "fixed," etc. shall be understood in a broad sense. For example, the term "connection" may refer to a fixed connection, a detachable connection, or an integral part; a mechanical connection, or an electrical connection; a direct connection, or an indirect connection through an intermediate medium; a connection within two components or an interaction between two components, unless otherwise expressly limited. For those skilled in the art, the specific meaning of the above terms in the present disclosure can be understood on a case-by-case basis.

In the present disclosure, unless otherwise expressly specified and limited, a distance between a particular point and a line or plane may refer to a shortest distance between the particular point and the line or plane.

FIG. 1 is a schematic diagram illustrating an exemplary ear according to some embodiments of the present disclosure. Referring to FIG. 1, the ear 100 (which may also be referred to as an auricle) may include an external ear canal 101, an inferior concha 102, a concha boat 103, a triangular fossa 104, an antihelix 105, a scapha 106, a helix 107, an earlobe 108, a tragus 109, and a helix foot 1071. In some embodiments, one or more parts of the ear 100 may be used to support an acoustic device to achieve stable wearing of the acoustic device. In some embodiments, parts of the ear 100 such as the external ear canal 101, the inferior concha 102, the concha boat 103, the triangular fossa 104, etc., have a certain depth and volume in the three-dimensional space, which may be used to achieve the wearing requirements of the acoustic device. For example, the acoustic device (e.g., an in-ear earphone) may be worn in the external ear canal 101. In some embodiments, the wearing of the acoustic device may be achieved with the aid of other parts of the ear 100 other than the external ear canal 101. For example, the wearing of the acoustic device may be achieved with the aid of the concha boat 103, the triangular fossa 104, the antihelix 105, the scapha 106, the helix 107, or a combination thereof. In some embodiments, the earlobe 108 and other parts of the users ear may also be used to improve the comfort and reliability of the acoustic device in wearing. By utilizing parts of the ear 100 other than the external ear canal 101 for the wearing of the acoustic device and the transmission of sound, the external ear canal 101 of the user may be "liberated." When the user wears the acoustic device, the acoustic device does not block the external ear canal 101 (or the ear canal or ear canal opening) of the user, and the user may receive both sounds from the acoustic device and sound from the environment (e.g., horn sounds, car bells, surrounding voices, traffic commands, etc.), thereby reducing the probability of traffic accidents. In the present disclosure, an acoustic device that, when worn by the user, does not block the external ear canal 101 (or the ear canal or ear canal opening) of the user may be referred to as an earphone. In some embodiments, the acoustic device may be designed to adapt to the ear 100 according to the configuration of the ear 100 to enable a sound production component of the acoustic device to be worn at various positions of the ear. For example, when the acoustic device is an earphone, the earphone may include a suspension structure (e.g., an ear hook) and a sound production component. The sound production component is physically connected to the suspension structure, which may be adapted to the shape of the ear to place the whole or part of the structure of the sound production component at a front side of the tragus 109 (e.g., the region J enclosed by the dotted line in FIG. 1). As another example, the whole or part of the structure of the sound production component may be in contact with an upper portion of the external ear canal 101 (e.g., where one or more parts such as the concha boat 103, the triangular fossa 104, the antihelix 105, the scapha 106, the helix 107, the helix foot 1071, etc., are located) while the user is wearing the earphone. As another example, when the user wears the earphone, the whole or part of the structure of the sound production component may be located within a cavity formed by one or more parts of the ear 100 (e.g., the inferior concha 102, the concha boat 103, the triangular fossa 104, etc.) (e.g., the region M1 enclosed by the dotted line in FIG. 1 containing at least the concha boat 103, the triangular fossa 104 and the region M2 containing at least the inferior concha 102).

Different users may have individual differences, resulting in different shapes, dimensions, etc., of ears. For ease of description and understanding, if not otherwise specified, the present disclosure primarily uses a "standard" shape and dimension ear model as a reference and further describes the wearing manners of the acoustic device in different embodiments on the ear model. For example, a simulator (e.g., GRAS 45BC KEMAR) containing a head and (left and right) ears produced based on standards of ANSI: S3.36, S3.25 and IEC: 60318-7, may be used as a reference for wearing the acoustic device to present a scenario in which most users wear the acoustic device normally. Merely by way of example, the reference ear may have the following relevant features: a projection of an auricle on a sagittal plane in a vertical axis direction may be in a range of 49.5 mm-74.3 mm, and a projection of the auricle on the sagittal plane in a sagittal axis direction may be in a range of 36.6 mm-55 mm. Thus, in the present disclosure, the descriptions such as "worn by the user," "in the wearing state," and "in the wearing state" may refer to the acoustic device described in the present disclosure being worn on the ear of the aforementioned simulator. Of course, considering the individual differences of different users, structures, shapes, dimensions, thicknesses, etc., of one or more parts of the ear 100 may be somewhat different. In order to meet the needs of different users, the acoustic device may be designed differently, and these differential designs may be manifested as feature parameters of one or more parts of the acoustic device (e.g., a sound production component, an ear hook, etc., in the following descriptions) may have different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the "front side of the ear" as described in the present disclosure is a concept relative to the "rear side of the ear," where the former refers to a side of the ear away from the head and the latter refers to a side of the ear facing the head. In this case, observing the ear of the above simulator in a direction along the coronal axis of the human body, a schematic diagram illustrating the front side of the ear as shown in FIG. 1 is obtained.

Figure 2:
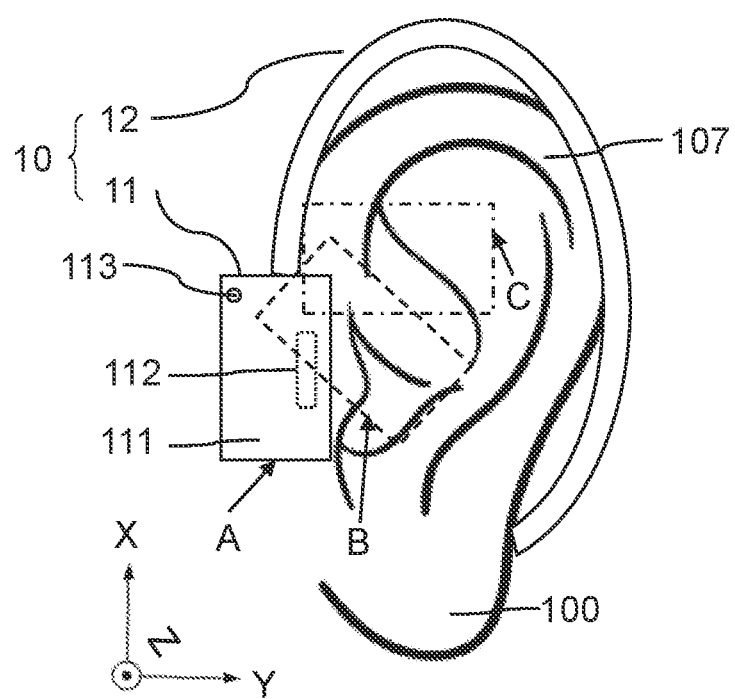
FIG. 2 is a structural diagram illustrating an exemplary earphone according to some embodiments of the present disclosure.

FIG. 2 is a structural diagram illustrating an exemplary earphone according to some embodiments of the present disclosure.

In some embodiments, the earphone 10 may include, but is not limited to, an air conduction earphone, a bone air conduction earphone, etc. In some embodiments, the open earphone 10 may be combined with products such as glasses, a headset, a head-mounted display device, an ARNR headset, etc.

As shown in FIG. 2, the earphone 10 may include a sound production component 11 and an ear hook 12.

Figure 7:
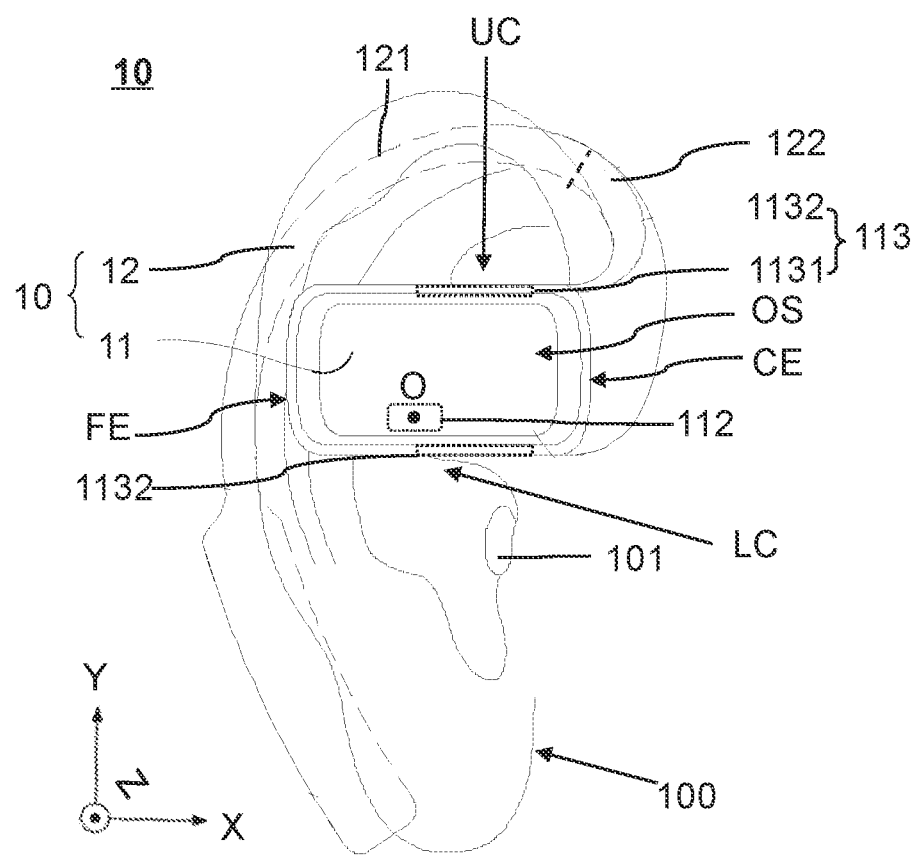
FIG. 7 is a schematic diagram illustrating an exemplary wearing state of an open earphone according to some embodiments of the present disclosure.
Figure 14:
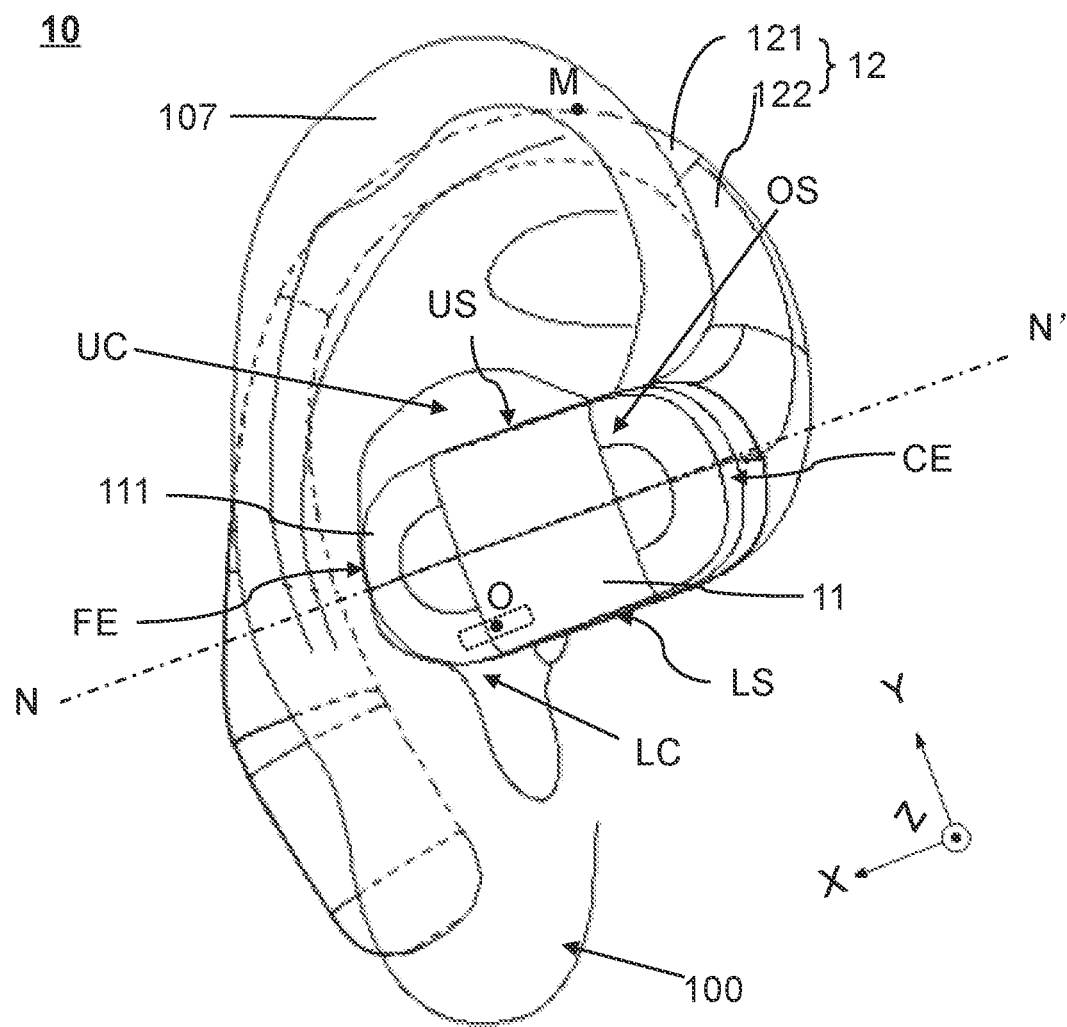
FIG. 14 is a schematic diagram illustrating an exemplary wearing state of an open earphone according to some embodiments of the present disclosure.

The sound production component 11 may be worn on the users body, and the sound production component 11 may generate sound which is input into the ear canal of the user. In some embodiments, the sound production component 11 may include a transducer (e.g., a transducer 116 shown in FIG. 22) and a housing 111 configured to accommodate the transducer. The housing 111 may be connected to the ear hook 12. The transducer is used to convert an excitation signal (e.g., an electrical signal) into a corresponding mechanical vibration to produce sound. In some embodiments, a sound outlet 112 is provided on a side of the housing toward the ear, and the sound outlet 112 is used to transmit the sound generated by the transducer out of the housing 111 and into the ear canal so that the user can hear the sound. In some embodiments, the transducer (e.g., a diaphragm) may divide the housing 111 to form a front cavity (e.g., a front cavity 114 shown in FIG. 22) and a rear cavity of the earphone, and the sound outlet 112 may communicate with the front cavity and transmit the sound generated by the front cavity out of the housing 111 and into the ear canal. In some embodiments, a portion of the sound exported through the sound outlet 112 may be transmitted to the ear canal thereby allowing the user to hear the sound, and another portion thereof may be transmitted with the sound reflected by the ear canal through a gap between the sound production component 11 and the ear (e.g., a portion of the inferior concha not covered by the sound production component 11) to the outside of the earphone 10 and the ear, thereby creating a first leakage sound in the far-field. At the same time, one or more pressure relief holes 113 (e.g., a first pressure relief hole 1131) are generally provided on other sides of the housing 111 (e.g., a side away from or back from the users ear canal). The pressure relief holes 113 are further away from the ear canal than the sound outlet 112, and the sound transmitted by the pressure relief holes 113 generally forms a second leakage sound in the far-field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other so that the aforementioned first leakage sound and the aforementioned second leakage sound can cancel each other out in the far-field, which is conducive to reducing the leakage of the earphone 10 in the far-field. In some embodiments, at least two pressure relief holes 113 may be provided on the side surfaces of the housing 111 except for the side surface of the housing 111 toward the auricle. By setting at least two pressure relief holes 113, not only can the sound generated by the rear cavity be exported to the housing 111, but also a high-pressure region of the sound field in the rear cavity can be destroyed, so as to make a wavelength of a standing wave in the rear cavity shorter, and thus making a resonance frequency of the sound exported from the pressure relief holes 113 to the outside of the housing 111 as high as possible, such as greater than 4 kHz. At this time, the sound exported by the sound outlet 112 and the sound exported by the pressure relief holes 113 can maintain good consistency in a wider frequency range, and thus an effect of interference cancellation of the two in the far field is a better, thereby obtaining a better sound leakage reduction effect. For the sake of description, the present disclosure is illustrated exemplarily with two pressure relief holes provided on the sound production component 11. Merely by way of example, at least two pressure relief holes 113 may include a first pressure relief hole and a second pressure relief hole (e.g., a first pressure relief hole 1131 and a second pressure relief hole 1132 as shown in FIG. 7 or FIG. 14). The two pressure relief holes 113 may be located on opposite side surfaces of the housing 111 (for example, opposite each other in the short-axis direction Y as described below), so as to destroy the high-pressure region of the sound field in the rear cavity to the greatest extent. In short, when the user wears the earphone 10, he/she mainly hears the sound transmitted to the ear canal via the sound outlet 112, and the pressure relief holes 113 are provided mainly to balance the pressure in the rear cavity, so that the vibration can be fully achieved at low frequency and large amplitude, which makes the sound have sound quality such as bass dive and treble penetration as much as possible, and reduces the leakage of sound into the environment through the sound outlet 112. For more information about the sound production component 11, please refer to other places of the present disclosure, such as FIG. 7, FIG. 14, FIG. 22, etc., and their descriptions.

One end of the ear hook 12 may be connected to the sound production component 11 and the other end of the ear hook 12 extends along a junction between the users ear and head. In some embodiments, the ear hook 12 may be an arc-shaped structure that is adapted to the users auricle, so that the ear hook 12 can be hung on the user's auricle. For example, the ear hook 12 may have an arc-shaped structure adapted to the junction of the user's head and ear, so that the ear hook 12 can be hung between the user's ear and head. In some embodiments, the ear hook 12 may also be a clamping structure adapted to the user's auricle, so that the ear hook 12 can be clamped at the users auricle. Exemplarily, the ear hook 12 may include a hook portion (e.g., the first portion 121 shown in FIG. 7) and a connection portion (e.g., the second portion 122 shown in FIG. 7) that are connected in sequence. The connection portion connects the hook portion to the sound production component 11 so that the earphone 10 is curved in the three-dimensional space when it is in a non-wearing state (i.e., in a natural state). In other words, in the three-dimensional space, the hook portion, the connection portion, and the sound production component 11 are not co-planar. In such cases, when the earphone 10 is in the wearing state, the hook portion may be primarily for hanging between a rear side of the user's ear and the head, and the sound production component 11 may be primarily for contacting a front side of the users ear, thereby allowing the sound production component 11 and the hook portion to cooperate to clamp the ear. Exemplarily, the connection portion may extend from the head toward an outside of the head and cooperate with the hook portion to provide a compression force on the front side of the ear for the sound production component 11. The sound production component 11 may specifically be pressed against an area where a part such as the inferior concha 102, the concha boat 103, the triangular fossa 104, the antihelix 105, etc., is located under the compression force so that the outer ear canal 101 of the ear is not obscured when the earphone 10 is in the wearing state.

In some embodiments, in order to improve the stability of the earphone 10 in the wearing state, the earphone 10 may be provided in any one of the following ways or a combination thereof. First, at least a portion of the ear hook 12 is provided as a mimic structure that fits against at least one of the rear side of the ear 100 and the head to increase a contact area of the ear hook 12 with the ear 100 and/or the head, thereby increasing the resistance of the earphone 10 to fall off from the ear 100. Second, at least a portion of the ear hook 12 is provided with an elastic structure so that it has a certain degree of deformation in the wearing state to increase a positive pressure of the ear hook 12 on the ear and/or the head, thereby increasing the resistance of the earphone 10 to fail off from the ear. Third, the ear hook 12 is at least partially set to lean against the head in the wearing state, so that it forms a reaction force to press the ear to enable the sound production component 11 to be pressed on the front side of the ear, thereby increasing the resistance of the earphone 10 to fall off from the ear. Fourth, the sound production component 11 and the ear hook 12 are set to clamp a region where the helix is located, a region where the inferior concha is located, etc., from the front and rear sides of the ear in the wearing state, so as to increase the resistance of the earphone 10 to fall off from the ear. Fifth, the sound production component 11 or an auxiliary structure connected thereto is set to extend at least partially into cavities such as the inferior concha, the concha boat, the triangular fossa, and the scapha, so as to increase the resistance of the earphone 10 to falling off from the ear.

In some embodiments, the ear hook 12 may include, but is not limited to, an ear hook, an elastic band, etc., allowing the earphone 10 to be better fixed to the user and prevent the user from dropping it during use. In some embodiments, the earphone 10 may not include the ear hook 12, and the sound production component 11 may be placed in the vicinity of the user's ear 100 using a hanging or clamping manner.

In some embodiments, the sound production component 11 may be, for example, circular, elliptical, runway-shaped, polygonal, U-shaped, V-shaped, semi-circular, or other regular or irregular shapes so that the sound production component 11 may be hung directly at the user's ear 100. In some embodiments, the sound production component 11 may have a long-axis direction X and a short-axis direction Y that are perpendicular to the thickness direction Z and orthogonal to each other. The long-axis direction X may be defined as a direction having the largest extension dimension in a shape of a two-dimensional projection plane (e.g., a projection of the sound production component 11 in a plane on which its outer side surface is located, or a projection on a sagittal plane) of the sound production component 11. For example, when the projection shape is rectangular or approximately rectangular, the long-axis direction is a length direction of the rectangle or approximately rectangle. The short-axis direction Y may be defined as a direction perpendicular to the long-axis direction X in the shape of the projection of the sound production component 11 on the sagittal plane. For example, when the projection shape is rectangular or approximately rectangular, the short-axis direction is a width direction of the rectangle or approximately rectangle. The thickness direction Z may be defined as a direction perpendicular to the two-dimensional projection plane, for example, in the same direction as a coronal axis, both pointing to the left-and-right side of the body.

In some embodiments, when the user wears the earphone 10, the sound production component 11 may be placed at a position near but not blocking the external ear canal 101 of the user. In some embodiments, the projection of the earphone 10 on the sagittal plane may not cover the users ear canal while in the wearing state. For example, the projection of the sound production component 11 on the sagittal plane may fall on the left and right sides of the head and be located at the front side of the helix foot in the sagittal axis of the body (e.g., at the position shown in dashed box A in FIG. 2). In this case, the sound production component 11 is located at the front side of the helix foot of the user, the long-axis of the sound production component 11 may be in a vertical or approximately vertical position, the projection of the short-axis direction Y on the sagittal plane is in the same direction as the sagittal axis, the projection of the long-axis direction X on the sagittal plane is in the same direction as a vertical axis, and the thickness direction Z is perpendicular to the sagittal plane. As another example, the projection of the sound production component 11 on the sagittal plane may fall on the antihelix 105 (e.g., at the position shown in the dashed box C in FIG. 2). In this case, the sound production component 11 is at least partially located at the antihelix 105, the long-axis of the sound production component 11 is horizontal or approximately horizontal, the projection of the long-axis direction X of the sound production component 11 on the sagittal plane is in the same direction as the sagittal axis, the projection of the short-axis direction Y on the sagittal plane is in the same direction as the vertical axis and the thickness direction Z is perpendicular to the sagittal plane. In this way, it is possible to avoid the sound production component 11 from blocking the ear canal, thereby freeing the user's ears. It is also possible to increase the contact area between the sound production component 11 and the ear 100, thus improving the wearing comfort of the earphone 10.

In some embodiments, in the wearing state, the projection of the earphone 10 on the sagittal plane may also cover or at least partially cover the user's ear canal, for example, the projection of the sound production component 11 on the sagittal plane may fall within the inferior concha 102 (e.g., at the position shown in the dashed box B in FIG. 2) and be in contact with the helix foot 1071 and/or the helix 107. At this point, the sound production component 11 is at least partially located in the inferior concha 102; the sound production component 11 is in an inclined state; the projection of the short-axis direction Y of the sound production component 11 on the sagittal plane may have an angle with the direction of the sagittal axis, i.e., the short-axis direction Y is also set at a corresponding inclination; the projection of the long-axis direction X on the sagittal plane may have an angle with the direction of the sagittal axis, i.e., the long-axis direction X is also set at an inclination; and the thickness direction Z is perpendicular to the sagittal plane. At this point, since the inferior concha 102 has a certain volume and depth, the earphone 10 has a certain distance between the inner side surface IS and the inferior concha. The ear canal may be communicated with the outside world through the gap between the inner side surface IS and the inferior concha, thus freeing both ears of the user. At the same time, the sound production component 11 and the inferior concha may cooperate to form an auxiliary cavity (e.g., a cavity structure as mentioned later) that is communicated with the ear canal. In some embodiments, the sound outlet 112 may be at least partially located in the aforementioned auxiliary cavity, and the sound exported from the sound outlet 112 is limited by the aforementioned auxiliary cavity, i.e., the aforementioned auxiliary cavity is able to gather the sound, allowing the sound to propagate more into the ear canal, thereby improving the volume and quality of the sound heard by the user in the near-field, and improving the acoustic effect of the earphone 10.

The description of the above-mentioned open earphone 10 is for the purpose of illustration only, and is not intended to limit the scope of the present disclosure. Those skilled in the art can make various changes and modifications based on the description of this present disclosure. For example, the earphone 10 may also include a battery assembly, a Bluetooth assembly, etc., or a combination thereof. The battery assembly may be used to power the earphone 10. The Bluetooth assembly may be used to wirelessly connect the earphone 10 to other devices (e.g., a cell phone, a computer, etc.). These variations and modifications remain within the scope of protection of the present disclosure.

Figure 3:
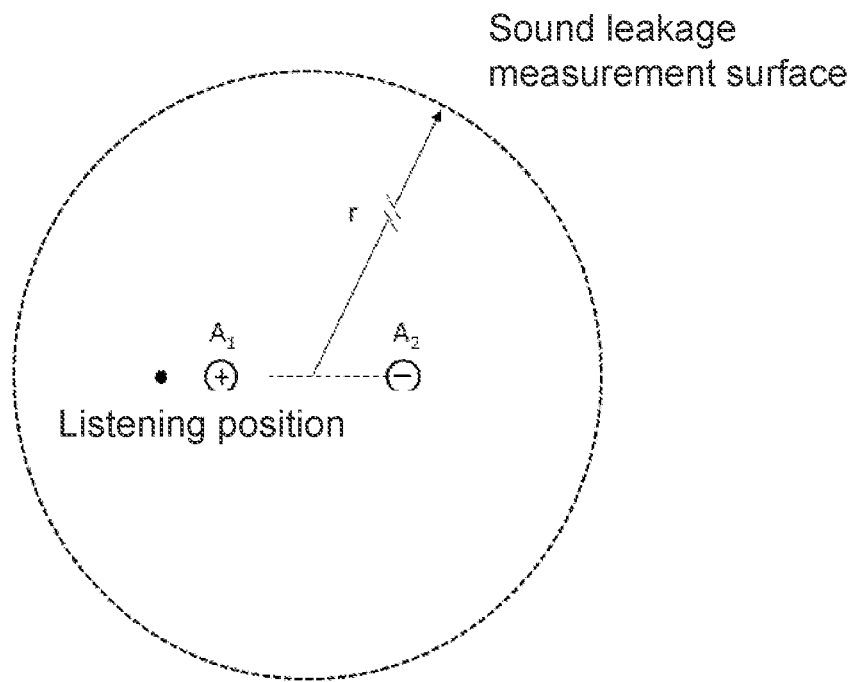
FIG. 3 is a schematic diagram illustrating two point sound sources and a listening position according to some embodiments of the present disclosure.

FIG. 3 is a schematic diagram illustrating two point sound sources and a listening position according to some embodiments of the present disclosure. In some embodiments, referring to FIG. 3, a sound may be transmitted to the outside of the earphone 10 via the sound outlet 112, which may be treated as a monopole sound source (or a point sound source) A, and it can produce a first sound. A sound may be transmitted to the outside of the earphone 10 via the pressure relief hole 113, which may be treated as a monopole sound source (or a point sound source) B, and it can produce a second sound. The second sound may be in opposite or approximately opposite phase to the first sound, so that the first sound and the second sound can cancel each other out in the far-field, i.e., forming an "acoustic dipole" to reduce sound leakage. In some embodiments, in the wearing state, a line connecting the two monopole sound sources may be pointed toward the ear canal (noted as a "listening position") so that the user can hear a sufficiently loud sound. In this case, a sound pressure level at the listening position (denoted as Pear) may be used to characterize the intensity of the sound heard by the user (i.e., a near-field listening sound pressure). Further, the magnitude of the sound pressure (denoted as Pa) on a sphere centered at the users listening position (or on a sphere with a center of the dipole sound source (e.g., A and B as shown in FIG. 3) and a radius of r) may be counted and may be used to characterize the intensity of sound leakage radiated to the far-field by the earphone 10 (i.e., a far-field leakage sound pressure). Pw may be obtained in various statistical ways, for example, by taking an average value of the sound pressure at each point of the sphere, or by taking the sound pressure distribution at each point of the sphere for area integration, etc.

It should be known that the measurement method for sound leakage in the present disclosure is only an exemplary illustration of the principle and effect, and is not limited. The method for measuring and calculating sound leakage may also be reasonably adjusted according to actual conditions. For example, a center of the dipole sound source may be used as a center of a circle, and sound pressure amplitudes of two or more points evenly sampled according to a certain spatial angle in the far-field may be averaged. In some embodiments, the measurement method for listening sound may be to select a position near the point sound source as the listening position, and the sound pressure amplitude measured at that listening position is used as a value of the listening sound. In some embodiments, the listening position may or may not be on the connection line between the two point sound sources. The measurement and calculation of the listening sound may also be reasonably adjusted according to actual conditions, for example, taking the sound pressure amplitude of other points or more than one point in the near-field for averaging. As another example, with a point sound source may be used as a center of a circle, and sound pressure amplitudes of two or more points evenly sampled according to a certain spatial angle in the near-field may be averaged. In some embodiments, a distance between the near-field listening position and a point sound source is much smaller than a distance between the point sound source and the far-field leakage sound measurement sphere.

Obviously, the sound pressure Pear transmitted by the earphone 10 to the users ear should be large enough to increase the listening effect; and the sound pressure $P_{far}$ in the far-field should be small enough to increase the sound leakage reduction effect. Therefore, a sound leakage index α may be taken as an index for evaluating the sound leakage reduction capability of the earphone 10:

$$\alpha = \frac{|P_{far}|^2}{|P_{ear}|^2}. \quad (1)$$

According to equation (1), it can be seen that the smaller the leakage index is, the stronger the sound leakage reduction ability of the earphone is, and in the case of the same near-field listening volume at the listening position, the smaller the far-field leakage sound is.

Figure 4:
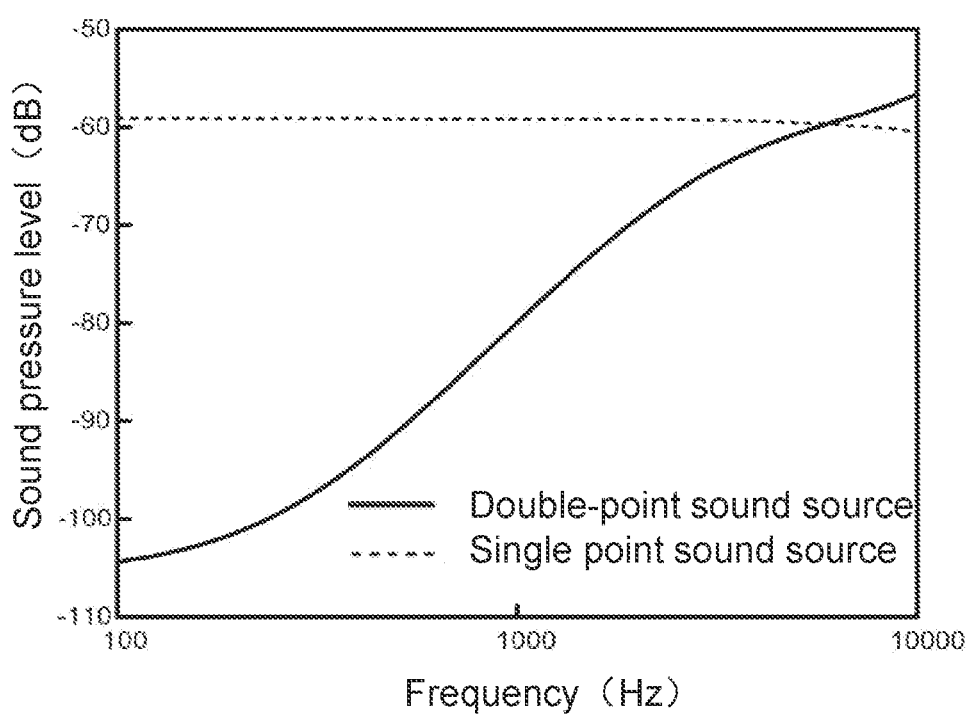
FIG. 4 is a comparison diagram of sound leakage indexes at different frequencies of a single-point sound source and a double-point sound source according to some embodiments of the present disclosure.

FIG. 4 is a comparison diagram of sound leakage indexes at different frequencies of a single-point sound source and a double-point sound source according to some embodiments of the present disclosure. The double-point sound source (also known as a dipole sound source) in FIG. 4 may be a typical double-point sound source, i.e., a distance between two point sound sources is fixed, and the two point sound sources have the same amplitude and the opposite phases. It should be understood that the typical double-point sound source is only for the principle and effect description, and parameters of each point sound source can be adjusted according to the actual needs to make it different from the typical double-point sound source. As shown in FIG. 4, when the distance is fixed, the sound leakage generated by the double-point sound source increases with the increase of frequency, and the sound leakage reduction ability decreases with the increase of frequency. When the frequency is greater than a certain frequency value (for example, about 8000 Hz as shown in FIG. 4), the sound leakage is greater than that of a single-point sound source, and this frequency (for example, 8000 Hz) is an upper frequency at which the double-point sound source can reduce the sound leakage.

In some embodiments, to improve the acoustic output of the earphone 10, i.e., to increase the sound intensity in the near-field listening position while reducing the volume of the far-field leakage sound, a baffle may be provided between the sound outlet 112 and the pressure relief hole 113.

Figure 5:
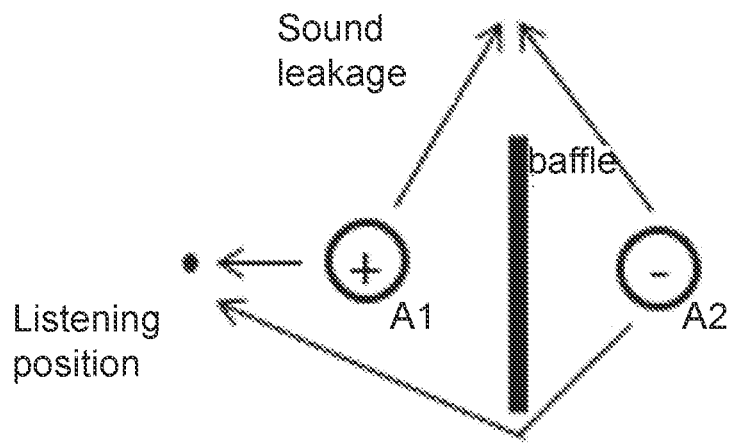
FIG. 5 is a schematic diagram illustrating an exemplary distribution of a baffle provided between two sound sources of a dipole sound source according to some embodiments of the present disclosure.

FIG. 5 is a schematic diagram illustrating an exemplary distribution of a baffle provided between two sound sources of a dipole sound source according to some embodiments of the present disclosure. As shown in FIG. 5, when a baffle is provided between a point sound source A1 and a point sound source A2, in the near-field, a sound wave of the point sound source A2 needs to bypass the baffle to interfere with a sound wave of the point sound source A1 at the listening position, which is equivalent to an increase in a sound path from the point sound source A2 to the listening position.

Therefore, assuming that the point sound source A1 and the point sound source A2 have the same amplitude, the amplitude difference between the sound waves of the point sound source A1 and the point sound source A2 at the listening position increases compared to the case without the baffle, thus reducing the degree of cancellation of the two sounds at the listening position and making the volume at the listening position increase. In the far-field, since the sound waves generated by the point sound source A1 and the point sound source A2 can interfere without bypassing the baffle in a large spatial area (similar to the case without the baffle), the sound leakage in the far-field does not increase significantly compared to the case without the baffle. Therefore, a baffle structure around one of the point sound sources A1 and A2 may significantly increase the volume of the near-field listening position without significantly increasing the volume of the far-field leakage sound.

Figure 6:
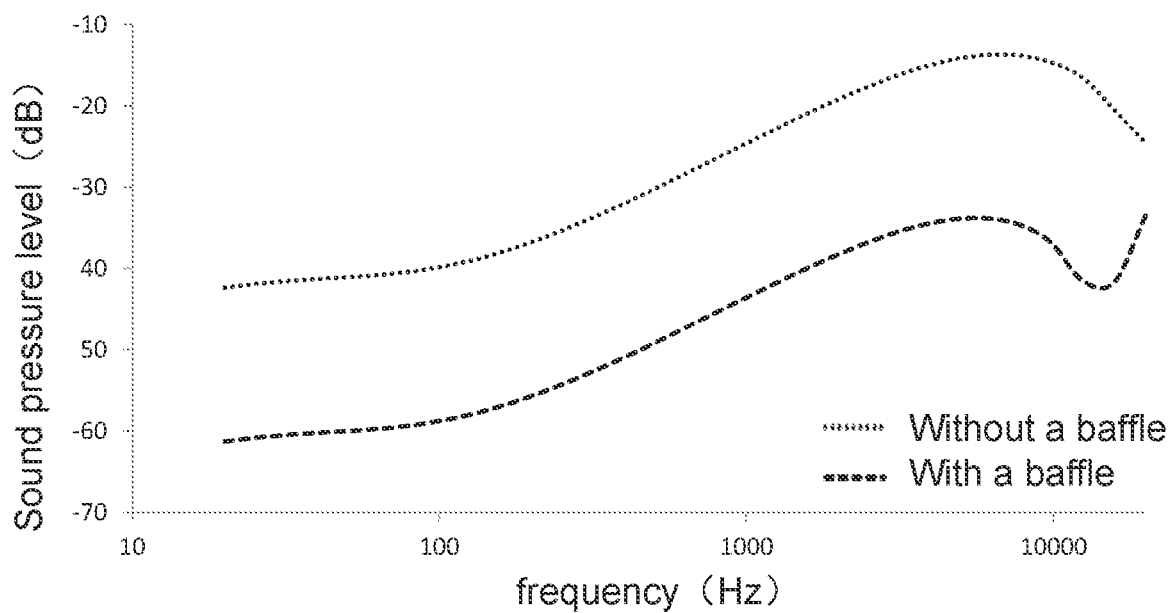
FIG. 6 is a diagram illustrating sound leakage indexes with and without a baffle between two sound sources of a dipole sound source according to some embodiments of the present disclosure.

FIG. 6 is a diagram illustrating sound leakage indexes with and without a baffle between two sound sources of a dipole sound source according to some embodiments of the present disclosure. After adding the baffle between the two point sound sources, in the near-field, it is equivalent to increasing the distance between the two point sound sources, the volume of the listening position in the near-field is equivalent to being generated by the double-point sound source at a greater distance, the listening volume in the near-field is significantly increased compared to the case without the baffle; in the far-field, a sound field of the double-point sound source is less affected by the baffle, and the resulting sound leakage is equivalent to being generated by the double-point sound source at a smaller distance. Therefore, as shown in FIG. 6, after adding the baffle, the leakage index is much smaller than that without the baffle, i.e., at the same listening volume, the sound leakage in the far-field is smaller than that in the case without the baffle, and the sound leakage reduction ability is obviously enhanced.

Figure 8:
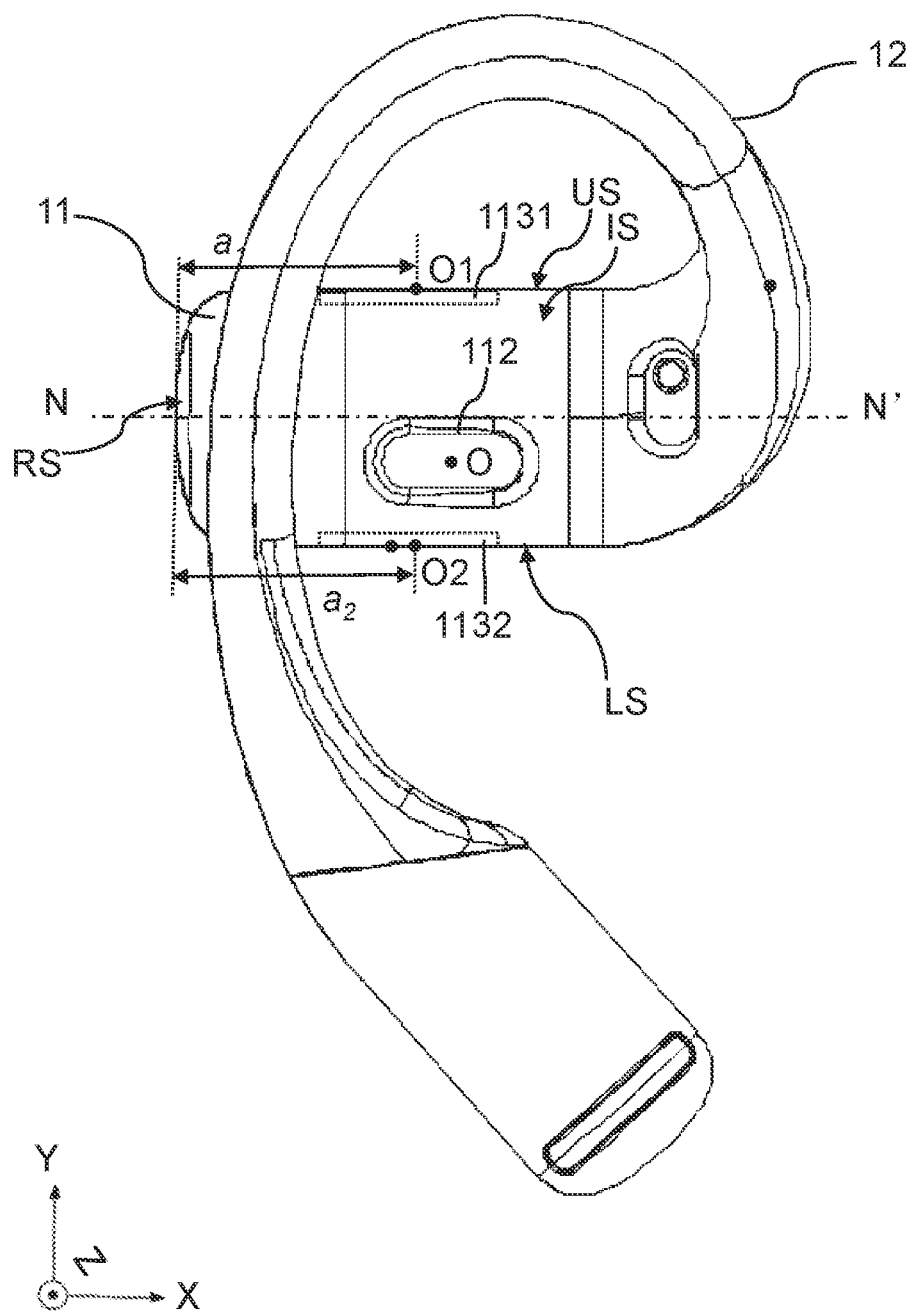
FIG. 8 is a schematic diagram illustrating a structure of a side of the earphone shown in FIG. 7 facing the ear.
Figure 9:
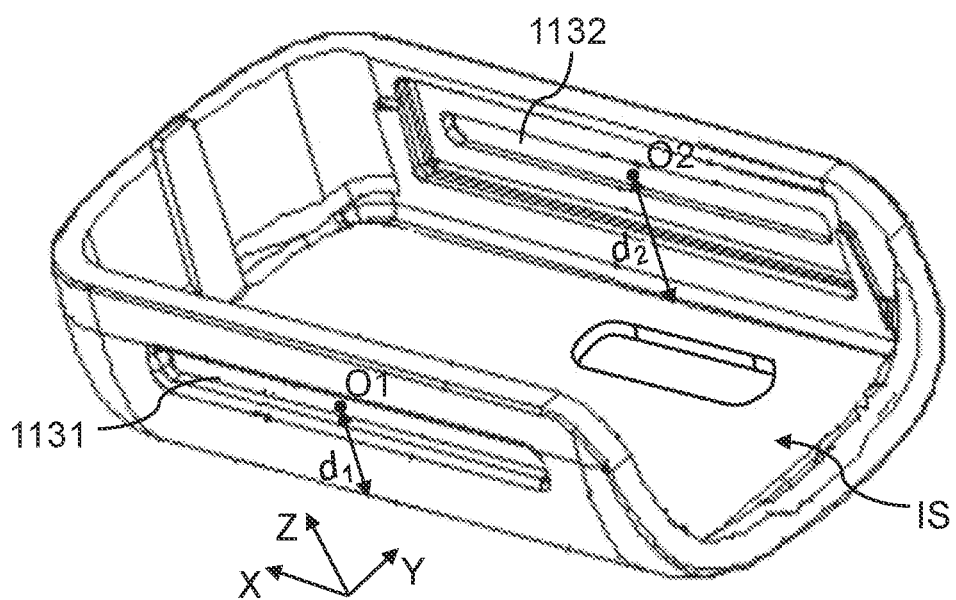
FIG. 9 is a schematic diagram illustrating a structure of a housing of the earphone shown in FIG. 7.

FIG. 7 is a schematic diagram illustrating an exemplary wearing state of an open earphone according to some embodiments of the present disclosure. FIG. 8 is a schematic diagram illustrating a structure of a side of the earphone shown in FIG. 7 facing the ear. FIG. 9 is a schematic diagram illustrating a structure of a housing of the earphone shown in FIG. 7.

As shown in FIG. 7, the ear hook 12 is an arc-shaped structure that fits at the junction of the users head and the ear 100. The sound production component 11 (or the housing 111 of the sound production component 11) may have a connection end CE connected to the ear hook 12 and a free end FE not connected to the ear hook 12. When the earphone 10 is in the wearing state, a first portion 121 of the ear hook 12 (e.g., the hook portion of the ear hook 12) is positioned between the user's ear (e.g., the helix 107) and the head, and a second portion 122 of the ear hook 12 (e.g., the connection portion of the ear hook) extends toward a side of the auricle away from the head and connects to the connection end CE of the sound production component 11 to hold the sound production component 11 at a position near the ear canal but without blocking the ear canal.

Referring to FIGS. 7 and 8, the sound production component 11 may have an inner side surface IS (also called an inner side surface of the housing 111) facing the ear along the thickness direction Z in the wearing state, an outer side surface OS (also called an outer side surface of the housing 111) away from the ear, and a connection surface connecting the inner side surface IS and the outer side surface OS. It should be noted that in the wearing state, when viewed along a direction in which the coronal axis (i.e., the thickness direction Z), the sound production component 11 may be provided in a shape of a circle, an oval, a rounded square, a rounded rectangle, etc. When the sound production component 11 is provided in the shape of a circle, an ellipse, etc., the above-mentioned connection surface may refer to an arc-shaped side surface of the sound production component 11; and when the sound production component 11 is set in the shape of a rounded square, a rounded rectangle, etc., the above-mentioned connection surface may include a lower side surface LS (also referred to as a lower side surface of the housing 111), an upper side surface US (also referred to as an upper side surface of the housing 111), and a rear side surface RS (also referred to as a rear side surface of the housing 111) as mentioned later. The upper side surface US and the lower side surface LS may refer to a side of the sound production component 11 in the wearing state along the short-axis direction Y away from the external ear canal 101 and a side of the sound production component 11 in the wearing state along the short-axis direction Y facing to the external ear canal 101, respectively; and the rear side surface RS may refer to a side of the sound production component 11 in the wearing state along the length direction X toward the back of the head. For the sake of description, the present disclosure is exemplarily illustrated with the sound production component 11 set in a rounded rectangle. The length of the sound production component 11 in the long-axis direction X may be greater than the width of the sound production component 11 in the short-axis direction Y. In some embodiments, the rear side surface RS of the earphone may be curved in order to improve the aesthetics and wearing comfort of the earphone.

The sound production component 11 may be provided with a transducer that can convert an electrical signal into a corresponding mechanical vibration to produce sound. The transducer (e.g., a diaphragm) may divide the housing 111 to form a front cavity and a rear cavity of the earphone. The sound produced in the front and rear cavities is in opposite phase. The inner side surface IS is provided with a sound outlet 112 communicated with the front cavity to transmit the sound generated in the front cavity out of the housing 111 and into the ear canal so that the user can hear the sound. Other sides of the housing 111 (e.g., the outer side surface OS, the upper side surface US, or the lower side surface LS, etc.) may be provided with one or more pressure relief holes 113 communicated with the rear cavity for guiding the sound generated in the rear cavity output of the housing 111 to interfere with the sound leaked from the sound outlet 112 in the far-field. In some embodiments, the pressure relief holes 113 are further away from the ear canal than the sound outlet 112 so as to weaken the inverse phase cancellation between the sound output via the pressure relief holes 113 and the sound output via the sound outlet 112 at the listening position (e.g., the ear canal), thereby improving the sound volume at the listening position.

In some embodiments, at least two pressure relief holes 113 may be provided on other side surfaces of the housing 111 (e.g., the outer side surface OS, the upper side surface US, or the lower side surface LS, etc.) except for the inner side surface IS. The setting of the at least two pressure relief holes 113 may destroy the standing wave in the rear cavity, so that the resonance frequency of the sound exported from the pressure relief holes 113 to the exterior of the housing 111 is as high as possible, thereby making the frequency response of the rear cavity have a wide flat region (e.g., a region before a resonance peak) and obtaining a better sound leakage reduction effect in a mid-high frequency range (e.g., 2 kHz-6 kHz). Merely by way of example, the pressure relief holes 113 may include a first pressure relief hole 1131 and a second pressure relief hole 1132. The second pressure relief hole 1132 may be closer to the sound outlet 112 than the first pressure relief hole 1131. In some embodiments, the first pressure relief hole 1131 and the second pressure relief hole 1132 may be provided on the same side surface of the housing 111, for example, the first pressure relief hole 113 and the second pressure relief hole 113 may be provided on the outer side surface OS, the upper side surface US, or the lower side surface LS at the same time. In some embodiments, the first pressure relief hole 1131 and the second pressure relief hole 1132 may be provided on two different side surfaces of the housing 111, respectively. For example, the first pressure relief hole 1131 may be provided on the outer side surface OS and the second pressure relief hole 1132 may be provided on the upper side surface US. Alternatively, the first pressure relief hole 1131 may be provided on the outer side surface OS and the second pressure relief hole 1132 may be provided on the lower side surface LS. In some embodiments, in order to destroy the standing wave in the rear cavity to the greatest extent, the two pressure relief holes 113 may be located on opposite side surfaces of the housing 111. For example, the first pressure relief hole 1131 may be provided on the upper side surface US and the second pressure relief hole 1132 may be provided on the lower side surface LS. For the sake of description, the present disclosure is illustrated exemplarily with the first pressure relief hole 1131 provided on the upper side surface US and the second pressure relief hole 1132 provided on the lower side surface LS.

Figure 17:
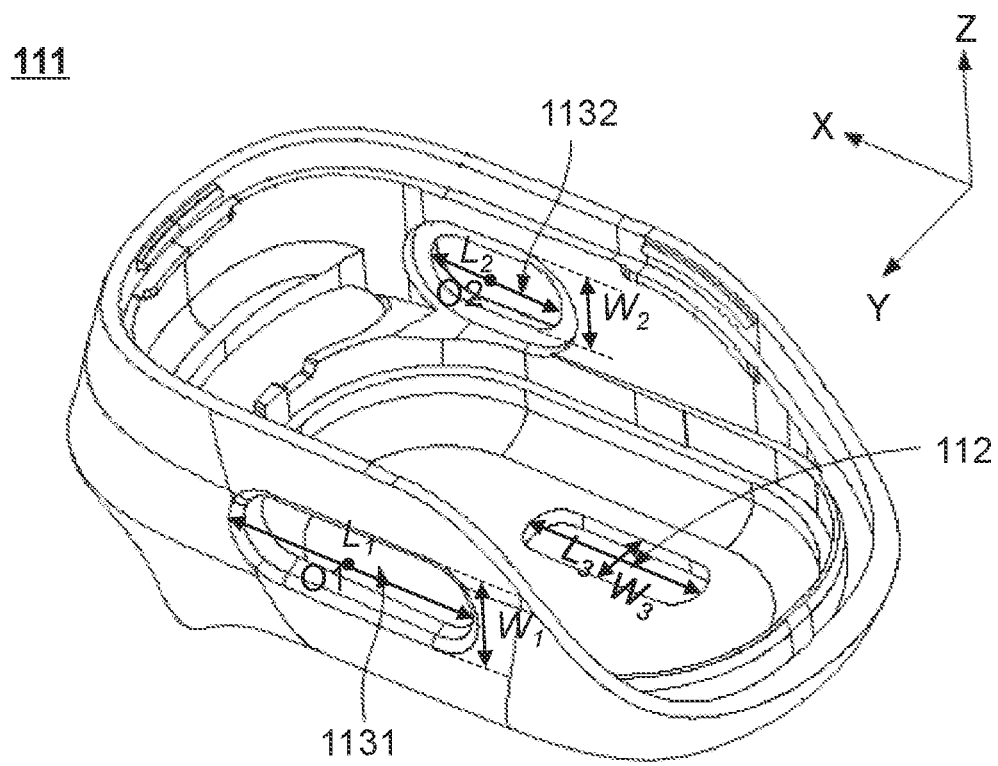
FIG. 17 is a schematic diagram illustrating a structure of a housing for an open earphone according to some embodiments of the present disclosure.

In some embodiments, in order to prevent the sounds output by the first pressure relief hole 1131 and the second pressure relief hole 1132 affecting the volume of the sound output from the sound outlet 112 at the listening position, the first pressure relief hole 1131 and the second pressure relief hole 1132 should be located as far away from the sound outlet 112 as possible. For example, the center of the sound outlet 112 may be located on or near a perpendicular bisection-plane of a line segment connecting the center of the first pressure relief hole 1131 and the center of the second pressure relief hole 1132. In some embodiments, the center of the sound outlet 112 may be 0 mm to 2 mm from the perpendicular bisection-plane of the line segment connecting the center of the first pressure relief hole 1131 and the center of the second pressure relief hole 1132. In some embodiments, in order to further prevent the sound emitted by the second pressure relief hole 1132 from canceling the sound emitted from the sound outlet 112 in the ear canal (i.e., the listening position) to reduce the listening volume, an area of the second pressure relief hole 1132 may be reduced to reduce the intensity of the sound exported from the second pressure relief hole 1132 and transmitted to the ear canal. In this case, the area of the second pressure relief hole 1132 may be smaller than an area of the first pressure relief hole 1131 (as shown in FIG. 17).

In some embodiments, as shown in FIG. 7, when the earphone 10 is in the wearing state, the long-axis direction X of the sound production component 11 may be set horizontally or approximately horizontally (similar to position C shown in FIG. 2). In such cases, the sound production component 11 is located at least partially at the antihelix 105, and the free end FE of the sound production component 11 may be oriented toward the back of the head. With the sound production component 11 in a horizontal or approximately horizontal state, the projection of the long-axis direction X of the sound production component 11 on the sagittal plane may be in the same direction as the sagittal axis, the projection of the short-axis direction Y on the sagittal plane may be in the same direction as the vertical axis, and the thickness direction Z is perpendicular to the sagittal plane.

In some embodiments, in order to improve the fit between the earphone 10 and the ear 100 and improve the stability of the earphone 10 in the wearing state, the inner side surface IS of the housing 111 may be pressed onto the surface of the ear 100 (e.g., the antihelix 105) to increase the resistance of the earphone 10 falling off the ear 100.

In some embodiments, referring to FIGS. 7 and 8, when the earphone 10 is pressed onto the ear 100, in order to keep the sound outlet 112 on the inner side surface IS from being obstructed by ear tissues, the projection of the sound outlet 112 on the sagittal plane may partially or fully coincide with the projection of an inner concave structure (e.g., the concha boat 103) of the ear on the sagittal plane. In some embodiments, since the concha boat 103 is communicated with the inferior concha 102 and the ear canal is located in the inferior concha 102, when at least a portion of the projection of the sound outlet 112 on the sagittal plane is located within the concha boat 103, the sound output from the sound outlet 112 may reach the ear canal unobstructed, resulting in a higher volume received by the ear canal. In some embodiments, a long-axis dimension of the sound production component 11 may not be too long. If the long-axis dimension of the sound production component 11 is too long, the projection of the free end FE on the sagittal plane may exceed the projection of the ear on the sagittal plane, thereby affecting the fitting effect of the sound production component 11 to the ear. Therefore, the long-axis dimension of the sound production component 11 may be designed so that the projection of the free end FE on the sagittal plane does not exceed the projection of the helix 107 on the sagittal plane.

It should be known that since the sound outlet 112 and the pressure relief hole 113 (e.g., a first pressure relief hole 1131 and a second pressure relief hole 1132) are provided on the housing 111 and each side wall of the housing 111 has a certain thickness, the sound outlet 112 and the pressure relief hole 113 are both holes with a certain depth. At this time, the sound outlet 112 and the pressure relief hole 113 may both have an inner opening and an outer opening. For ease of description, in the present disclosure, the center O of the sound outlet 112 described above and below may refer to the centroid of the outer opening of the sound outlet 112, and the center of the pressure relief hole 113 described above and below may refer to the centroid of the outer opening of the pressure relief hole 113 (e.g., the center O1 of the first pressure relief hole 1131 may refer to the centroid of the outer opening of the first pressure relief hole 1131, and the center O2 of the second pressure relief hole 1132 may refer to the centroid of the outer opening of the second pressure relief hole 1132). For the purposes of description, in the present disclosure, the areas of the sound outlet 112 and the pressure relief hole 113 (e.g., the first pressure relief hole 1131 and/or the second pressure relief hole 1132) may refer to areas of the outer openings of the sound outlet 112 and the pressure relief hole 113 (e.g., the area of the outer opening of the sound outlet 112 on the inner side surface IS, the area of the outer opening of the first pressure relief hole 1131 on the upper side surface US, and the area of the outer opening of the second pressure relief hole 1132 on the lower side surface LS). It should be known that in some other embodiments, the areas of the sound outlet 112 and the pressure relief hole 113 may also be referred to other cross-sectional areas of the sound outlet 112 and the pressure relief hole 113, for example, the area of the inner opening of the sound outlet 112 and/or the pressure relief hole 113, or an average of the area of the inner opening and the area of the outer opening of the sound outlet 112 and/or the pressure relief hole 113, etc.

In some embodiments, the sound outlet 112 communicated with the front cavity may be considered as the point sound source A1 shown in FIG. 5, the pressure relief hole 113 (e.g., the first pressure relief hole 1131 and/or the second pressure relief hole 1132) communicated with the rear cavity may be considered as the point sound source A2 shown in FIG. 5, and the ear canal may be considered as the listening position shown in FIG. 5. At least part of the housing of the sound production component 11 and/or at least part of the auricle may be considered as the baffle shown in FIG. 5 to increase a difference between sound paths from the sound outlet 112 and the first pressure relief hole 1131 and/or the second pressure relief hole 1132 to the ear canal, so as to increase the sound intensity at the ear canal while maintaining the far-field sound leakage reduction effect. When the earphone 10 adopts the structure shown in FIG. 7, i.e., when at least a portion of the housing 111 is located at the antihelix 105, in terms of the listening effect, a sound wave of the sound outlet 112 may reach the ear canal directly. In this case, the sound outlet 112 may be provided at a position on the inner side surface IS near the lower side surface LS, and at least one pressure relief hole may be provided at a position away from the sound outlet 112, for example, the first pressure relief hole 1131 may be provided at a position on the outer side OS or the upper side surface US away from the sound outlet 112. A sound wave of the first pressure relief hole 1131 needs to bypass the exterior of the sound production component 11 to interfere with the sound wave of the sound outlet 112 at the ear canal. In addition, an upper convex and lower concave structure on the auricle (e.g., the antihelix, the tragus etc., in its propagation path) increases the sound path of the sound transmitted from the first pressure relief hole 113 to the ear canal. Thus, the sound production component 11 itself and/or at least part of the auricle is equivalent to a baffle between the sound outlet 112 and the first pressure relief hole 1131. The baffle increases the sound path from the first pressure relief hole 1131 to the ear canal and reduces the intensity of the sound waves from the first pressure relief hole 1131 in the ear canal, thereby reducing the cancellation degree between the two sounds emitted from the sound outlet 112 and the first pressure relief hole 1131 in the ear canal, resulting in an increase in the volume in the ear canal. In terms of the sound leakage effect, since the sound waves generated by both the sound outlet 112 and the first pressure relief hole 1131 and/or the second pressure relief hole 1132 can interfere without bypassing the sound production component 11 itself in a relatively large spatial area (similar to the case without a baffle), the sound leakage is not increased significantly. Therefore, by setting the sound outlet 112, the first pressure relief hole 1131, and the second pressure relief hole 1132 at suitable positions, it is possible to significantly increase the volume in the ear canal without a significant increase in the leakage sound volume.

In some embodiments, when the projection of the free end FE on the sagittal plane does not exceed the projection of the helix 107 on the sagittal plane, for the convenience of production and manufacturing, the first pressure relief hole 1131 and the second pressure relief hole 1132 may be approximately symmetrically distributed with respect to a long-axis center plane (e.g., a plane NN' perpendicular to an inward surface of the paper as shown in FIG. 8). In some embodiments, a difference between a distance $a_2$ from the center O2 of the second pressure relief hole 1132 on the lower side surface LS to the rear side surface RS and a distance $a_1$ from the center O1 of the first pressure relief hole 1131 on the upper side surface US to the rear side surface RS is less than 10%. In some embodiments, the difference between the distance $a_2$ from the center O2 of the second pressure relief hole 1132 on the lower side surface LS to the rear side surface RS and the distance $a_1$ from the center O1 of the first pressure relief hole 1131 on the upper side surface US to the rear side surface RS is less than 5%. In some embodiments, the difference between the distance $a_2$ from the center O2 of the second pressure relief hole 1132 on the lower side surface LS to the rear side surface RS and the distance $a_i$ from the center O1 of the first pressure relief hole 1131 on the upper side surface US to the rear side surface RS is less than 2%. It should be known that in some embodiments, the rear side surface RS of the earphone may be curved in order to enhance the aesthetics and wearing comfort of the earphone. When the rear side surface RS is curved, a distance between a position (e.g., the center O1 of the first pressure relief hole 1131) to the rear side surface RS may refer to a distance from that position to a tangent surface of the rear side surface RS that is parallel to the short-axis.

In some embodiments, since the sound outlet 112 is set close to the ear canal, the second pressure relief hole 1132 on the lower side surface LS should be set as far away from the sound outlet 112 as possible so that the sound emitted from the second pressure relief hole 1132 at the listening position (i.e., the ear canal) is less effective in cancelling out the sound emitted from the sound outlet 112, thereby making the volume at the listening position increase. Therefore, when the sound outlet 112 is set close to the lower side surface LS and the connection end CE, the second pressure relief hole 1132 can be set close to the rear side surface RS, thereby making a distance between the sound outlet 112 and the second pressure relief hole 1132 as large as possible. In some embodiments, when the projection of the free end FE on the sagittal plane does not exceed the projection of the helix foot 107 on the sagittal plane, the distance $a_2$ from the center O2 of the second pressure relief hole 1132 to the rear side surface RS may be in a range of 8.60 mm to 20.27 mm. In some embodiments, the distance $a_2$ from the center O2 of the second pressure relief hole 1132 to the rear side surface RS may be in a range of 8.60 mm to 12.92 mm. In some embodiments, the distance $a_2$ from the center O2 of the second pressure relief hole 1132 to the rear side surface RS may be in a range of 9.60 mm to 11.92 mm. In some embodiments, when the earphone 10 is in the wearing state, the free end FE may come into contact with the ear (e.g., the helix foot 107), resulting in a portion of the upper side surface US and/or the lower side surface LS being blocked by the ear. At this time, in order to prevent the second pressure relief hole 1132 on the lower side surface LS (or the first pressure relief hole 1131 on the upper side surface US) from being blocked by the ear 100, thus affecting the acoustic performance of the earphone 10, the distance $a_2$ from the center O2 of the second pressure relief hole 1132 to the rear side surface RS may be in a range of 10.10 mm to 11.42 mm. More preferably, the distance $a_2$ from the center O2 of the second pressure relief hole 1132 to the rear side surface RS may be in a range of 10.30 mm to 11.12 mm. More preferably, the distance $a_2$ from the center O2 of the second pressure relief hole 1132 to the rear side surface RS may be in a range of 10.60 mm to 11.82 mm.

In some embodiments, under a condition that a difference between the distance $a_2$ from the center O2 of the second pressure relief hole 1132 to the rear side surface RS and the distance $a_1$ from the center O1 of the first pressure relief hole 1131 to the rear side surface RS is less than 10%, the distance $a_1$ from the center O1 of the first pressure relief hole 1131 to the rear side surface RS may be in a range of 8.60 mm to 15.68 mm. In some embodiments, the distance $a_1$ from the center O1 of the first pressure relief hole 1131 to the rear side surface RS may be in a range of 8.60 mm to 12.92 mm. In some embodiments, in order to make the projection of the first pressure relief hole 1131 on the sagittal plane largely coincide with the projection of the inner concave structure of the ear on the sagittal plane, the distance $a_1$ from the center O1 of the first pressure relief hole 1131 to the rear side surface RS may be in a range of 9.60 mm to 11.92 mm. Preferably, the distance $a_1$ from the center O1 of the first pressure relief hole 1131 to the rear side surface RS may be in a range of 10.10 mm to 11.42 mm. More preferably, the distance $a_1$ from the center O1 of the first pressure relief hole 1131 to the rear side surface RS may be in a range of 10.30 mm to 11.12 mm. More preferably, the distance $a_1$ from the center O1 of the first pressure relief hole 1131 to the rear side surface RS may be in a range of 10.60 mm to 11.82 mm.

In some embodiments, the first pressure relief hole 1131 is farther away from the sound outlet 112 relative to the second pressure relief hole 1132, and due to the gap between the ear 100 and the inner side surface IS is relatively small, compared with the second pressure relief hole 1132, the sound generated by the first pressure relief hole 1131 may be more difficult to transmit to the ear canal. Thus, in some embodiments, the distance from the center O1 of the first pressure relief hole 1131 to the rear side surface RS may be less than the distance from the center O2 of the second pressure relief hole 1132 to the rear side surface RS. For example, the distance from the center O1 of the first pressure relief hole 1131 to the rear side surface RS is in a range of 10.44 mm to 15.68 mm, and the distance from the center O2 of the second pressure relief hole 1132 to the rear side surface RS is in a range of 13.51 mm to 20.27 mm.

In some embodiments, referring to FIG. 9, in order to increase the sound path from the first pressure relief hole 1131 and/or the second pressure relief hole 1132 to the ear canal, the dimension of the earphone 10 in the thickness direction Z may be increased, thereby increasing the sound production efficiency (i.e., the listening volume at the listening position) of the earphone 10. Further, the first pressure relief hole 1131 and/or the second pressure relief hole 1132 may be provided away from the inner side surface IS, thereby further increasing the sound path from the first pressure relief hole 1131 and/or the second pressure relief hole 1132 to the ear canal and increasing the sound production efficiency of the earphone 10. In addition, the overall dimension of the sound production component 11 is limited to not be too large (e.g., the size of the sound production component 11 in the Z-direction cannot be too large), otherwise the overall mass of the earphone 10 may increase, thereby affecting the wearing comfort of the user. In some embodiments, a distance $d_1$ from the center O1 of the first pressure relief hole 1131 to the inner side surface IS is in a range of 4.24 mm to 7.96 mm. In some embodiments, the distance $d_1$ from the center O1 of the first pressure relief hole 1131 to the inner side surface IS is in a range of 4.43 mm to 7.96 mm. In some embodiments, the distance $d_1$ from the center O1 of the first pressure relief hole 1131 to the inner side surface IS is in a range of 5.43 mm to 6.96 mm. In some embodiments, in the wearing state, in order to ensure that the projection of the first pressure relief hole 1131 on the horizontal plane is less or does not coincident with the projection of the ear 100 on the horizontal plane to achieve the goal that the sound output from the first pressure relief hole 1131 and/or the second pressure relief hole 1132 can be more radiated outwardly rather than being transmitted to the ear canal or reflected via a portion of the structure of the ear 100 (e.g., the auricle), the first pressure relief hole 1131 and/or the second pressure relief hole 1132 may be provided away from the inner side surface IS. By setting in this way, the sound path from the first pressure relief hole 1131 and/or the second pressure relief hole 1132 to the ear canal may be further increased, thereby improving the sound production efficiency of the earphone 10. In some embodiments, the distance $d_1$ from the center O1 of the first pressure relief hole 1131 to the inner side surface IS is in a range of 5.63 mm to 7.96 mm. In some embodiments, the distance $d_1$ from the center O1 of the first pressure relief hole 1131 to the inner side surface IS is in a range of 6.25 mm to 7.56 mm.

In some embodiments, a distance $d_2$ from the center O2 of the second pressure relief hole 1132 to the inner side surface IS may be the same as the distance $d_1$ from the center O1 of the first pressure relief hole 1131 to the inner side surface IS. In some embodiments, the distance $d_2$ from the center O2 of the second pressure relief hole 1132 to the inner side surface IS is in a range of 4.43 mm to 7.96 mm. In some embodiments, the distance $d_2$ from the center O2 of the second pressure relief hole 1132 to the inner side surface IS is in a range of 5.43 mm to 6.96 mm. In some embodiments, the distance $d_2$ from the center O2 of the second pressure relief hole 1132 to the inner side surface IS is in a range of 5.63 mm to 7.96 mm. In some embodiments, the distance $d_2$ from the center O2 of the second pressure relief hole 1132 to the inner side surface IS is in a range of 6.25 mm to 7.56 mm.

In some embodiments, in order to make the sound outlet 112 close to the ear canal to increase the listening volume, it is necessary to make the sound outlet 112 close to the lower side surface LS. In this case, the second pressure relief hole 1132 is closer to the inner side surface IS with respect to the first pressure relief hole 1131.

In order to reduce the cancellation between the sound emitted from the second pressure relief hole 1132 and the sound emitted from the sound outlet 112 at the listening position (i.e., the ear canal), which in turn increases the volume at the listening position, along the Z-direction, the second pressure relief hole 1132 may be farther away from the inner side surface IS with respect to the first pressure relief hole 1131, i.e., the distance $d_2$ from the center O2 of the second pressure relief hole 1132 to the inner side surface IS may be different from the distance $d_1$ from the center O1 of the first pressure relief hole 1131 to the inner side surface IS. For example, the distance $d_1$ from the center O1 of the first pressure relief hole 1131 to the inner side surface IS is in a range of 5.63 mm to 6.5 mm, and the distance $d_2$ from the center O2 of the second pressure relief hole 1132 to the inner side surface IS is in a range of 6.5 mm to 7.56 mm.

The description of the earphone 10 described above is only for the purpose of illustration, and is not intended to limit the scope of the present disclosure. For those skilled in the art, various variations and modifications can be made according to the description of the present disclosure. For example, when only one pressure relief hole is provided on the sound production component 11, the pressure relief hole may be any one of the first pressure relief hole 1131 and the second pressure relief hole 1132 described above. For example, the pressure relief hole may be the first pressure relief hole 1131 described above, i.e., the pressure relief hole may be provided on the upper side surface US. A distance from the center of the pressure relief hole to the inner side surface IS is in a range of 4.24 mm to 7.96 mm, and a distance from the center of the pressure relief hole to the rear side surface RS is in a range of 8.60 mm to 15.68 mm. These variations and modifications are still within the scope of protection of the present disclosure.

In some embodiments, in order to increase the listening volume, particularly at low and middle frequencies, while still retaining the effect of far-field leakage sound cancellation, a cavity structure may be constructed around one of the sources of the double-point sound source. FIG. 10 is a distribution schematic diagram of a cavity structure arranged around one sound source of a dipole sound source according to some embodiments of the present disclosure.

As shown in FIG. 10, the cavity structure 41 is provided between the dipole sound source such that one sound source of the dipole sound source and the listening position is inside the cavity structure 41 and the other sound source is outside the cavity structure 41. A sound derived from the sound source inside the cavity structure 41 is limited by the cavity structure 41, i.e., the cavity structure 41 is able to gather the sound so that the sound can propagate more to the listening position, thereby improving the volume and quality of the sound at the listening position. In the present disclosure, the "cavity structure" can be understood as a semi-enclosed structure enclosed by a side wall of the sound production component 11 together with the inferior concha structure, which is such that the interior is not completely sealed off from the external environment, but has a leaking structure 42 (e.g., an opening, a slit, a pipe, etc.) that is acoustically communicated with the external environment. Exemplary leaking structures may include, but are not limited to, an opening, a slit, a pipe, etc., or any combination thereof.

In some embodiments, the cavity structure 41 may contain a listening position and at least one sound source. Here, "contain" may mean that at least one of the listening position and the sound source is inside the cavity, or it may mean that at least one of the listening position and the sound source is at an edge inside the cavity. In some embodiments, the listening position may be an opening of the ear canal or an acoustic reference point of the ear.

FIG. 11A is a schematic diagram illustrating a listening principle of a dipole sound source structure and a cavity structure constructed around one sound source of the dipole sound source according to some embodiments of the present disclosure. FIG. 11B is a schematic diagram illustrating a sound leakage principle of a dipole sound source structure and a cavity structure constructed around one sound source of the dipole sound source according to some embodiments of the present disclosure.

For the near-field listening sound, as a dipole with a cavity structure is constructed around one of the sound sources shown in FIG. 11A, and since one sound source A of the sound sources is wrapped by the cavity structure, most of the sound radiated from the sound source A may reach the listening position by a direct emission or reflection manner. In contrast, in the absence of the cavity structure, most of the sound radiated from the sound source does not reach the listening position. Therefore, the cavity structure makes it possible to significantly increase the volume of sound reaching the listening position. At the same time, only a small portion of an inversion sound radiated from an inversion source B outside the cavity structure enters the cavity structure through a leaking structure of the cavity structure. This is equivalent to the creation of a secondary sound source B' at the leaking structure, whose intensity is significantly smaller than that of the sound source B and also significantly smaller than that of the sound source A. The sound generated by the secondary sound source B' has a weak inversion cancellation effect on the sound source A in the cavity, so that the listening volume at the listening position is significantly increased.

For the sound leakage, as shown in FIG. 11B, the sound source A radiates a sound to the outside through the leaking structure of the cavity is equivalent to generating a secondary sound source A' at the leaking structure. Since almost all the sound radiated by the sound source A is output from the leaking structure, and a structural scale of the cavity is much smaller than a spatial scale for evaluating the sound leakage (the difference is at least one order of magnitude), therefore the intensity of the secondary sound source A' can be considered as comparable to that of the sound source A. For the external space, the cancellation effect between sounds produced by the secondary sound source A' and the sound source B is comparable to the cancellation effect between sounds produced by the sound source A and the sound source B. That is, the cavity structure still maintains a comparable sound leakage reduction effect.

It should be understood that the above leaking structure with one opening is only an example, and the leaking structure of the cavity structure may contain one or more openings, which may also achieve a superior listening index, wherein the listening index may refer to the reciprocal of the leakage index $\alpha$ by $1/\alpha$. Taking the structure with two openings as an example, the cases of equal opening and equal opening ratio are analyzed separately below. Taking the structure with only one opening as a comparison, the "equal opening" here means setting two openings each with the same dimension as the opening in the structure with only one opening, and the "equal opening ratio" means setting two openings, a total area of which is the same area as that of the structure with only one opening. The equal opening is equivalent to doubling the opening dimension corresponding to the structure with only one opening (i.e., a ratio of an opening area S of the leaking structure on the cavity structure to an area S0 of the cavity structure subject to a direct action of the contained sound source), and the overall listening index is reduced as described before. In the case of the equal opening ratio, even though S/S0 is the same as that of the structure with only one opening, the distances from the two openings to the external sound source are different, thus resulting in different listening indexes.

Figure 12A:
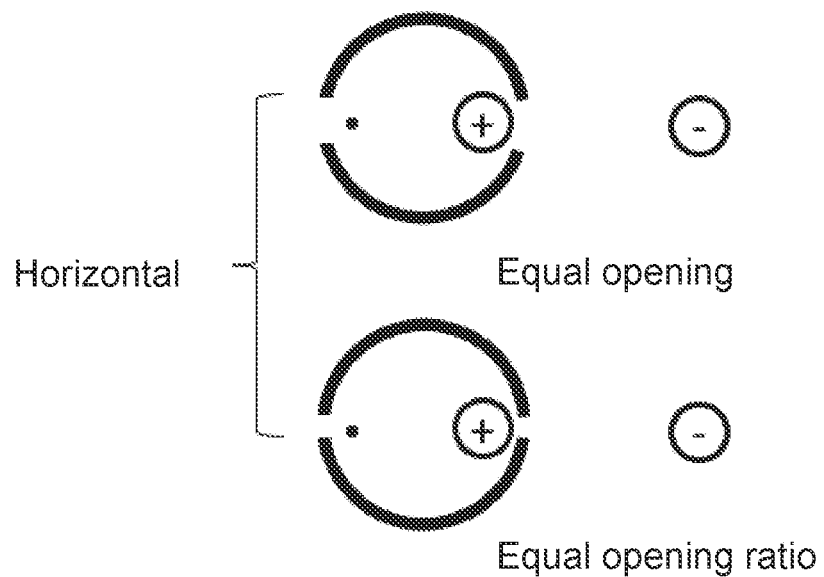
FIG. 12A is a schematic diagram illustrating a cavity structure with two horizontal openings according to some embodiments of the present disclosure.
Figure 12B:
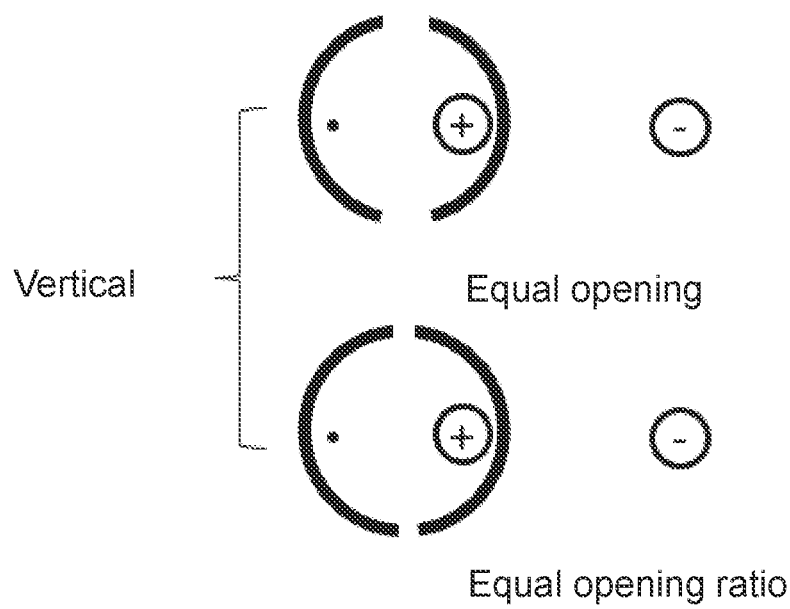
FIG. 12B is a schematic diagram illustrating a cavity structure with two vertical openings according to some embodiments of the present disclosure.

FIG. 12A is a schematic diagram illustrating a cavity structure with two horizontal openings according to some embodiments of the present disclosure. FIG. 12B is a schematic diagram illustrating a cavity structure with two vertical openings according to some embodiments of the present disclosure. As shown in FIG. 12A, when the two openings are parallel to a connection line of the two sound sources (i.e., two horizontal openings), the distances from the two openings to the external sound sources are the maximum and minimum, respectively; as shown in FIG. 12B, when the connection line is perpendicular (i.e., two vertical openings), the distances from the two openings to the external sound sources are equal and a middle value is obtained.

Figure 13:
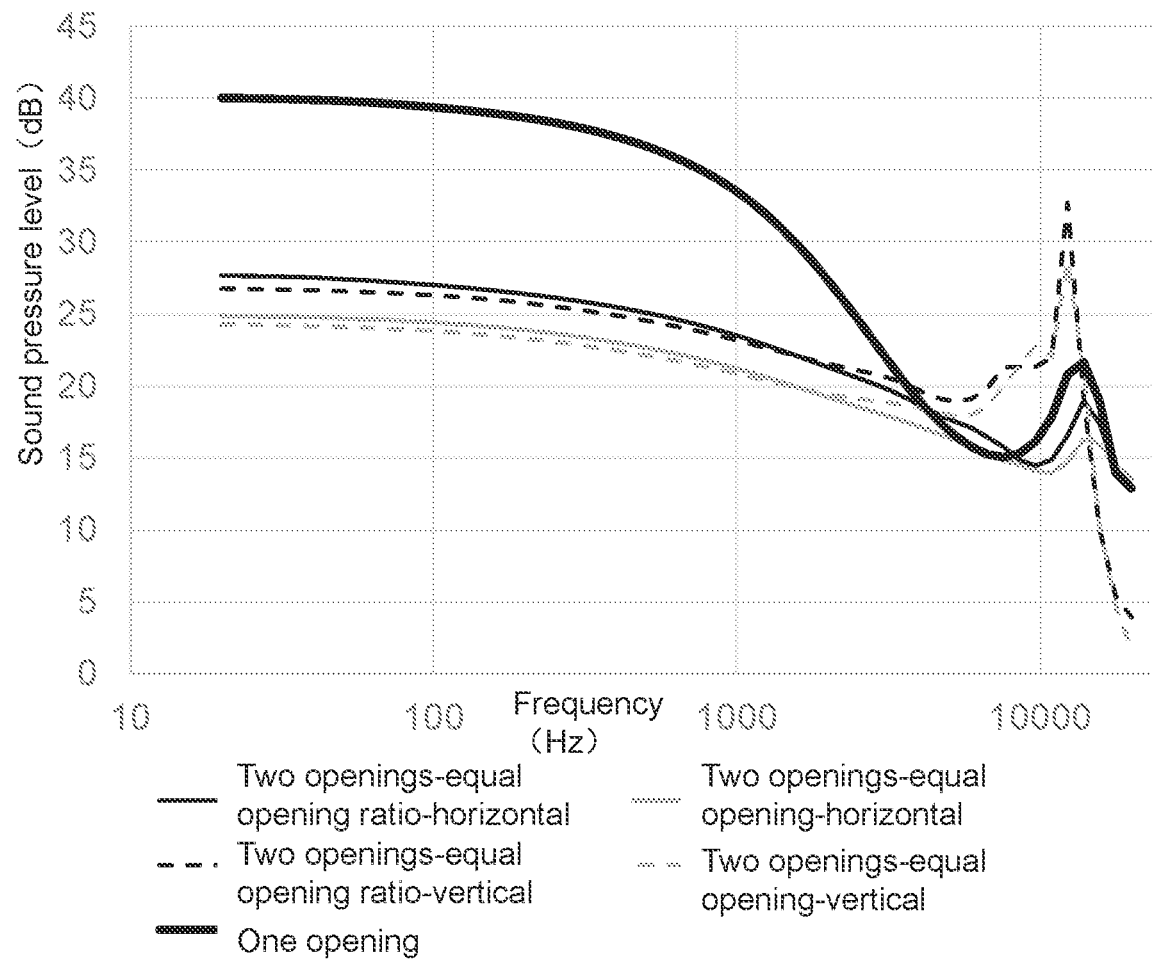
FIG. 13 is a listening index curve comparison diagram of a cavity structure with two openings and a cavity structure with one opening according to some embodiments of the present disclosure.

FIG. 13 is a listening index curve comparison diagram of a cavity structure with two openings and a cavity structure with one opening according to some embodiments of the present disclosure. As shown in FIG. 13, compared to the cavity structure with one opening, the overall listening index of the cavity structure with the equal opening decreases. For the cavity structure with the equal opening ratio, the distances from the two openings to the external sound source are different, thus also resulting in different listening indexes. Referring to FIG. 12A, FIG. 12B, and FIG. 13, it can be seen that regardless of whether the opening is horizontal or vertical, the listening index of the leaking structure with the equal opening ratio is higher than that of the leaking structure with the equal opening. This is because the relative opening dimension S/S0 of the leaking structure with the equal opening ratio is twice smaller compared to that of the leaking structure with the equal opening, so the listening index is larger. Referring to FIG. 12A, FIG. 12B, and FIG. 13, it can also be seen that regardless of the leaking structure with the equal opening or the leaking structure with the equal opening ratio, the listening index of the leaking structure with horizontal openings is larger. This is because a distance from one of the openings in the leaking structure with horizontal openings to an external sound source is smaller than a distance between the two sound sources, so that the formed secondary sound source and the external sound source are closer to each other than the original two sound sources, and therefore the listening index is higher, thereby improving the sound leakage reduction effect. Therefore, in order to improve the sound leakage reduction effect, it is possible to make a distance from at least one of the openings to the external sound source smaller than the distance between the two sound sources.

In addition, as shown in FIG. 13, the cavity structure with two openings can better increase the resonance frequency of the air sound within the cavity structure compared to the cavity structure with one opening, resulting in a better listening index for the entire device in a high frequency band (e.g., sounds with frequencies near 10,000 Hz) compared to a cavity structure with only one opening. The high frequency band is a more sensitive frequency band for the human ear and therefore has a greater need for sound leakage reduction. Therefore, in order to improve the sound leakage reduction effect in the high frequency band, a cavity structure with more than one opening may be chosen.

Figure 15:
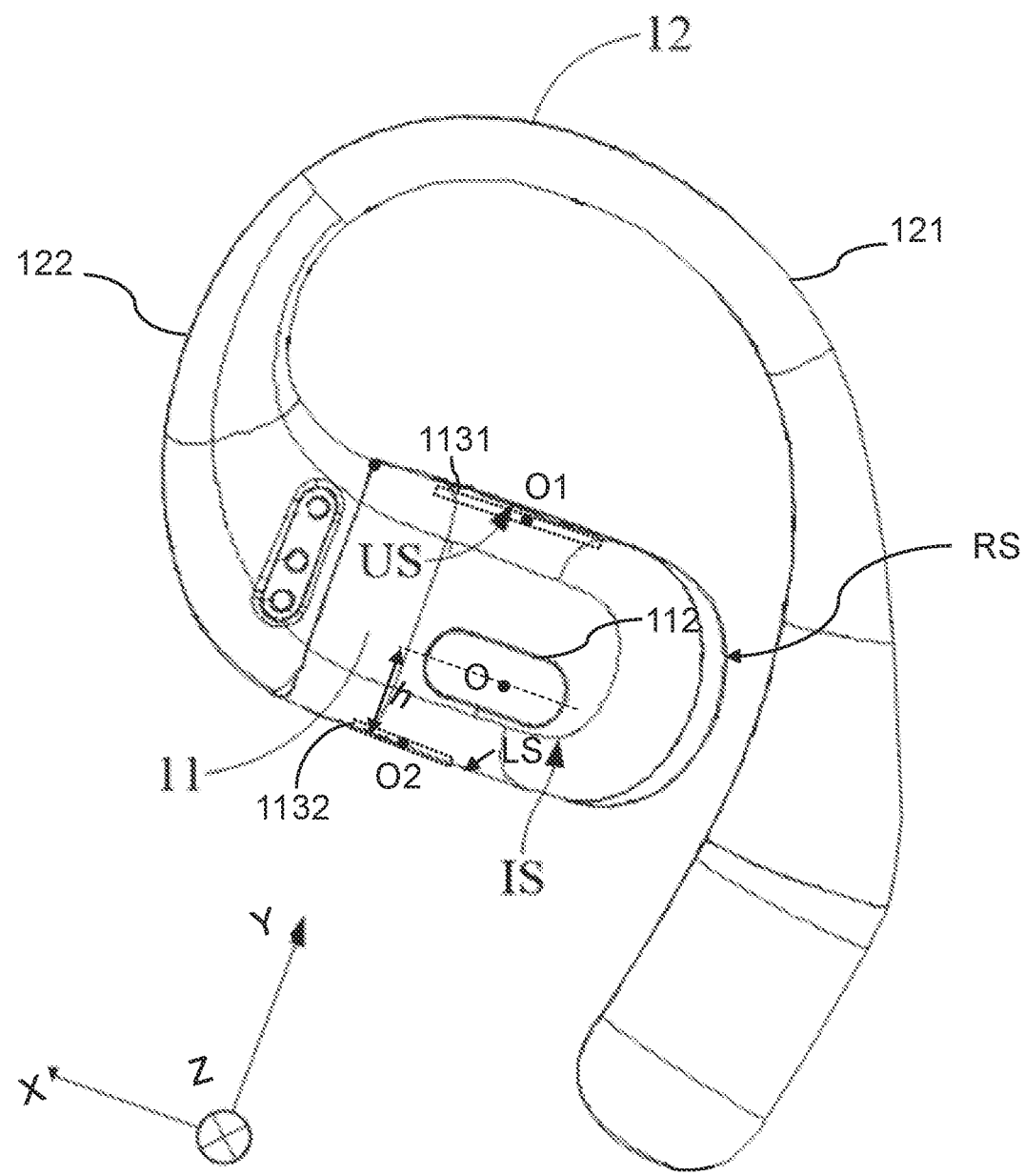
FIG. 15 is a schematic diagram illustrating a structure of a side of the earphone shown in FIG. 14 facing the ear.

FIG. 14 is a schematic diagram illustrating an exemplary wearing state of an open earphone according to some embodiments of the present disclosure. FIG. 15 is a schematic diagram illustrating a structure of a side of the earphone shown in FIG. 14 facing the ear.

The earphone 10 shown in FIG. 14 is similar in configuration to the earphone 10 shown in FIG. 7, for example, the ear hook 12 is an arc structure that fits into a junction of the user's head and the ear 100. The sound production component 11 (or the housing 111 of the sound production component 11) may have a connection end CE connected to the ear hook 12 and a free end FE not connected to the ear hook 12. When the earphone 10 is in the wearing state, a first portion 121 of the ear hook 12 (e.g., the hook portion of the ear hook 12) is hung between the user's ear (e.g., the helix 107) and the head. A second portion 122 of the ear hook 12 (e.g., the connection portion of the ear hook) extends toward a side of the auricle away from the head and connects to the connection end CE of the sound production component 11 to place the sound production component 11 at a position near but not blocking the ear canal. The earphone 10 shown in FIG. 14 has a similar structure to the earphone 10 shown in FIG. 7, and its main difference is that the sound production component 11 is inclined, and the housing 111 of the sound production component 11 is at least partially inserted into the inferior concha 102, for example, the free end FE of the sound production component 11 may extend into the inferior concha 102. The ear hook 12 and the sound production component 11 of such a structure are better adapted to the ear 100 of the user, and can increase the resistance of the earphone 10 to fall off from the ear 100, thus increasing the wearing stability of the earphone 10.

In some embodiments, in the wearing state, when viewed along the thickness direction Z, the connection end CE of the sound production component 11 is closer to the top of the head compared to the free end FE, so as to facilitate the free end FE to extend into the inferior concha. Based on this, an angle between the long-axis direction X and a direction where the sagittal axis of the human body is located may be between 15° and 60°. If the aforementioned angle is too small, it is easy to cause the free end FE to be unable to extend into the inferior concha, and make the sound outlet 112 on the sound production component 11 too far away from the ear canal; if the aforementioned angle is too large, it is also easy to cause the sound production component 11 to fail to extend into the inferior concha, and make the ear canal be blocked by the sound production component 11. In other words, such setting not only allows the sound production component 11 to extend into the inferior concha, but also allows the sound outlet 112 on the sound production component 11 to have a suitable distance from the ear canal, so that the user can hear more sounds produced by the sound production component 11 under the condition that the ear canal is not blocked.

In some embodiments, the sound production component 11 and the ear hook 12 may jointly clamp the aforementioned ear region from both front and rear sides of the ear region corresponding to the inferior concha, thereby increasing the resistance of the earphone 10 to dropping from the ear and improving the stability of the earphone 10 in the wearing state. For example, the free end FE of the sound production component 11 is pressed and held in the inferior concha in the thickness direction Z. As another example, the free end FE is pressed against the inferior concha in the long-axis direction X and in the short-axis direction Y.

In some embodiments, both ends of the second portion 122 of the ear hook 12 may be connected to the first portion 121 of the ear hook 12 and the connection end CE of the sound production component 11, respectively (as shown in FIG. 15). In some embodiments, the second portion 122 of the ear hook 12 may have a lowest point P and a highest point Q along the short-axis direction Y of the sound production component 11. When the earphone 10 is in the wearing state, in order to prevent the first pressure relief hole 1131 from being obscured by an ear structure (e.g., the helix or the tragus), a distance h1 between the center of the first pressure relief hole 1131 and the lowest point P along the long-axis direction X of the sound production component 11 may be 5.28 mm to 7.92 mm. In some embodiments, in order to enable the earphone to fit to the users ear when the user wears the earphone 10, a distance h2 between the center of the first pressure relief hole 1131 and the highest point Q along the long-axis direction X of the sound production component 11 may be 8.68 mm-13.02 mm. In some embodiments, when the user wears the earphone, a distance between the center of the first pressure relief hole 1131 and any point on the second portion 122 of the ear hook 12 along the long-axis direction X of the sound production component 11 is in a range of 5.28 mm to 14 mm. In some embodiments, the distance between the center of the first pressure relief hole 1131 and any point on the second portion 122 of the ear hook along the long-axis direction X of the sound production component 11 is in a range of 5.28 mm to 13.02 mm. In some embodiments, the distance between the center of the first pressure relief hole 1131 and any point on the second portion 122 of the ear hook along the long-axis direction X of the sound production component 11 is in a range of 6.58 mm to 12.02 mm. In some embodiments, the distance between the center of the first pressure relief hole 1131 and any point on the second portion 122 of the ear hook along the long-axis direction X of the sound production component 11 is in a range of 7.58 mm to 10.02 mm. In some embodiments, the distance between the center of the first pressure relief hole 1131 and any point on the second portion 122 of the ear hook along the long-axis direction X of the sound production component 11 is in a range of 8.58 mm to 9.02 mm.

As shown in FIG. 14, when the user wears the earphone 10, by setting the housing 111 of the sound production component 11 to be at least partially inserted into the inferior concha 102, a cavity enclosed by the inner side surface IS of the sound production component 11 and the inferior concha 102 together may be regarded as the cavity structure 41 as shown in FIG. 10. A gap formed between the inner side surface IS and the inferior concha (e.g., a first leaking structure UC formed between the inner side surface IS and the inferior concha close to the top of the head, and a second leaking structure LC formed between the inner side surface IS and the ear close to the ear canal) may be regarded as the leaking structure 42 as shown in FIG. 10. The sound outlet 112 provided on the inner side surface IS may be regarded as a point sound source inside the cavity structure 41 as shown in FIG. 10, and the pressure relief hole 113 (e.g., the first pressure relief hole 1131 and the second pressure relief hole 1132) provided on the other side surfaces (e.g., the upper side surface US and/or the lower side surface LS) of the sound production component 11 may be regarded as a point sound source outside the cavity structure 41 as shown in FIG. 10. Thus, according to the relevant depictions of FIG. 10-FIG. 13, when the earphone 10 is in the wearing state in a manner in which it is at least partially inserted into the inferior concha, i.e., when it is worn in the manner shown in FIG. 14, in terms of the listening effect, most of the sound radiated from the sound outlet 112 may reach the ear canal by the direct emission or reflection manner, which may result in a significant increase in the volume of the sound reaching the ear canal, especially the listening volume of the low and middle frequencies. At the same time, only a relatively small portion of the inversion sound radiated from the pressure relief hole 113 (e.g., the first pressure relief hole 1131 and the second pressure relief hole 1132) may enter the inferior concha through the slit (the first leaking structure UC and the second leaking structure LC), which has a weak inversion cancellation effect with the sound outlet 112, thereby making the listening volume of the ear canal significantly improved. In terms of the sound leakage effect, the sound outlet 112 may output sound to the outside world through the slit and the sound may cancel out the sound generated by the pressure relief hole 113 (e.g., the first pressure relief hole 1131 and the second pressure relief hole 1132) in the far-field, thus ensuring the sound leakage reduction effect.

In some embodiments, to avoid the sound output from the first pressure relief hole 1131 and the second pressure relief hole 1132 affecting the volume of the sound output from the sound outlet 112 at the listening position, the first pressure relief hole 1131 and the second pressure relief hole 1132 should be located as far away from the sound outlet 112 as possible. For example, the center of the sound outlet 112 may be located on or near a perpendicular bisection-plane of a line segment connecting the center of the first pressure relief hole 1131 and the center of the second pressure relief hole 1132. In some embodiments, the center of the sound outlet 112 may be 0 mm to 2 mm from the perpendicular bisection-plane of a line segment connecting the center of the first pressure relief hole 1131 and the center of the second pressure relief hole 1132. In some embodiments, the center of the sound outlet 112 may be 0 mm to 1 mm from the perpendicular bisection-plane of a line segment connecting the center of the first pressure relief hole 1131 and the center of the second pressure relief hole 1132. In some embodiments, the center of the sound outlet 112 may be 0 mm to 0.5 mm from the perpendicular bisection-plane of a line segment connecting the center of the first pressure relief hole 1131 and the center of the second pressure relief hole 1132.

In some embodiments, a relationship between a distance (which may also be referred to as a first distance) between the center O1 of the first pressure relief hole 1131 and the center O of the sound outlet 112 and a distance (which may also be referred to as a second distance) between the center O2 of the second pressure relief hole 1132 and the center O of the sound outlet 112 may be determined such that the center O of the sound outlet 112 is approximately on the perpendicular bisection-plane of the connection line O102. In some embodiments, a difference between the first distance and the second distance is less than 10%. In some embodiments, the difference between the first distance and the second distance is less than 8%. In some embodiments, the difference between the first distance and the second distance is less than 5%. In some embodiments, the difference between the first distance and the second distance is less than 2%.

In some embodiments, in order to avoid the sound waves from the pressure relief holes (e.g., the first pressure relief hole 1131 and the second pressure relief hole 1132) from cancelling out in the near field with the sound waves from the sound outlet 112 and affecting the user's listening quality, a distance between the first pressure relief hole 1131 and the second pressure relief hole 1132 and the sound outlet 112 cannot be too small. In some embodiments, a distance between the center O1 of the first pressure relief hole 1131 and the center O of the sound outlet 112 may be in a range of 4 mm-15.11 mm. In some embodiments, the distance between the center O1 of the first pressure relief hole 1131 and the center O of the sound outlet 112 may be in a range of 4 mm-15 mm. In some embodiments, the distance between the center O1 of the first pressure relief hole 1131 and the center O of the sound outlet 112 may be in a range of 5.12 mm-15.11 mm. In some embodiments, the distance between the center O1 of the first pressure relief hole 1131 and the center O of the sound outlet 112 may be in a range of 5 mm-14 mm. In some embodiments, the distance between the center O1 of the first pressure relief hole 1131 and the center O of the sound outlet 112 may be in a range of 6 mm-13 mm. In some embodiments, the distance between the center O1 of the first pressure relief hole 1131 and the center O of the sound outlet 112 may be in a range of 7 mm-12 mm. In some embodiments, the distance between the center O1 of the first pressure relief hole 1131 and the center O of the sound outlet 112 may be in a range of 8 mm-10 mm.

In some embodiments, a distance between the center O2 of the second pressure relief hole 1132 and the center O of the sound outlet 112 may be in a range of 4 mm-16.1 mm. In some embodiments, the distance between the center O2 of the second pressure relief hole 1132 and the center O of the sound outlet 112 may be in a range of 4 mm-15 mm. In some embodiments, the distance between the center O2 of the second pressure relief hole 1132 and the center O of the sound outlet 112 may be in a range of 5 mm-14 mm. In some embodiments, the distance between the center O2 of the second pressure relief hole 1132 and the center O of the sound outlet 112 may be in a range of 5.12 mm-16.1 mm. In some embodiments, the distance between the center O2 of the second pressure relief hole 1132 and the center O of the sound outlet 112 may be in a range of 6 mm-13 mm. In some embodiments, the distance between the center O2 of the second pressure relief hole 1132 and the center O of the sound outlet 112 may be in a range of 7 mm-12 mm. In some embodiments, the distance between the center O2 of the second pressure relief hole 1132 and the center O of the sound outlet 112 may be in a range of 8 mm-10 mm.

In some embodiments, in order to reduce the effect of the pressure relief holes on the sound output by the sound outlet, the first pressure relief hole 1131 and the second pressure relief hole 1132 are both as far away from the sound outlet 112 as possible. Therefore, in order to make both the first pressure relief hole 1131 and the second pressure relief hole 1132 farther away from the sound output hole 112, a ratio of a distance between the center O of the sound outlet 112 and the center O1 of the first pressure relief hole 1131 to the distance between the center O of the sound outlet 112 and the center O2 of the second pressure relief hole 1132 is in a range of 0.9 to 1.1. In some embodiments, the ratio of the distance between the center O of the sound outlet 112 and the center O1 of the first pressure relief hole 1131 to the distance between the center O of the sound outlet 112 and the center O2 of the second pressure relief hole 1132 is in a range of 0.92-1.08. In some embodiments, the ratio of the distance between the center O of the sound outlet 112 and the center O1 of the first pressure relief hole 1131 to the distance between the center O of the sound outlet 112 and the center O2 of the second pressure relief hole 1132 is in a range of 0.94-1.06. In some embodiments, the ratio of the distance between the center O of the sound outlet 112 and the center O1 of the first pressure relief hole 1131 to the distance between the center O of the sound outlet 112 and the center O2 of the second pressure relief hole 1132 is in a range of 0.96-1.04.

In some embodiments, in order to further avoid the sound emitted from the second pressure relief hole 1132 from cancelling out with the sound emitted from the sound outlet 112 in the ear canal (i.e., the listening position) and reducing the listening volume, the area of the second pressure relief hole 1132 may be reduced to reduce the intensity of the sound emitted from the second pressure relief hole 1132 and transmitted to the ear canal, at which point the area of the second pressure relief hole 1132 may be smaller than the area of the first pressure relief hole 1131 (as shown in FIG. 17).

In some embodiments, in order to maximize the distance between the first pressure relief hole 1131 or the second pressure relief hole 1132 and the sound outlet 112, an angle between a connection line O10 between the center O1 of the first pressure relief hole 1131 and the center O of the sound outlet 112 and a connection line O20 between the center O2 of the second pressure relief hole 1132 and the center O of the sound outlet 112 may be reduced. In some embodiments, the angle between the connection line O10 and the connection line O20 is in a range of 46.40° to 114.04°. In some embodiments, the angle between the connection line O10 and the connection line O20 is in a range of 46.40°-90.40°. In some embodiments, the angle between the connection line O10 and the connection line O20 is in a range of 46.40°-70.04°. In some embodiments, the angle between the connection line O10 and the connection line O20 is in a range of 46.40°-60.04°.

In some embodiments, an angle between a connection line O102 between the center O1 of the first pressure relief hole 1131 and the center O2 of the second pressure relief hole 1132 and the connection line O20 is in a range of 19.72°-101.16°.

In some embodiments, the angle range between the connection line O102 and the connection line O20 is a range of 19.710°-97.75°.

Figure 16:
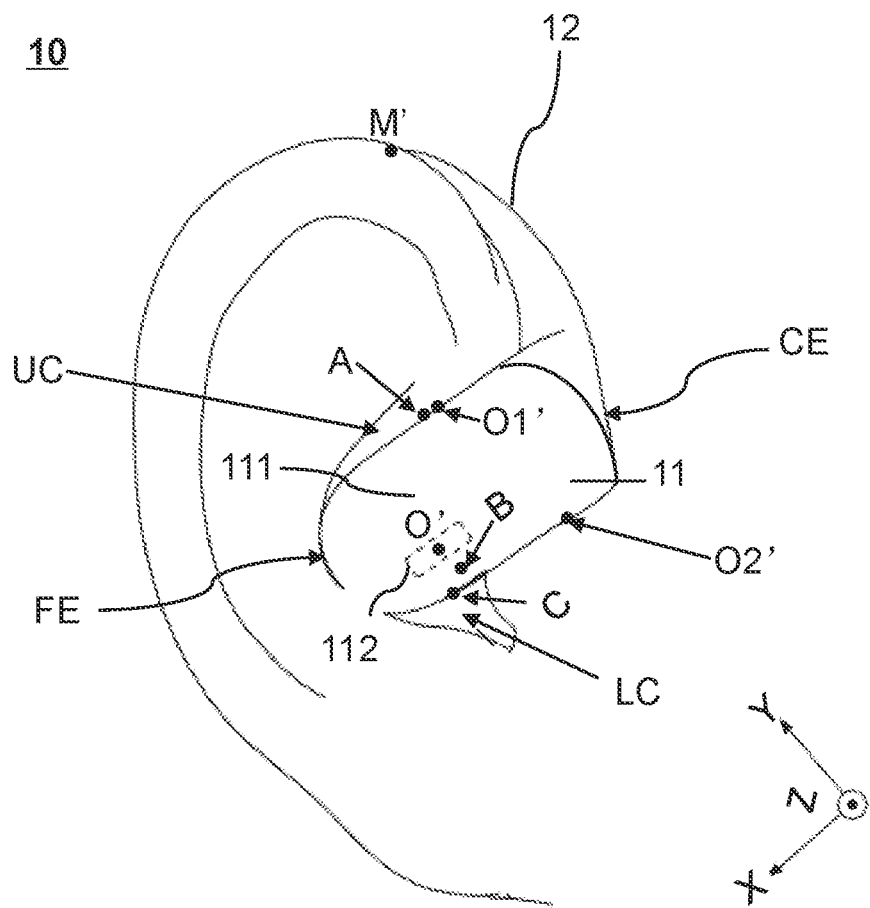
FIG. 16 is a schematic diagram illustrating a projection of an open earphone on a sagittal plane when the earphone is in a wearing state according to some embodiments of the present disclosure.

FIG. 16 is a schematic diagram illustrating a projection of an open earphone on a sagittal plane when the earphone is in a wearing state according to some embodiments of the present disclosure.

In some embodiments, referring to FIG. 14 and FIG. 16, in order to make the sound production component 11 stably worn on the user's ear, and to facilitate the construction of the cavity structure as shown in FIG. 10, and to make the cavity structure have at least two leaking structures, the free end FE may be pressed against the inferior concha in the long-axis direction X and the short-axis direction Y. At this time, the inner side surface IS of the sound production component 11 is inclined with respect to the sagittal plane, and at this time at least a first leaking structure UC close to the top of the head (i.e., a gap between the inferior concha and the upper boundary of the inner side surface IS) and a second leaking structure LC close to the ear canal (i.e., a gap between the inferior concha and the lower boundary of the inner side surface IS) exist between the inner side surface IS of the sound production component and the inferior concha. As a result, the listening volume, especially in the low and middle frequencies, can be increased, while still retaining the far-field sound leakage cancellation effect, thus enhancing the acoustic output performance of the earphone 10.

In some embodiments, when the earphone 10 is worn in the manner shown in FIG. 14, the first leaking structure UC and the second leaking structure LC formed between the inner side surface IS of the sound production component and the inferior concha have a certain scale in the long-axis direction X and in the thickness direction Z. In some embodiments, in order to facilitate understanding of the position of the first leaking structure UC and the second leaking structure LC, when the earphone 10 is in the wearing state, a midpoint of two points formed by intersecting the upper/lower boundary of the inner side surface IS with the ear (e.g., a side wall of the inferior concha, a helix foot), respectively, may be taken as a position reference point of the first leaking structure UC/the second leaking structure LC. In some embodiments, in order to facilitate understanding of the position of the first leaking structure UC and the second leaking structure LC, when the earphone 10 is in the wearing state, the midpoint of the upper boundary of the inner side surface IS may be taken as a position reference point of the first leaking structure UC, and a trisection point of the lower boundary of the inner side surface IS close to the free end FE (hereinafter referred to as a ⅓ point of the lower boundary of the inner side surface IS) as a position reference point of the second leaking structure LC.

It should be noted that when the junction between the inner side surface IS and the upper side surface US and/or the lower side surface LS is curved, a midpoint of an upper boundary of the inner side surface IS of the sound production component 11 may be selected by the following exemplary method. A projection contour of the sound production component 11 along the thickness direction Z may be determined; two first positioning points on the sound production component 11 that have the maximum vertical distance along the long-axis direction X from a short-axis center plane of the magnetic circuit assembly (e.g., the magnetic circuit assembly 1164 described below) of the transducer and are closest to the upper side surface US may be determined; a projection contour of the sound production component 11 between the two first positioning points may be determined as a projection line of the upper boundary of the inner side surface IS; a line segment on the sound production component 11 that is closest to the inner side surface IS and whose projection coincides exactly with the projection line of the upper boundary of the inner side surface IS may be determined as the upper boundary of the inner side surface IS. In some alternative embodiments, when one or more side surfaces (e.g., the inner side surface IS, the upper side surface US, and/or the lower side surface LS) of the sound production component 11 are curved, an intersection line between a tangent plane parallel to the X-Y plane (a plane formed by the long-axis direction X and the short-axis direction Y) of the inner side surface IS and a tangent plane parallel to the Z-X plane (a plane formed by the thickness direction Z and the long-axis direction X) of the upper side surface US may be determined as the upper boundary of the inner side surface IS. The midpoint of the upper boundary of the inner side surface IS may be an intersection point of the upper boundary of the inner side surface IS and the short-axis center plane of the magnetic circuit assembly. The short-axis center plane of the magnetic circuit assembly is a plane parallel to the short-axis direction Y and the thickness direction Z of the sound production component 11 and passing through a center axis of the magnetic circuit assembly.

Similarly, the ⅓ point of the lower boundary of the inner side surface IS of the sound production component 11 may be selected by the following exemplary method. A projection contour of the sound production component 11 along the thickness direction Z may be determined; two second positioning points on the sound production component 11 that have the maximum vertical distance along the long-axis direction X from the short-axis center plane of the magnetic circuit assembly and are closest to the lower side surface LS may be determined; a projection contour of the sound production component 11 between the two second positioning points may be determined as a projection line of the lower boundary of the inner side surface IS; a line segment on the sound production component 11 that is closest to the inner side surface IS and whose projection coincides exactly with the projection line of the lower boundary of the inner side surface IS may be determined as the lower boundary of the inner side surface IS. In some alternative embodiments, when one or more side surfaces (e.g., the inner side surface IS, the upper side surface US, and/or the lower side surface LS) of the sound production component 11 are curved, an intersection line between a tangent plane parallel to the Y-X plane (a plane formed by the short-axis direction Y and the long-axis direction X) of the inner side surface IS and a tangent plane parallel to the X-Z plane (a plane formed by the thickness direction Z and the long-axis direction X) of the lower side surface LS may be determined as the lower boundary of the inner side surface IS. The ⅓ point of the lower boundary of the inner side surface IS may be an intersection point of the lower boundary of the inner side surface IS with a trisection plane of the magnetic circuit assembly close to the free end FE. The trisection plane of the magnetic circuit assembly close to the free end FE is a plane parallel to the short-axis direction Y and the thickness direction Z of the sound production component 11 and passing through a trisection point of the long-axis of the magnetic circuit assembly close to the free end FE.

Merely by way of example, the present disclosure uses the midpoint of the upper boundary of the inner side surface IS and the ⅓ point of the lower boundary of the inner side surface IS as position reference points of the first leaking structure UC and the second leaking structure LC, respectively. It should be known that the selected midpoint of the upper boundary of the inner side surface IS and the ⅓ point of the lower boundary of the inner side surface IS are only used as exemplary reference points to describe the positions of the first leaking structure UC and the second leaking structure LC. In some embodiments, other reference points may also be selected to describe the positions of the first leaking structure UC and the second leaking structure LC.

For example, due to the variability of different users' ears, the first leaking structure UC/the second leaking structure LC formed when the earphone 10 is worn is a gap with a gradually changing width, in this case, the reference position of the first leaking structure UC/the second leaking structure LC may be a position on the upper boundary/the lower boundary of the inner side surface IS near a region with the largest gap width. For example, the ⅓ point of the upper boundary of the inner side surface IS near the free end FE may be used as the position of the first leaking structure UC, and the midpoint of the lower boundary of the inner side surface IS may be used as the position of the second leaking structure LC.

In some embodiments, referring to FIG. 14-FIG. 16, in order to enable the projection of the sound outlet 112 on the sagittal plane when the earphone 10 is in the wearing state to be partially or fully located in the inferior concha region and enhance the sound intensity of the sound outlet 112 in the ear canal (i.e., the listening position), the sound outlet 112 may be set as close to the ear canal as possible. In some embodiments, a distance h from the center O of the sound outlet 112 to the lower side surface LS of the sound production component 11 along the Y-direction is in a range of 4.05 mm to 6.05 mm. In some embodiments, the distance h from the center O of the sound outlet 112 to the lower side surface LS of the sound production component 11 along the Y-direction is in a range of 4.50 mm to 5.85 mm. In some embodiments, the distance h from the center O of the sound outlet 112 to the lower side surface LS of the sound production component 11 along the Y-direction is in a range of 4.80 mm to 5.50 mm. In some embodiments, the distance h from the center O of the sound outlet 112 to the lower side surface LS of the sound production component 11 along the Y-direction is in a range of 5.20 mm to 5.55 mm.

In some embodiments, in order to ensure that the sound production component 11 is at least partially inserted into the inferior concha, the long-axis dimension of the sound production component 11 should not be too long. In order to ensure that the sound production component 11 is at least partially inserted into the inferior concha, a distance from the center O of the sound outlet 112 to the rear side surface RS of the sound production component 11 along the X-direction should not be too small, otherwise it may result in all or part of the area of the sound outlet being obscured due to the abutment of the free end FE against the wall surface of the inferior concha, making the effective area of the sound outlet reduced. Therefore, in some embodiments, a distance from the center O of the sound outlet 112 to the rear side surface RS of the sound production component 11 along the X-direction is in a range of 8.15 mm to 12.25 mm. In some embodiments, the distance from the center O of the sound outlet 112 to the rear side surface RS of the sound production component 11 along the X-direction is in a range of 8.50 mm to 12.00 mm. In some embodiments, the distance from the center O of the sound outlet 112 to the rear side surface RS of the sound production component 11 along the X-direction is in a range of 8.85 mm to 11.65 mm. In some embodiments, the distance from the center O of the sound outlet 112 to the rear side surface RS of the sound production component 11 along the X-direction is in a range of 9.25 mm to 11.15 mm. In some embodiments, the distance from the center O of the sound outlet 112 to the rear side surface RS of the sound production component 11 along the X-direction is in a range of 9.60 mm to 10.80 mm.

In some embodiments, as shown in FIG. 16, the projection of the upper boundary of the inner side surface IS on the sagittal plane may coincide with the projection of the upper side surface US on the sagittal plane, and the projection of the lower boundary of the inner side surface IS on the sagittal plane may coincide with the projection of the lower side surface LS on the sagittal plane. The projection of the position reference point of the first leaking structure UC (i.e., the midpoint of the upper boundary of the inner side surface IS) on the sagittal plane is point A. The projection of the position reference point of the second leaking structure LC (i.e., the ⅓ point of the lower boundary of the inner side surface IS) on the sagittal plane is point C. The projection of the center O of the sound outlet 112 on the sagittal plane is a point O', the projection of the center O1 of the first pressure relief hole 1131 on the sagittal plane is a point O1', the projection of the center O2 of the second pressure relief hole 1132 on the sagittal plane is a point O2'.

As shown in FIG. 16, in some embodiments, in some embodiments, in the wearing state, the projection of the sound production component 11 of the earphone 10 on the sagittal plane may at least partially cover the ear canal of the user, but the ear canal can communicate with the outside world through the inferior concha to achieve the liberation of both ears of the user. In some embodiments, since the sound outlet 112 outputs sound to the outside world through the first leak structure UC and the second leak structure LC to cancel the sound output from the first pressure relief hole 1131 and/or the second pressure relief hole 1132 out in the far field, and in order to ensure the sound leakage cancellation effect, distances from the sound outlet 112 and the first pressure relief hole 1131/the second pressure relief hole 1132 to the first leak structure UC and the second leak structure LC needs to be reasonably designed. In some embodiments, in order to ensure the sound intensity at the ear canal, it is necessary to make the sound outlet 112 closer to the ear canal when the earphone is in the wearing state. Therefore, the sound outlet 112 may be set closer to the lower side surface LS than the upper side surface US, i.e., the sound outlet 112 may be set away from the first leak structure UC. Considering also that the larger the distance between the sound outlet 112 and the first leak structure UC is, the larger the width dimension needed for the sound production component 11 may be. At this time, the larger the volume V of the cavity structure formed between the sound production component 11 and the inferior concha is, accordingly, the smaller the whole listening index (in the full frequency band range) of the earphone 10 may be. This is because due to the influence of the aero-acoustic resonance within the cavity structure, at the resonance frequency of the cavity structure, the cavity structure produces the aero-acoustic resonance and radiates sound whose volume is far greater than the sound of the pressure relief hole, resulting in a significant increase in sound leakage, which in turn makes the listening index significantly smaller around this resonance frequency.

Thus, in some embodiments, under the premise that the sound production component 11 is at least partially inserted into the inferior concha, in order to enable the sound outlet 112 to be set close to the ear canal, and to make the cavity structure have a suitable volume V, so that the sound collection effect in the ear canal is relatively good, the distance between the projection point O' of the center O of the sound outlet 112 on the sagittal plane and the projection point A of the midpoint of the upper boundary of the inner side surface IS on the sagittal plane is in a range of 10.0 mm to 15.2 mm. In some embodiments, the distance between the projection point O' of the center O of the sound outlet 112 on the sagittal plane and the projection point A of the midpoint of the upper boundary of the inner side surface IS on the sagittal plane is in a range of 11.0 mm to 14.2 mm. In some embodiments, the distance between the projection point O' of the center O of the sound outlet 112 on the sagittal plane and the projection point A of the midpoint of the upper boundary of the inner side surface IS on the sagittal plane is in a range of 12.0 mm to 14.7 mm. In some embodiments, the distance between the projection point O' of the center O of the sound outlet 112 on the sagittal plane and the projection point A of the midpoint of the upper boundary of the inner side surface IS on the sagittal plane is in a range of 12.5 mm to 14.2 mm. In some embodiments, the distance between the projection point O' of the center O of the sound outlet 112 on the sagittal plane and the projection point A of the midpoint of the upper boundary of the inner side surface IS on the sagittal plane is in a range of 13.0 mm to 13.7 mm.

In some embodiments, the leakage sound from the sound outlet 112 via the first leak structure UC is equivalent to generating a secondary sound source at the first leak structure UC. In order to ensure the cancellation effect between the sound output from the first pressure relief hole 1131 and the leakage sound from the sound outlet 112 via the first leak structure UC in the far field, the first pressure relief hole 1131 may be provided close to the first leak structure UC. In some embodiments, the first pressure relief hole 1131 may be set closer to the first leak structure UC compared to the sound outlet 112, which means that the distance between the center O of the sound outlet 112 and the midpoint of the upper boundary of the inner side surface IS is greater than the distance between the center O1 of the first pressure relief hole 1131 and the midpoint of the upper boundary of the inner side surface IS, so as to achieve better sound leakage cancellation while ensuring the sound intensity at the ear canal. In some embodiments, a ratio of a distance between the center O of the sound outlet 112 and the midpoint of the upper boundary of the inner side surface IS to a distance between the center O1 of the first pressure relief hole 1131 and the midpoint of the upper boundary of the inner side surface IS is in a range of 1.3 to 2.1. In some embodiments, the ratio of the distance between the center O of the sound outlet 112 and the midpoint of the upper boundary of the inner side surface IS to the distance between the center O1 of the first pressure relief hole 1131 and the midpoint of the upper boundary of the inner side surface IS is in a range of 1.4 to 2.0. In some embodiments, the ratio of the distance between the center O of the sound outlet 112 and the midpoint of the upper boundary of the inner side surface IS to the distance between the center O1 of the first pressure relief hole 1131 and the midpoint of the upper boundary of the inner side surface IS is in a range of 1.5-1.9. In some embodiments, the ratio of the distance between the center O of the sound outlet 112 and the midpoint of the upper boundary of the inner side surface IS to the distance between the center O1 of the first pressure relief hole 1131 and the midpoint of the upper boundary of the inner side surface IS is in a range of 1.6-1.8.

In some embodiments, a projection point O1' of the center O1 of the first pressure relief hole 1131 on the sagittal plane and the projection point A of the midpoint of the upper boundary of the inner side surface IS on the sagittal plane may substantially coincide. In some embodiments, a distance between the projection point O1' of the center O1 of the first pressure relief hole 1131 on the sagittal plane and the projection point A of the midpoint of the upper boundary of the inner side surface IS on the sagittal plane is not greater than 2 mm. In some embodiments, the distance between the projection point O1' of the center O1 of the first pressure relief hole 1131 on the sagittal plane and the projection point A of the midpoint of the upper boundary of the inner side surface IS on the sagittal plane is not greater than 1 mm. In some embodiments, the distance between the projection point O1' of the center O1 of the first pressure relief hole 1131 on the sagittal plane and the projection point A of the midpoint of the upper boundary of the inner side surface IS on the sagittal plane is not greater than 0.5 mm.

In some embodiments, the greater a distance between the projection point O' of the center O of the sound outlet 112 on the sagittal plane and a projection point C of the ⅓ point of the lower boundary of the inner side surface IS on the sagittal plane is, the larger the volume V of the cavity structure is. Therefore, under the premise that the sound production component 11 is at least partially inserted into the inferior concha, in order to enable the sound outlet 112 to be set close to the ear canal, and to make the cavity structure have a suitable volume V, so that the sound collection effect in the ear canal is relatively good, in some embodiments, the distance between the projection point O' of the center O of the sound outlet 112 on the sagittal plane and the projection point C of the ⅓ point of the lower boundary of the inner side surface IS on the sagittal plane is in a range of 3.5 mm to 5.6 mm. In some embodiments, the distance between the projection point O' of the center O of the sound outlet 112 on the sagittal plane and the projection point C of the ⅓ point of the lower boundary of the inner side surface IS on the sagittal plane is in a range of 3.9 mm to 5.2 mm. In some embodiments, the distance between the projection point O' of the center O of the sound outlet 112 on the sagittal plane and the projection point C of the ⅓ point of the lower boundary of the inner side surface IS on the sagittal plane is in a range of 4.3 mm to 4.8 mm. In some embodiments, the distance between the projection point O' of the center O of the sound outlet 112 on the sagittal plane and the projection point C of the ⅓ point of the lower boundary of the inner side surface IS on the sagittal plane is in a range of 4.5 mm to 4.6 mm.

In some embodiments, in order to increase the distance between the second pressure relief hole 1132 and the sound outlet 112 to reduce cancellation effect between the sound of the second pressure relief hole 1132 passing through the second leak structure LC into the cavity structure and the sound of the sound outlet 112, a distance between a projection point O2' of the center O2 of the second pressure relief hole 1132 on the sagittal plane and the projection point C of the ⅓ point of the lower boundary of the inner side surface IS on the sagittal plane is in a range of 8.16 mm to 12.24 mm. In some embodiments, the distance between the projection point O2' of the center O2 of the second pressure relief hole 1132 on the sagittal plane and the projection point C of the ⅓ point of the lower boundary of the inner side surface IS on the sagittal plane is in a range of 9.16 mm to 11.24 mm. In some embodiments, the distance between a projection point O2' of the center O2 of the second pressure relief hole 1132 on the sagittal plane and the projection point C of the ⅓ point of the lower boundary of the inner side surface IS on the sagittal plane is in a range of 9.66 mm to 10.74 mm.

In some embodiments, the leakage sound from the sound outlet 112 via the second leak structure LC is equivalent to generating a secondary sound source at the second leak structure LC. Considering that the distance between the second pressure relief hole 1132 and the ear canal opening is relatively close, in order to reduce the cancellation degree between the sound of the second pressure relief hole 1132 passing through the second leak structure LC into the cavity structure and the sound from the sound outlet 112 in the ear canal, a distance between the second pressure relief hole 1132 and the ⅓ point of the lower boundary of the inner side surface IS (i.e., the second leak structure LC) should not be too small. At the same time, in order to ensure the sound output from the second pressure relief hole 1132 and the leakage sound from the sound outlet 112 via the second leak structure LC in the far field, the distance between the second pressure relief hole 1132 and the ⅓ point of the lower boundary of the inner side surface IS (i.e., the second leak structure LC) should not be too large. In some embodiments, a ratio of the distance between the center O of the sound outlet 112 and the ⅓ point of the lower boundary of the inner side surface IS (i.e., the second leak structure LC) to a distance between the center O2 of the second pressure relief hole 1132 and the ⅓ point of the lower boundary of the inner side surface IS (i.e., the second leak structure LC) may be in a range of 0.65 to 1.05. In some embodiments, a ratio of a distance between the center O of the sound outlet 112 and the ⅓ point of the lower boundary of the inner side surface IS to a distance between the center O2 of the second pressure relief hole 1132 and the ⅓ point of the lower boundary of the inner side surface IS is in a range of 0.75-1. In some embodiments, the ratio of the distance between the center O of the sound outlet 112 and the ⅓ point of the lower boundary of the inner side surface IS to the distance between the center O2 of the second pressure relief hole 1132 and the ⅓ point of the lower boundary of the inner side surface IS is in a range of 0.8-0.9. In some embodiments, in order to reduce the cancellation degree between the sound of the second pressure relief hole 1132 passing through the second leak structure LC into the cavity structure and the sound from the sound outlet 112 in the ear canal, while ensuring the cancellation effect between the sound output from the second pressure relief hole 1132 and the leakage sound from the sound outlet 112 via the second leak structure LC in the far field, the ratio of the distance between the center O of the sound outlet 112 and the ⅓ point of the lower boundary of the inner side surface IS to the distance between the center O2 of the second pressure relief hole 1132 and the ⅓ point of the lower boundary of the inner side surface IS is in a range of 0.82-0.88.

In some embodiments, a position relationship among the center O of the sound outlet 112, the ⅓ point of the lower boundary of the inner side surface IS, and the center O2 of the second pressure relief hole 1132 may also be characterized by a ratio of a distance between the projection point O' of the center O of the sound outlet 112 on the sagittal plane and the projection point C of the ⅓ point of the lower boundary of the inner side surface on the sagittal plane to a distance between the projection point O2' of the center O2 of the second pressure relief hole 1132 on the sagittal plane and the projection point C of the ⅓ point of the lower boundary of the inner side surface on the sagittal plane. In some embodiments, the ratio of the distance between the projection point O' of the center O of the sound outlet 112 on the sagittal plane and the projection point C of the ⅓ point of the lower boundary of the inner side surface on the sagittal plane to the distance between the projection point O2' of the center O2 of the second pressure relief hole 1132 on the sagittal plane and the projection point C of the ⅓ point of the lower boundary of the inner side surface on the sagittal plane may be in a range of 0.28-0.68. In some embodiments, the ratio of the distance between the projection point O' of the center O of the sound outlet 112 on the sagittal plane and the projection point C of the ⅓ point of the lower boundary of the inner side surface on the sagittal plane to the distance between the projection point O2' of the center O2 of the second pressure relief hole 1132 on the sagittal plane and the projection point C of the ⅓ point of the lower boundary of the inner side surface on the sagittal plane may be in a range of 0.33-0.59. In some embodiments, the ratio of the distance between the projection point O' of the center O of the sound outlet 112 on the sagittal plane and the projection point C of the ⅓ point of the lower boundary of the inner side surface on the sagittal plane to the distance between the projection point O2' of the center O2 of the second pressure relief hole 1132 on the sagittal plane and the projection point C of the ⅓ point of the lower boundary of the inner side surface on the sagittal plane may be in a range of 0.38-0.51. In some embodiments, the ratio of the distance between the projection point O' of the center O of the sound outlet 112 on the sagittal plane and the projection point C of the ⅓ point of the lower boundary of the inner side surface on the sagittal plane to the distance between the projection point O2' of the center O2 of the second pressure relief hole 1132 on the sagittal plane and the projection point C of the ⅓ point of the lower boundary of the inner side surface on the sagittal plane may be in a range of 0.41-0.48.

In some embodiments, due to the presence of the tragus near the ear canal opening, the sound outlet 112 is easily obscured by the tragus. In this case, in order to keep the sound outlet 112 as close to the ear canal as possible and unobstructed, the sound outlet 112 should be as far as possible from the center of the ear canal opening. In some embodiments, for purposes of description, a position relationship between a particular position (e.g., the center O of the sound outlet 112) and the center of the ear canal opening may be characterized by a distance between a projection point of that position (e.g., the center O of the sound outlet 112) on the sagittal plane and a centroid of the projection of the ear canal opening on the sagittal plane. For example, in some embodiments, a distance between the projection point O' of the center of the sound outlet 112 on the sagittal plane and the centroid B of the projection of the ear canal opening on the sagittal plane is in a range of 2.2 mm to 3.8 mm. In some embodiments, the distance between the projection point O' of the center of the sound outlet 112 on the sagittal plane and the centroid B of the projection of the ear canal opening on the sagittal plane is in a range of 2.4 mm to 3.6 mm. In some embodiments, the distance between the projection point O' of the center of the sound outlet 112 on the sagittal plane and the centroid B of the projection of the ear canal opening on the sagittal plane is in a range of 2.6 mm to 3.4 mm. In some embodiments, the distance between the projection point O' of the center of the sound outlet 112 on the sagittal plane and the centroid B of the projection of the ear canal opening on the sagittal plane is in a range of 2.8 mm to 3.2 mm. It should be noted that the shape of the projection of the ear canal opening on the sagittal plane may be approximated as an ellipse, and correspondingly, the centroid of the projection of the ear canal opening on the sagittal plane may be a geometric center of the ellipse.

In some embodiments, in order to ensure that the sound production component 11 extends into the inferior concha and that a suitable gap (forming the opening of the cavity structure) exists between the upper boundary of the inner side surface IS and the inferior concha, a distance between the projection point A of the midpoint of the upper boundary of the inner side surface IS on the sagittal plane and the centroid B of the projection of the ear canal opening on the sagittal plane is in a range of 12 mm to 18 mm, and a distance between the projection point O2' of the center of the second pressure relief hole on the sagittal plane and the centroid B of the projection of the ear canal opening on the sagittal plane is in a range of 6.88 mm to 10.32 mm. In some embodiments, the distance between the projection point A of the midpoint of the upper boundary of the inner side surface IS on the sagittal plane and the centroid B of the projection of the ear canal opening on the sagittal plane is in a range of 14 mm to 16 mm, and the distance between the projection point O2' of the center of the second pressure relief hole on the sagittal plane and the centroid B of the projection of the ear canal opening on the sagittal plane is in a range of 7.88 mm to 9.32 mm. In some embodiments, the distance between the projection point A of the midpoint of the upper boundary of the inner side surface IS on the sagittal plane and the centroid B of the projection of the ear canal opening on the sagittal plane is in a range of 14.5 mm to 15.5 mm, and the distance between the projection point O2' of the center of the second pressure relief hole on the sagittal plane and the centroid B of the projection of the ear canal opening on the sagittal plane is in a range of 7.88 mm to 8.32 mm.

In some embodiments, in order to ensure that the sound production component 11 extends into the inferior concha and that a suitable gap (forming the opening of the cavity structure) exists between the upper boundary of the inner side surface IS and the inferior concha, a distance between the projection point O1' of the center O1 of the first pressure relief hole 1131 on the sagittal plane and the centroid B of the projection of the ear canal opening on the sagittal plane is in a range of 12 mm to 18 mm. In some embodiments, the distance between the projection point O1' of the center O1 of the first pressure relief hole 1131 on the sagittal plane and the centroid B of the projection of the ear canal opening on the sagittal plane is in a range of 14 mm to 16 mm. In some embodiments, the distance between the projection point O1' of the center O1 of the first pressure relief hole 1131 on the sagittal plane and the centroid B of the projection of the ear canal opening on the sagittal plane is in a range of 14.5 mm to 15.5 mm.

In some embodiments, in order to ensure that the sound production component 11 extends into the inferior concha and that a suitable gap (forming the opening of the cavity structure) exists between the upper boundary of the inner side surface IS and the inferior concha, a distance between the projection point C of the ⅓ point of the lower boundary of the inner side surface on the sagittal plane and the centroid B of the projection of the ear canal opening on the sagittal plane is in a range of 1.76 mm to 2.64 mm. In some embodiments, the distance between the projection point C of the ⅓ point of the lower boundary of the inner side surface on the sagittal plane and the centroid B of the projection of the ear canal opening on the sagittal plane is in a range of 1.96 mm to 2.44 mm. In some embodiments, the distance between the projection point C of the ⅓ point of the lower boundary of the inner side surface on the sagittal plane and the centroid B of the projection of the ear canal opening on the sagittal plane is in a range of 2.16 mm to 2.24 mm.

In some embodiments, in order to ensure that the sound production component 11 can extend into the inferior concha and that the first pressure relief hole 1131 is not to be obscured by the ear structure, and to ensure that the sound outlet 112 is as close as possible to the ear canal and not obscured, a ratio of a distance between the center O of the sound outlet 112 and the center of the ear canal opening to the distance between the center O1 of the first pressure relief hole 1131 and the center of the ear canal opening may be within a suitable range. Accordingly, a ratio of the distance between the projection point O' of the center O of the sound outlet 112 on the sagittal plane and the centroid B of the projection of the ear canal opening on the sagittal plane to the distance between the projection point O1' of the center O1 of the first pressure relief hole 1131 on the sagittal plane and the centroid B of the projection of the ear canal opening on the sagittal plane may be within a suitable range. In some embodiments, the ratio of the distance between the projection point O' of the center O of the sound outlet 112 on the sagittal plane and the centroid B of the projection of the ear canal opening on the sagittal plane to the distance between the projection point O1' of the center O1 of the first pressure relief hole 1131 on the sagittal plane and the centroid B of the projection of the ear canal opening on the sagittal plane may be in a range of 0.10 to 0.35. In some embodiments, the ratio of the distance between the projection point O' of the center O of the sound outlet 112 on the sagittal plane and the centroid B of the projection of the ear canal opening on the sagittal plane to the distance between the projection point O1' of the center O1 of the first pressure relief hole 1131 on the sagittal plane and the centroid B of the projection of the ear canal opening on the sagittal plane may be in a range of 0.15 to 0.28. In some embodiments, the ratio of the distance between the projection point O' of the center O of the sound outlet 112 on the sagittal plane and the centroid B of the projection of the ear canal opening on the sagittal plane to the distance between the projection point O1' of the center O1 of the first pressure relief hole 1131 on the sagittal plane and the centroid B of the projection of the ear canal opening on the sagittal plane may be in a range of 0.18 to 0.25. In some embodiments, the ratio of the distance between the projection point O' of the center O of the sound outlet 112 on the sagittal plane and the centroid B of the projection of the ear canal opening on the sagittal plane to the distance between the projection point O1' of the center O1 of the first pressure relief hole 1131 on the sagittal plane and the centroid B of the projection of the ear canal opening on the sagittal plane may be in a range of 0.19 to 0.22.

Referring to FIG. 14-FIG. 16, in some embodiments, under the premise that the sound production component 11 is at least partially inserted into the inferior concha, in order to enable the projection of the sound outlet 112 on the sagittal plane can be partially or fully located within the inferior concha region, when the user wears the earphone 10, a distance between the center O of the sound outlet 112 and an upper vertex M of the ear hook 12 is in a range of 22.5 mm to 34.5 mm. In some embodiments, the upper vertex of the ear hook 12 may be a position on an outer contour of the ear hook having a maximum distance in the vertical axis relative to a specific point at the user's neck when the user wears the open earphone, such as, the vertex M shown in FIG. 14. In some embodiments, the upper vertex of the ear hook 12 may also be a highest point of an inner contour of the ear hook along the users vertical axis in the wearing state. In some embodiments, when the user wears the earphone 10, the distance between the center O of the sound outlet 112 and the upper vertex M of the ear hook 12 is in a range of 25 mm to 32 mm. In some embodiments, when the user wears the earphone 10, the distance between the center O of the sound outlet 112 and the upper vertex M of the ear hook 12 is in a range of 27.5 mm to 29.5 mm. In some embodiments, when the user wears the earphone 10, the distance between the center O of the sound outlet 112 and the upper vertex M of the ear hook 12 is in a range of 28 mm to 29 mm. In some embodiments, when the user wears the earphone 10, a distance between the projection point O' of the center O of the sound outlet 112 on the sagittal plane and a projection point M' of the upper vertex M of the ear hook 12 on the sagittal plane is in a range of 18 mm to 30 mm.

In some embodiments, when the user wears the earphone 10, the distance between the projection point O' of the center O of the sound outlet 112 on the sagittal plane and the projection point M' of the upper vertex M of the ear hook 12 on the sagittal plane is in a range of 20 mm to 25 mm. It should be noted that in the present disclosure, in the wearing state, a distance between the projection point O' of the center O of the sound outlet 112 on the sagittal plane and a specific point (e.g., the projection point M' of the upper vertex M of the ear hook 12 on the sagittal plane) may be determined by the following exemplary method. In the wearing state, multiple components of the earphone 10 (e.g., the sound production component 11, the first portion 121 of the ear hook, and the second portion 122 of the ear hook) may be fixed to a stabilizing member using a fixing member or glue, and then the human head model and the ear structure can be removed. At this point, the earphone 10 stabilized on the stabilizing member is displayed facing the ear side, and its posture is the same as the posture in the wearing state. At this time, the position of the projection point O' of the center O of the sound outlet 112 on the sagittal plane may be determined. Further, the distance between the projection point O' of the center O of the sound outlet 112 on the sagittal plane and that specific point may be determined.

In some embodiments, in order to prevent the first pressure relief hole 1131 from being obscured when the sound production component 11 extends into the inferior concha, a distance between the center O1 of the first pressure relief hole 1131 and the upper vertex M of the ear hook 12 should not be too small. In addition, the distance between the center O1 of the first pressure relief hole 1131 and the upper vertex M of the ear hook 12 should not be too large in the case where the sound production component 11 can at least partially extend into the inferior concha. In some embodiments, the distance between the center O1 of the first pressure relief hole 1131 and the upper vertex M of the ear hook 12 is in a range of 16.15 mm to 24.25 mm. In some embodiments, the distance between the center O1 of the first pressure relief hole 1131 and the upper vertex M of the ear hook 12 is in a range of 17.55 mm to 23.25 mm. In some embodiments, the distance between the center O1 of the first pressure relief hole 1131 and the upper vertex M of the ear hook 12 is in a range of 19.55 mm to 20.55 mm. In some embodiments, a position relationship between the center O1 of the first pressure relief hole 1131 and the upper vertex M of the ear hook 12 may also be characterized by a distance between the projection point O1' of the center O1 of the first pressure relief hole 1131 on the sagittal plane and the projection point M' of the upper vertex M of the ear hook 12 on the sagittal plane. For example, in some embodiments, the distance between the projection point O1' of the center O1 of the first pressure relief hole 1131 on the sagittal plane and the projection point M' of the upper vertex M of the ear hook 12 on the sagittal plane is in a range of 15.83 mm to 23.75 mm. In some embodiments, the distance between the projection point O1' of the center O1 of the first pressure relief hole 1131 on the sagittal plane and the projection point M' of the upper vertex M of the ear hook 12 on the sagittal plane is in a range of 18 mm-20 mm.

In some embodiments, in the wearing manner as in FIG. 14, a ratio of the distance between the center O of the sound outlet 112 and the upper vertex M of the ear hook 12 to the distance between the center O1 of the first pressure relief hole 1131 and the upper vertex M of the ear hook 12 is in a range of 1.10 to 1.70. In some embodiments, when the user wears the earphone 10, the ratio of the distance between the center O of the sound outlet 112 and the upper vertex M of the ear hook 12 to the distance between the center O1 of the first pressure relief hole 1131 and the upper vertex M of the ear hook 12 is in a range of 1.25-1.65. Preferably, the ratio of the distance between the center O of the sound outlet 112 and the upper vertex M of the ear hook 12 to the distance between the center O1 of the first pressure relief hole 1131 and the upper vertex M of the ear hook 12 is in a range of 1.35-1.55. In some embodiments, a position relationship among the center O of the sound outlet 112, the upper vertex M of the ear hook 12, and the center O1 of the first pressure relief hole 1131 may also be characterized by a ratio of a distance between the projection point O' of the center O of the sound outlet 112 on the sagittal plane and the projection point M' of the upper vertex M of the ear hook 12 on the sagittal plane to a distance between the center O1 of the first pressure relief hole 1131 and the upper vertex M of the ear hook 12. For example, in some embodiments, under the wearing manner shown in FIG. 14, the ratio of the distance between the projection point O' of the center O of the sound outlet 112 on the sagittal plane and the projection point M' of the upper vertex M of the ear hook 12 on the sagittal plane to the distance between the center O1 of the first pressure relief hole 1131 and the upper vertex M of the ear hook 12 is in a range of 1.11-1.71. In some embodiments, the ratio of the distance between the projection point O' of the center O of the sound outlet 112 on the sagittal plane and the projection point M' of the upper vertex M of the ear hook 12 on the sagittal plane to the distance between the center O1 of the first pressure relief hole 1131 and the upper vertex M of the ear hook 12 is in a range of 1.35-1.50.

The description of the earphone 10 described above is merely for the purpose of illustration, and is not intended to limit the scope of the present disclosure. For those skilled in the art, various variations and modifications can be made according to the description of the present disclosure. For example, when only one pressure relief hole is provided on the sound production component 11, the pressure relief hole may be any one of the first pressure relief hole 1131 and the second pressure relief hole 1132 described above. For example, the pressure relief hole may be the first pressure relief hole 1131 described above, i.e., the pressure relief hole may be provided on the upper side surface US. At this time, the pressure relief hole may be considered as the one and only point source of sound outside the cavity structure 41 as shown in FIG. 10. A ratio of the distance between the center O of the sound outlet 112 and the midpoint of the upper boundary of the inner side surface IS to the distance between the center of this pressure relief hole and the midpoint of the upper boundary of the inner side surface IS is in a range of 1.3 to 2.1. These variations and modifications remain within the scope of protection of the present disclosure.

FIG. 17 is a schematic diagram illustrating a structure of a housing for an open earphone according to some embodiments of the present disclosure.

In some embodiments, as shown in FIG. 17, the sound outlet 112, the first pressure relief hole 1131, and the second pressure relief hole 1132 may be of a runway shape, and two ends of the runway shape may be inferiorly curved or semi-circular. In some embodiments, the sound outlet 112, the first pressure relief hole 1131, and the second pressure relief hole 1132 are in a straight cylindrical structure. In some embodiments, in order to facilitate processing and manufacturing and reduce the process difficulty, the sound outlet 112, the first pressure relief hole 1131, and the second pressure relief hole 1132 may all be of a flared structure. For example, the area of the inner opening is smaller than the area of the corresponding outer opening, or the area of the outer opening is smaller than the area of the corresponding inner opening. It should be noted that the shapes of the sound outlet 112, the first pressure relief hole 1131, and the second pressure relief hole 1132 may include, but are not limited to, circular, oval, runway-shaped, etc. For ease of description, the following is an exemplary illustration of a straight cylinder structure in which the sound outlet 112, the first pressure relief hole 1131, and the second pressure relief hole 1132 are set in the runway shape. In this case, a maximum dimension of the sound outlet 112 in the width direction Y is defined as its corresponding short-axis dimension (width), and maximum dimensions of the first pressure relief hole 1131 and the second pressure relief hole 1132 in the thickness direction Z is defined as their corresponding short-axis dimension (width); the maximum dimensions of the sound outlet 112, the first pressure relief hole 1131, and the second pressure relief hole 1132 in the long-axis direction X are defined as their corresponding long-axis dimensions (length); a dimension of the sound outlet 112 in the thickness direction Z is defined as its corresponding depth, and dimensions of the first pressure relief hole 1131 and the second pressure relief hole 1132 in the width direction Y are defined as their corresponding depths.

In some embodiments, as the area $S_3$ of the outer opening (hereinafter referred to as the area) of the sound outlet 112 increases or the depth $D_3$ of the sound outlet 112 decreases, the resonance frequency $f_h$ of the front cavity of the earphone is shifted to high frequency. During the vibration of the diaphragm, the air in the front cavity is compressed or expanded with the vibration of the diaphragm, and the compressed or expanded air may drive an air column at the sound outlet to move back and forth, which in turn causes the air column to radiate sound outward. In some embodiments, the air column within the sound outlet 112 has a mass, which may correspond to a sound mass of the sound outlet 112. The acoustic mass may be used as a portion of the acoustic impedance, thereby affecting the acoustic output of the sound production component 11. Thus, the dimension of the sound outlet 112 may also have an effect on the sound mass Ma of the sound outlet 112, specifically, the area $S_3$ of the sound outlet 112 increases or the depth $D_3$ decreases of the sound outlet 112, the sound mass Ma of the sound outlet 112 decreases.

In some embodiments, in order to increase the resonance frequency $f_h$ of the front cavity while ensuring the sound mass Ma of the sound outlet 112, the area $S_3$ of the sound outlet 112 needs to have a suitable value range. In addition, if the area $S_3$ of the sound outlet 112 is too large, other aspects such as the appearance and structural strength of the earphone 10 may be affected at a certain extent. Thus, in some embodiments, the area $S_3$ of the sound outlet 112 may be in a range of 2.87 mm$^2$ to 46.10 mm$^2$. In some embodiments, the area $S_3$ of the sound outlet 112 may be in a range of 2.875 mm$^2$ to 46 mm$^2$. In some embodiments, the area $S_3$ of the sound outlet 112 may be in a range of 8 mm$^2$ to 30 mm$^2$. In some embodiments, the area $S_3$ of the sound outlet 112 may be in a range of 10 mm$^2$ to 26 mm$^2$. Merely by way of example, the area $S_3$ of the sound outlet 112 may be in a range of 11 mm$^2$-15 mm$^2$ (e.g., 11.49 mm$^2$). As another example, the area $S_3$ of the sound outlet 112 may be in a range of 25 mm$^2$-26 mm$^2$ (e.g., 25.29 mm$^2$).

In order to ensure that the front cavity has a sufficiently large resonance frequency, the smaller the depth $D_3$ of the sound outlet 112, the better. However, since the sound outlet 112 is set on the housing 111, the depth $D_3$ of the sound outlet 112 is the same as the thickness of the housing 111. If the thickness of the housing 111 is too small, the structural strength of the earphone 10 may be affected, and the corresponding processing process is more difficult. In some embodiments, the depth $D_3$ of the sound outlet 112 may be in a range of 0.3 mm to 3 mm. In some embodiments, the depth $D_3$ of the sound outlet 112 may be in a range of 0.3 mm-2 mm. In some embodiments, the depth $D_3$ of the sound outlet 112 may be in a range of 0.3 mm-1 mm.

In some embodiments, the area of the sound outlet 112 has a value range of 2.875 mm$^2$-46 mm$^2$, the depth $D_3$ of the sound outlet 112 may have a value range of 0.3 mm-3 mm, and a ratio $S_3/D_3^2$ of the area $S_3$ of the corresponding sound outlet 112 to the square of the depth $D_3$ may have a value range of 0.31-512.2. In some embodiments, the ratio $S_3/D_3^2$ of the area $S_3$ of the sound outlet 112 to the square of the depth $D_3$ may have a value range of 1-400. In some embodiments, the ratio $S_3/D_3^2$ of the area $S_3$ of the sound outlet 112 to the square of the depth $D_3$ may have a value range of 3-300. In some embodiments, the ratio $S_3/D_3^2$ of the area $S_3$ of the sound outlet 112 to the square of the depth $D_3$ may have a value range of 5-200. In some embodiments, the ratio $S_3/D_3^2$ of the area $S_3$ of the sound outlet 112 to the square of the depth $D_3$ may have a value range of 10-50.

In some embodiments, when other structures (e.g., the sound outlet 112, etc.) are fixed, as the area of the pressure relief hole 113 (e.g., the first pressure relief hole 1131 and/or the second pressure relief hole 1132) gradually increases, the resonance frequency corresponding to the rear cavity of the earphone 10 gradually shifts toward high frequency and a flat region of the frequency response curve becomes wider. In addition, in practical applications, if the area of the first pressure relief hole 1131 and/or the area of the second pressure relief hole 1132 is too large, it may have a certain impact on the appearance, structural strength, waterproof and dustproof of the earphone 10, etc. Therefore, the area $S_1$ of the first pressure relief hole 1131 and/or the area $S_2$ of the second pressure relief hole 1132 should also not be too large. In some embodiments, the area of the first pressure relief hole 1131 is in a range of 3.78 mm$^2$-86.21 mm$^2$ and the area of the second pressure relief hole 1132 is in a range of 2.78 mm$^2$-54.68 mm$^2$. In some embodiments, the area of the first pressure relief hole 1131 is in a range of 3.78 mm$^2$-22.07 mm$^2$ and the area of the second pressure relief hole 1132 is in a range of 2.78 mm$^2$-16.07 mm$^2$. In some embodiments, the area of the first pressure relief hole 1131 is in a range of 6.78 mm$^2$-20.07 mm$^2$ and the area of the second pressure relief hole 1132 is in a range of 4.78 mm$^2$-13.07 mm$^2$.

In some embodiments, since the first pressure relief hole 1131, the second pressure relief hole 1132, and the sound outlet 112 are provided on the housing 111, the depth $D_1$ of the first pressure relief hole 1131 and the depth $D_2$ of the second pressure relief hole 1132 may be the same as the depth $D_3$ of the sound outlet 112 for ease of processing and design. In some embodiments, the depth $D_1$ of the first pressure relief hole 1131 (or the depth $D_2$ of the second pressure relief hole 1132) may be in a range of 0.3 mm to 3 mm. In some embodiments, the depth $D_1$ of the first pressure relief hole 1131 (or the depth $D_2$ of the second pressure relief hole 1132) may be in a range of 0.3 mm to 2 mm. In some embodiments, the depth $D_1$ of the first pressure relief hole 1131 (or the depth $D_2$ of the second pressure relief hole 1132) may be in a range of 0.3 mm to 1 mm.

In some embodiments, in order to ensure that the second leakage sound formed by the pressure relief hole 113 can better cancel each other out with the first leakage sound formed by the sound outlet 112 in the far field, the resonance frequency $f_2$ of the rear cavity can be close to or equal to the resonance frequency $f_2$ of the front cavity 114. According to equation (2), a ratio $$\frac{f_1}{f_2}$$

of the resonance frequency $f_1$ of the front cavity 114 to the resonance frequency $f_2$ of the rear cavity is:

$$\frac{f_1}{f_2} = \frac{\frac{c}{2\pi}\sqrt{\frac{S_1}{V_1 L_1}}}{\frac{c}{2c\pi}\sqrt{\frac{S_2}{V_2 L_2}}} = \sqrt{\frac{S_1}{V_1 L_1} \cdot \frac{V_2 L_2}{S_2}} = \sqrt{\frac{S_1}{S_2} \cdot \frac{V_2}{V_1} \cdot \frac{L_2}{L_1}}. \quad (2)$$

According to equation (2), the ratio of the resonance frequency $f_2$ of the front cavity 114 and the resonance frequency $f_2$ of the rear cavity may be related to a ratio of the volumes of the front and rear cavities, a ratio of an opening area of the sound outlet 112 to an opening area of the pressure relief hole 113, and a ratio of a depth of the sound outlet 112 to a depth of the pressure relief hole 113. The other parameters (e.g., the ratio of the opening area of the sound outlet 112 to the opening area of the pressure relief hole 113) may be set based on some of these parameters (e.g., the ratio of the volumes of the front and rear cavities) such that the second leakage sound formed by the pressure relief hole 113 can better cancel each other out with the first leakage sound formed by the sound outlet 112 in the far field, thereby improving the output of the earphone 10.

In some embodiments, in order to make a ratio of the resonance frequencies of the front cavity and the rear cavity in a range of 0.5-1.5, a ratio between a ratio of the area $S_3$ to the depth $D_3$ of the sound outlet 112 and a ratio of a total area of the pressure relief hole 113 to its corresponding depth is in a range of 1.10-1.75. In some embodiments, in order to make the ratio of the resonance frequencies of the front cavity and the rear cavity in a range of 0.7-1.3, the ratio between the ratio of the area $S_3$ to the depth $D_3$ of the sound outlet 112 and the ratio of the total area of the pressure relief hole 113 to its corresponding depth is in a range of 1.25-1.65. In some embodiments, in order to make the ratio of the resonance frequencies of the front cavity and the rear cavity in a range of 0.8-1.2, the ratio between the ratio of the area $S_3$ to the depth $D_3$ of the sound outlet 112 and the ratio of the total area of the pressure relief hole 113 to its corresponding depth is in a range of 1.35-1.55.

In some embodiments, the shape of the sound outlet 112 may also have an effect on the acoustic resistance of the sound outlet 112. For example, the narrower the sound outlet 112 is, the higher the acoustic resistance of the sound outlet 112 is, which is not conducive to the acoustic output of the front cavity. Therefore, in order to ensure that the sound outlet 112 produces better low frequency output, and also to improve the sound volume output from the sound outlet 112, a ratio of the long-axis dimension $L_3$ and the short-axis dimension $W_3$ of the sound outlet 112 (or called an aspect ratio of the sound outlet 112) needs to be within a preset appropriate value range. In some embodiments, when the area of the sound outlet 112 is constant, in order to ensure that the frequency response curve of the front cavity is stronger at low frequency, the aspect ratio of the sound outlet 112 may be in a range of 1-10. In some embodiments, the aspect ratio of the sound outlet 112 may be in a range of 2-7. In some embodiments, the aspect ratio of the sound outlet 112 may be in a range of 2-3. In some embodiments, the aspect ratio of the sound outlet 112 may be 2. In some embodiments, in order to make the resonance frequency of the resonance peak of the front cavity as high as possible, the length L3 of the sound outlet 112 may have a relatively large value, but at the same time, in order not to reduce the high frequency output corresponding to the resonance peak of the front cavity and considering the structural stability of the sound production component 11, the length $L_3$ of the sound outlet 112 may not be greater than 17 mm, and the width $W_3$ of the sound outlet 112 may not be greater than 10 mm. In some embodiments, the length $L_3$ of the sound outlet 112 may be in a range of 2 mm-11 mm. In some embodiments, the length $L_3$ of the sound outlet 112 may be in a range of 3 mm-11 mm. In some embodiments, the length $L_3$ of the sound outlet 112 may be in a range of 3 mm-16 mm. In some embodiments, the length $L_3$ of the sound outlet 112 may be in a range of 5 mm-13 mm. In some embodiments, the length $L_3$ of the sound outlet 112 may be in a range of 6 mm-9 mm.

In some embodiments, the width $W_3$ of the sound outlet 112 may be determined based on the length $L_3$ and the aspect ratio. For example, the aspect ratio of the sound outlet 112 may be 2, and the width W3 of the sound outlet 112 may be in a range of 1.5 mm-5.5 mm. The area of the corresponding runway-shaped sound outlet 112 may be in a range of 4.02 mm²-54 mm². By setting the range of the length $L_3$ of the sound outlet 112, it is possible to increase the range of the flat region of the frequency response curve and thus improve the sound quality of the earphone 10 while taking into account the structural design of the sound production component 11. Merely by way of example, the area of the runway-shaped sound outlet 112 is about 11.5 mm², and accordingly the length $L_3$ of the sound outlet 112 may be determined to be 5 mm-6 mm, and the width $W_3$ of the sound outlet 112 may be 2.5 mm-3 mm. In the above dimensional range, it can make the earphone 10 in a wide frequency range with a flat frequency response curve and sufficient high frequency output; in addition, the area is taken as relatively small, which is also conducive to the stability of the structure.

In some embodiments, referring to FIG. 14-FIG. 16 and the descriptions thereof, the center of the sound outlet 112 may be located on or near a perpendicular bisection-plane of a line segment connecting the center of the first pressure relief hole 1131 and the center of the second pressure relief hole 1132, and the sound outlet 112 is located in the Y direction on a side of the housing 111 close to the second pressure relief hole 1132 rather than in the middle of the housing 111. Since the sound outlet 112 is provided close to the external ear canal, the second pressure relief hole 1132 is closer to the external ear canal and the first pressure relief hole 1131 is farther away from the external ear canal. Compared with the first pressure relief hole 1131, the sound waves from the second pressure relief hole 1132 are more likely to cancel in the near field with the sound waves from the sound outlet 112. Thus, the sound pressure amplitude at the second pressure relief hole 1132 may be smaller than the sound pressure amplitude at the first pressure relief hole 1131, thereby increasing the listening volume at the ear canal. In some embodiments, the acoustic resistance of the second pressure relief hole 1132 may be larger compared to the first pressure relief hole 1131. For example, the dimension of the second pressure relief hole 1132 may be smaller than the dimension of the first pressure relief hole 1131, such that the acoustic resistance of the second pressure relief hole 1132 may have a relatively large acoustic resistance. For example, the area of the first pressure relief hole 1131 may be larger than the area of the second pressure relief hole 1132.

In some embodiments, in the case of ensuring that the sound production efficiency of the sound production component 11 is sufficiently high and that it can be at least partially inserted into the inferior concha, the volumes of the front and rear cavities of the sound production component 11 should not be too large or too small. In order to keep a ratio of the resonance frequencies of the front cavity to the rear cavity in a range of 0.3-1.7, the ratio of the area of the sound outlet 112 to the total area of the pressure relief holes 113 (e.g., a sum of areas of the first pressure relief hole 1131 and the second pressure relief hole 1132) is between 0.3 and 0.9. In some embodiments, in order to make the ratio of the resonance frequencies of the front cavity to the rear cavity in a range of 0.5-1.5, a ratio of the area of the sound outlet 112 to the total area of the pressure relief holes 113 is in a range of 0.5-0.85. In some embodiments, in order to make the ratio of the resonance frequencies of the front cavity to the rear cavity in a range of 0.7-1.3, the ratio of the area of the sound outlet 112 to the total area of the pressure relief holes 113 is in a range of 0.6-0.8. In some embodiments, in order to make the ratio of the resonance frequencies of the front cavity to the rear cavity in a range of 0.8-1.2, the ratio of the area of the sound outlet 112 to the total area of the pressure relief holes 113 is in a range of 0.65-0.75.

In some embodiments, when the earphone 10 includes only one pressure relief hole, a ratio of the area $S_3$ of the sound outlet 112 and the area of the pressure relief hole is between 0.5 and 1.5. In some embodiments, when the earphone 10 includes only one pressure relief hole, the ratio of the area $S_3$ of the sound outlet 112 and the area of the pressure relief hole is between 0.6 and 1.3. In some embodiments, when the earphone 10 includes only one pressure relief hole, the ratio of the area $S_3$ of the sound outlet 112 and the area of the pressure relief hole is between 0.65 and 1.25. In some embodiments, when the earphone 10 includes only one pressure relief hole, the ratio of the area $S_3$ of the sound outlet 112 and the area of the pressure relief hole is between 0.7-1.2.

Figure 18:
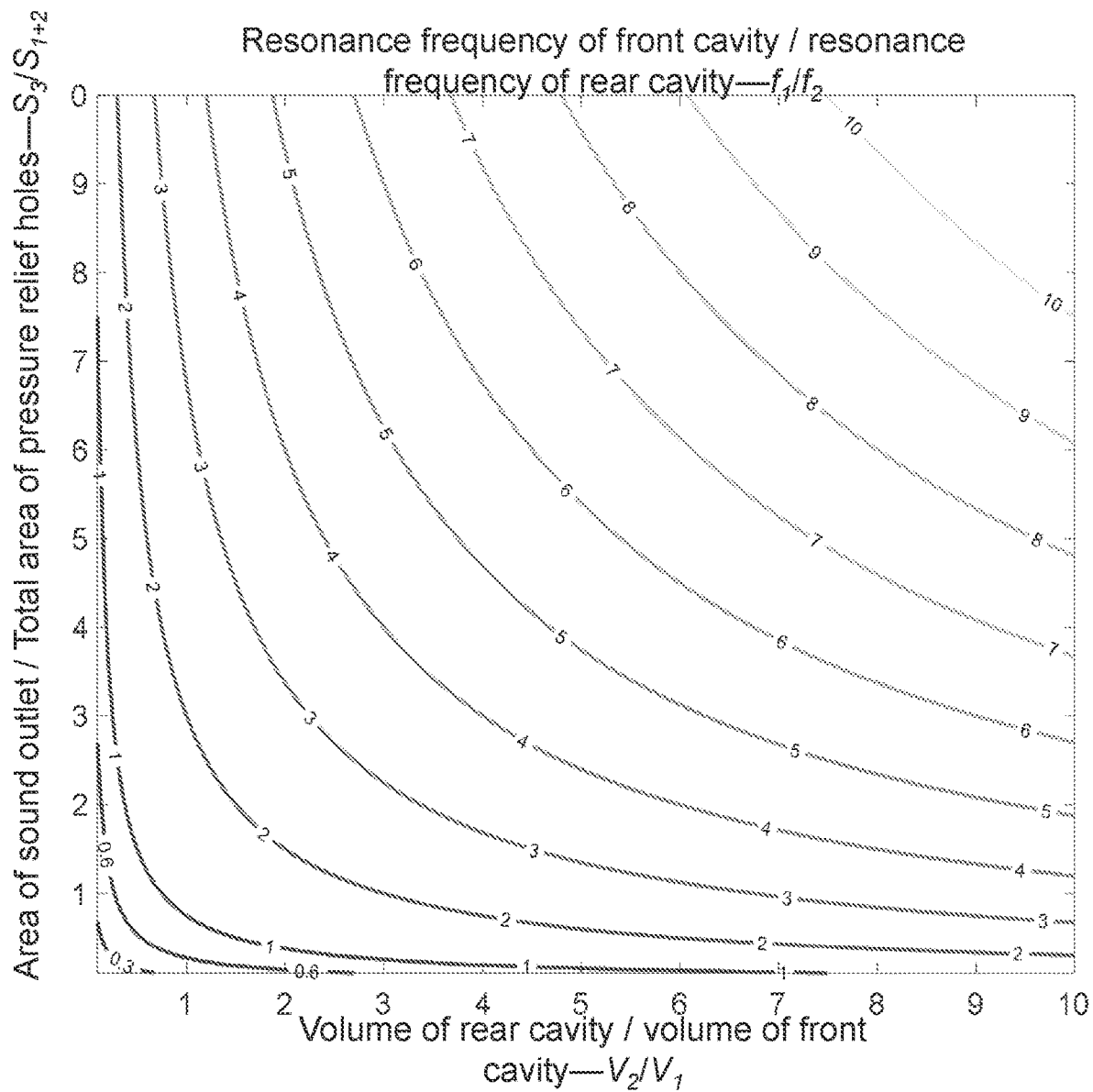
FIG. 18 illustrates a contour map illustrating a ratio of volumes of front and rear cavities and a ratio of an opening area of a sound outlet to an opening area of a pressure relief hole according to some embodiments of the present disclosure.

FIG. 18 illustrates a contour map illustrating a ratio of volumes of front and rear cavities and a ratio of an opening area of a sound outlet to an opening area of a pressure relief hole according to some embodiments of the present disclosure. According to FIG. 18, in some embodiments, the ratio of the resonance frequencies of the front and rear cavities may be related to the ratio between the area of the sound outlet and the area of the pressure relief hole(s), and the ratio of the volumes of the front and rear cavities. Thus, by setting the ratio between the area of the sound outlet and the area of the pressure relief hole(s) and the ratio of the volumes of the front and rear cavities, the ratio of the resonance frequencies of the front and rear cavities can be within a target range. For example, referring to FIG. 18, if a ratio $f_1 f_2$ of the resonance frequency $f_h$ of the front cavity to the resonance frequency $f_2$ of the rear cavity is in a range of 0.1-5, the opening area $S_3$ of the sound outlet 112 may be smaller than the total opening area $S_{1+2}$ of the first pressure relief hole 1131 and the second pressure relief hole 1132. For example, a ratio $S_3/S_{1+2}$ of the opening area $S_3$ of the sound outlet 112 to the total opening area $S_{1-2}$ of the first pressure relief hole 1131 and the second pressure relief hole 1132 may be in a range of 0.1-0.99, and a ratio $V_2/V_1$ of the volume $V_2$ of the rear cavity to the volume $V_1$ of the front cavity may be in a range of 0.1-10. As another example, if the ratio $f_2/f_2$ of the resonance frequency $f_h$ of the front cavity to the resonance frequency $f_2$ of the rear cavity is in a range of 0.5-2, the ratio $S_3/S_{1+2}$ of the opening area $S_3$ of the sound outlet 112 to the total opening area $S_{1+2}$ of the first pressure relief hole 1131 and the second pressure relief hole 1132 may be in a range of 0.2-0.7, and the ratio $V_2/V_1$ of the volume $V_2$ of the rear cavity to the volume $V_1$ of the front cavity may be in a range of 1-7.

In some embodiments, the opening area $S_3$ of the sound outlet 112 may be greater than the total opening area $S_{1-2}$ of the first pressure relief hole 1131 and the second pressure relief hole 1132. For example, the ratio $S_3/S_{1+2}$ of the opening area $S_3$ of the sound outlet 112 to the total opening area $S_{1+2}$ of the first pressure relief hole 1131 and the second pressure relief hole 1132 may be in a range of 1-10, and the ratio $V_2/V_1$ of the volume $V_2$ of the rear cavity 116 to the volume $V_1$ of the front cavity 114 may be in a range of 0.1-10. According to FIG. 18, the ratio $f_1/f_2$ of the resonance frequency $f_h$ of the corresponding front cavity 114 to the resonance frequency $f_2$ of the rear cavity 116 may be in a range of 0.5-10. As another example, the ratio $S_3/S_{1+2}$ of the opening area $S_3$ of the sound outlet 112 to the total opening area $S_{1+2}$ of the first pressure relief hole 1131 and the second pressure relief hole 1132 may be in a range of 3-9, and the ratio $V_2/V_1$ of the volume $V_2$ of the rear cavity 116 to the volume $V_1$ of the front cavity 114 may be in a range of 2-6. According to FIG. 18, the ratio $f_1/f_2$ of the resonance frequency $f_h$ of the corresponding front cavity 114 to the resonance frequency $f_2$ of the rear cavity 116 may be in a range of 1-8.

In some embodiments, with reference to the contour lines shown in FIG. 18, the value of $S_3/S_{1+2}$ may be determined based on $V_2/V_1$, or the value of $V_2/V_1$ may be determined based on $S_3/S_{1+2}$, so that the resonance frequency $f_2$ of the rear cavity may be close to or equal to the resonance frequency $f_h$ of the front cavity, which in turn allows the second leakage sound formed by the pressure relief hole(s) 113 to better cancel each other out with the first leakage sound formed by the sound outlet 112 in the far field, thereby improving the output effect of the earphone 10. For example, according to equation (2), in order to make the rear cavity have a sufficiently large resonance frequency $f_2$, the volume $V_2$ of the rear cavity may be relatively small, for example, $V_2/V_1$ may be less than 1. Referring to FIG. 18, if the resonance frequency $f_2$ of the rear cavity can be close to or equal to the resonance frequency $f_2$ of the front cavity (for example, the value of $f_1/f_2$ is about 1), the value of $S_3/S_{1-2}$ may be in a range from 1 to 2.5.

Merely by way of example, the volume $V_1$ of the front cavity may be in a range of 190 mm³-220 mm³; the volume $V_2$ of the rear cavity may be in a range of 60 mm³-80 mm³. Accordingly, in some embodiments, the value of $V_2/V_1$ may be in a range of 0.2-0.4. In some embodiments, the value of $V_2/V_1$ may be in a range of 0.25-0.45.

In some embodiments, the ratio $S_3/S_{1+2}$ of the opening area $S_3$ of the sound outlet 112 to the total opening area $S_{1+2}$ of the first pressure relief hole 1131 and the second pressure relief hole 1132 may be adjusted that makes the earphone have a better output effect in combination with the above related contents. For example, the length $L_3$ of the sound outlet 112 may be 3 mm-11 mm, a ratio of the length $L_3$ to the width $W_3$ of the cross-section of the sound outlet 112 is 2, and an area of the corresponding runway-shaped sound outlet 112 may be 4.02 mm²-54 mm². The length $L_1$ of the first pressure relief hole 1131 may be 6 mm, the width $W_1$ of the first pressure relief hole 1131 may be 1.5 mm, and the area of the corresponding first pressure relief hole 1131 may be 8.51 mm². The length $L_2$ of the second pressure relief hole 1132 may be 3 mm, the width $W_2$ of the second pressure relief hole 1132 may be 1.5 mm, and the area of the corresponding second pressure relief hole 1132 may be 4.02 mm². As a result, the ratio $S_3/S_{1+2}$ of the opening area S3 of the sound outlet 112 and the total opening area $S_{1+2}$ of the first pressure relief hole 1131 and the second pressure relief hole 1132 may be in a range of 0.32-4.31. As another example, the length $L_1$ of the first pressure relief hole 1131 may be in a range of 2 mm-8 mm, the width $W_1$ of the first pressure relief hole 1131 may be 1.5 mm, and the area of the first pressure relief hole 1131 is in a range of 2.517 mm²-11.5171 mm²; the length $L_2$ of the second pressure relief hole 1132 may be in a range of 3 mm-6 mm, the width $W_2$ of the second pressure relief hole 1132 may be 1.5 mm, and the area of the second pressure relief hole 1132 is in a range of 4.017 mm²-8.5171 mm². The length $L_3$ of the sound outlet 112 may be 5 mm, the width $W_3$ of the sound outlet 112 may be 2.5 mm, and the corresponding area $S_3$ of the sound outlet 112 is 11.16 mm². Thus, the ratio $S_3/S_{1+2}$ of the opening area $S_3$ of the sound outlet 112 to the total opening area $S_{1+2}$ of the first pressure relief hole 1131 and the second pressure relief hole 1132 is in a range of 0.56-1.71.

Referring to FIG. 18, when $V_2/V_1$ is in a range of 0.25-0.45 and $S_3/S_{1+2}$ is in a range of 0.32-4.31, $f/f_2$ is in a range of 0.5-1.5; and when $V_2/V_1$ is in a range of 0.25-0.45 and $S_3/S_{1+2}$ is in a range of 0.56-1.71, $f/f_2$ is in a range of 0.5-0.9. It can be seen that the volume ratio and/or area ratio may be determined based on the above ranges such that the resonance frequency $f_2$ of the rear cavity may be close to or equal to the resonance frequency $f_h$ of the front cavity.

Figure 19:
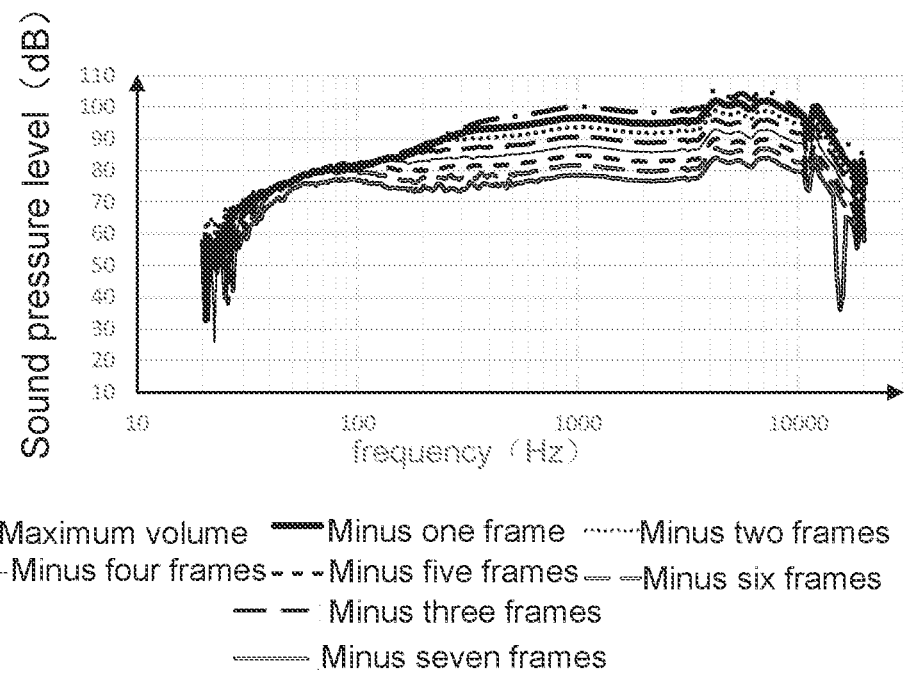
FIG. 19 is a frequency response curve diagram corresponding to different volumes at a sound outlet according to some embodiments of the present disclosure.
Figure 20:
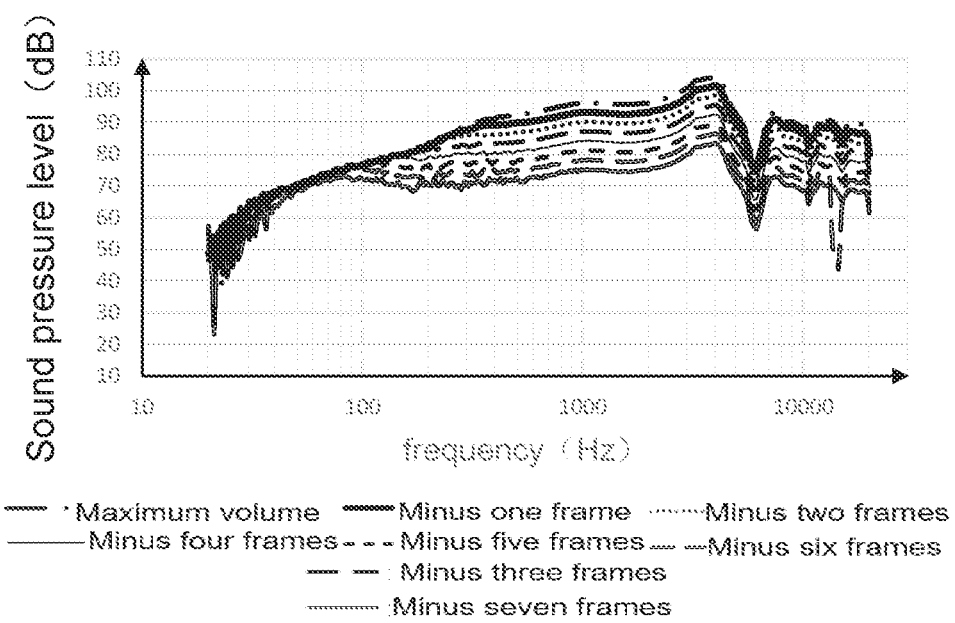
FIG. 20 is a frequency response curve diagram corresponding to different volumes at a first pressure relief hole according to some embodiments of the present disclosure.
Figure 21:
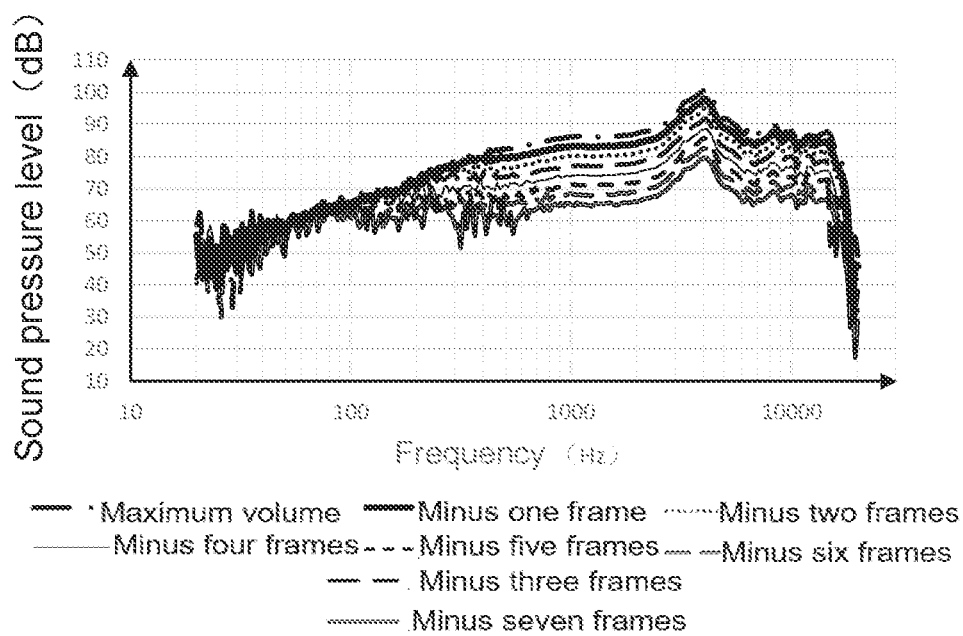
FIG. 21 is a frequency response curve diagram corresponding to different volumes at a second pressure relief hole according to some embodiments of the present disclosure.

FIG. 19 is a frequency response curve diagram corresponding to different volumes at a sound outlet according to some embodiments of the present disclosure. FIG. 20 is a frequency response curve diagram corresponding to different volumes at a first pressure relief hole according to some embodiments of the present disclosure. FIG. 21 is a frequency response curve diagram corresponding to different volumes at a second pressure relief hole according to some embodiments of the present disclosure. As shown in FIG. 19-FIG. 21, as the volume gradually decreases from a maximum volume, the sound pressure at the sound outlet 112, the sound pressure at the first pressure relief hole 1131, and the sound pressure at the second pressure relief hole 1132 all gradually decrease.

It should be noted that the sound pressure at the sound outlet 112, the sound pressure at the first pressure relief hole 1131, and the sound pressure at the second pressure relief hole 1132 refer to a sound pressure at a distance of 4 mm from the sound outlet 112, a sound pressure at a distance of 4 mm from the first pressure relief hole 1131, and a sound pressure at a distance of 4 mm from the second pressure relief hole 1132, respectively. In the process of measuring the sound pressure of each hole, no blockage is caused to the other holes. For example, the first pressure relief hole 1131 and the second pressure relief hole 1132 are not blocked or clogged during the measurement of the sound pressure at the sound outlet 112.

In some embodiments, referring to FIG. 10-FIG. 13 and the descriptions thereof, by providing a cavity structure, it is possible to make the sound waves emitted from the pressure relief holes (the first pressure relief hole 1131 or the second pressure relief hole 1132) cancel each other out with the sound leakage generated by the sound outlet 112 in the far field, thereby contributing to the reduction of the far-field leakage sound, and the sound waves emitted from the pressure relief holes have less impact on the near-field listening volume. Thus, in some embodiments, the sound pressure amplitude at the pressure relief hole 113 (the first pressure relief hole 1131 or the second pressure relief hole 1132) may be made close to the sound pressure amplitude at the sound outlet 112, thereby effectively reducing the far-field leakage sound without affecting the near-field listening volume. In some embodiments, in order to effectively reduce far-field leakage sound, in a specific frequency range (e.g., in a range of 3.5 kHz-4.5 kHz), a ratio of the sound pressure at the sound outlet 112 to the sound pressure at the first pressure relief hole 1131 may be in a range of 0.8-1.2. In some embodiments, the ratio of the sound pressure at the sound outlet 112 to the sound pressure at the first pressure relief hole 1131 may be in a range of 0.9-1.1. In some embodiments, the ratio of the sound pressure at the sound outlet 112 to the sound pressure at the first pressure relief hole 1131 may be in a range of 0.95-1.05. In some embodiments, in order to effectively reduce far-field leakage sound, a ratio of the sound pressure at the sound outlet 112 to the sound pressure at the second pressure relief hole 1132 may be in a range of 0.8-1.2. In some embodiments, the ratio of the sound pressure at the sound outlet 112 to the sound pressure at the second pressure relief hole 1132 may be in a range of 0.9-1.1. In some embodiments, the ratio of the sound pressure at the sound outlet 112 to the sound pressure at the second pressure relief hole 1132 may be in a range of 0.95-1.05. In some embodiments, in order to effectively reduce far-field leakage sound, a ratio of the sound pressure at the sound outlet 112 to a total sound pressure at the first pressure relief hole 1131 and the second pressure relief hole 1132 may be in a range of 0.4-0.6. In some embodiments, the ratio of the sound pressure at the sound outlet 112 to the total sound pressure at the first pressure relief hole 1131 and the second pressure relief hole 1132 may be in a range of 0.45-0.55. It should be known that the sound pressure at the sound outlet 112, the sound pressure at the first pressure relief hole 1131, and the sound pressure at the second pressure relief hole 1132 refer to the corresponding sound pressures at the corresponding frequency at the same volume level, respectively.

Referring to FIG. 19-FIG. 21, at a maximum volume of 4000 Hz, and when the sound pressure at the sound outlet 112 is 103.54 dB, the sound pressure at the first pressure relief hole 1131 is 104.5 dB, and the sound pressure at the second pressure relief hole 1132 is 100.74 dB. At this time, the sound pressure at the sound outlet 112 is close to the sound pressure at the first pressure relief hole 1131 and the sound pressure at the second pressure relief hole 1132, which can effectively reduce the leakage sound in the far field.

In some embodiments, while reducing the sound pressure of the second pressure relief hole 1132 (this is to weaken a cancellation degree between the sound produced by the second pressure relief hole 1132 and the sound produced by the sound outlet 112 in the ear canal) and ensuring the cancellation effect between the sound output from the second pressure relief hole 1132 and the sound leaking from the sound outlet 112 via the second leak structure LC in the far field, a difference $(S_1-S_2)$ between the area $S_1$ of the first pressure relief hole 1131 and the area $S_2$ of the second pressure relief hole 1132 should not be too small. At the same time, in order to avoid the difference between the acoustic resistances at the first pressure relief hole 1131 and the second pressure relief hole 1132 from affecting the effect of destroying the standing wave in the rear cavity, the difference $(S_1-S_2)$ between the area $S_1$ of the first pressure relief hole 1131 and the area $S_2$ of the second pressure relief hole 1132 should not be too large. In some embodiments, in order to keep the ratio of the sound pressure at the sound outlet 112 to the total sound pressure at the first pressure relief hole 1131 and the second pressure relief hole 1132 in a suitable range (e.g., 0.4-0.6), a ratio of the difference ($S_1$-$S_2$) between the area $S_1$ of the first pressure relief hole 1131 and the area $S_2$ of the second pressure relief hole 1132 to the area $S_3$ of the sound outlet 112 may be in a range of 2.5-3.9. In some embodiments, the ratio of the difference ($S_1$-$S_2$) between the area $S_1$ of the first pressure relief hole 1131 and the area $S_2$ of the second pressure relief hole 1132 to the area $S_3$ of the sound outlet 112 may be in a range of 2.7-3.7. In some embodiments, the ratio of the difference ($S_1$-$S_2$) between the area $S_1$ of the first pressure relief hole 1131 and the area $S_2$ of the second pressure relief hole 1132 to the area $S_3$ of the sound outlet 112 may be in a range of 2.85-3.45. In some embodiments, the ratio of the difference ($S_1$-$S_2$) between the area $S_1$ of the first pressure relief hole 1131 and the area $S_2$ of the second pressure relief hole 1132 to the area $S_3$ of the sound outlet 112 may be in a range of 2.9-3.4. In some embodiments, the ratio of the difference ($S_1$-$S_2$) between the area $S_1$ of the first pressure relief hole 1131 and the area $S_2$ of the second pressure relief hole 1132 to the area $S_3$ of the sound outlet 112 may be in a range of 3.1-3.3.

Figure 22:
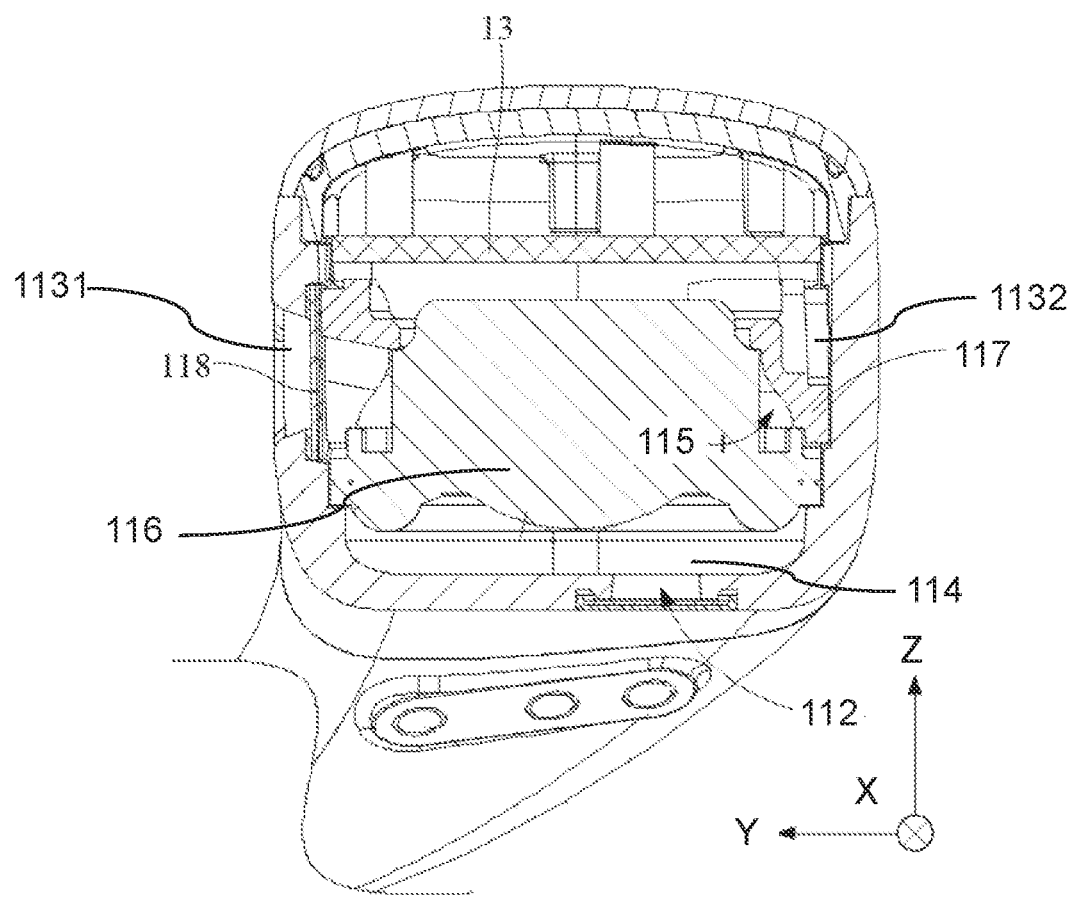
FIG. 22 is a diagram illustrating an exemplary internal structure of a sound production component according to some embodiments of the present disclosure.

FIG. 22 is a diagram illustrating an exemplary internal structure of a sound production component according to some embodiments of the present disclosure.

As shown in FIG. 22, the sound production component 11 may include a housing 111 connected to the ear hook 12 and a transducer 116 disposed in the housing 111. In some embodiments, the sound production component 11 may also include a master control circuit board 13 provided within the housing 111 and a battery (not shown) provided at one end of the ear hook 12 away from the sound production component 11. The battery and the transducer 116 are electrically connected to the master control circuit board 13, respectively, to allow the battery to power the transducer 116 under the control of the master control circuit board 13. Of course, both the battery and the transducer 116 may also be provided within the sound production component 11, and the battery may be closer to the connection end CE while the transducer 116 may be closer to the free end FE.

In some embodiments, the earphone 10 may include an adjustment mechanism connecting the sound production component 11 and the ear hook 12. Different users are able to adjust the relative position of the sound production component 11 on the ear through the adjustment mechanism in the wearing state so that the sound production component 11 is located at a suitable position, thus making the sound production component 11 form a cavity structure with the inferior concha. In addition, due to the presence of the adjustment mechanism, the user is also able to adjust the earphone 10 to wear to a more stable and comfortable position.

Since the inferior concha has a certain volume and depth, after the free end FE is inserted into the inferior concha, there may be a certain distance between the inner side surface IS and the inferior concha of the sound production component 11. In other words, the sound production component 11 and the inferior concha may cooperate to form a cavity structure communicated with the external ear canal in the wearing state. The sound production component 11 (e.g., the inner side surface IS) is provided with the sound outlet 112, and the sound outlet 112 may be at least partially located in the aforementioned cavity structure. In this way, in the wearing state, the sound waves transmitted by the sound outlet 112 are limited by the aforementioned cavity structure, i.e., the aforementioned cavity structure can gather sound waves, so that the sound waves can be better transmitted to the external ear canal, thus improving the volume and sound quality of the sound heard by the user in the near-field, which is beneficial to improve the acoustic effect of the earphone 10. Further, since the sound production component 11 may be set so as not to block the external ear canal in the wearing state, the aforementioned cavity structure may be in a semi-open setting. In this way, a portion of the sound waves transmitted by the sound outlet 112 may be transmitted to the ear canal thereby allowing the user to hear the sound, and another portion thereof may be transmitted with the sound reflected by the ear canal through a gap between the sound production component 11 and the ear (e.g., a portion of the inferior concha not covered by the sound production component 11) to the outside of the earphone 10 and the ear, thereby creating a first leakage in the far-field. At the same time, the sound waves transmitted through the pressure relief hole 113 (e.g., the first pressure relief hole 1131 and the second pressure relief hole 1132) opened on the sound production component 11 generally forms a second leakage sound in the far-field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other, so that the aforementioned first leakage sound and the aforementioned second leakage sound can cancel each other out in the far-field, which is conducive to reducing the leakage of the earphone 10 in the far-field.

In some embodiments, a front cavity 114 may be formed between the transducer 116 and the housing 111. The sound outlet 112 is provided in a region on the housing 111 that forms the front cavity 114, and the front cavity 114 is communicated with the outside world through the sound outlet 112.

In some embodiments, the front cavity 114 is set between a diaphragm of the transducer 116 and the housing 111. In order to ensure that the diaphragm has a sufficient vibration space, the front cavity 114 may have a large depth dimension (i.e., a distance dimension between the diaphragm of the transducer 116 and the housing 111 directly opposite to it). In some embodiments, as shown in FIG. 22, the sound outlet 112 is set on the inner side surface IS in the thickness direction Z. At this point, the depth of the front cavity 114 may refer to a dimension of the front cavity 114 in the Z-direction. However, too large the depth of the front cavity 114 may lead to an increase in the dimension of the sound production component 11 and affect the wearing comfort of the earphone 10. In some embodiments, the depth of the front cavity 114 may be in a range of 0.55 mm-1.00 mm. In some embodiments, the depth of the front cavity 114 may be in a range of 0.66 mm-0.99 mm. In some embodiments, the depth of the front cavity 114 may be in a range of 0.76 mm-0.99 mm. In some embodiments, the depth of the front cavity 114 may be in a range of 0.96 mm-0.99 mm. In some embodiments, the depth of the front cavity 114 may be 0.97 mm.

In order to improve the sound production effect of the earphone 10, a resonance frequency of a structure similar to a Helmholtz resonator formed by the front cavity 114 and the sound outlet 112 should be as high as possible, so that the overall frequency response curve of the sound production component has a wide flat region. In some embodiments, a resonance frequency $f_h$ of the front cavity 114 may be no less than 3 kHz. In some embodiments, the resonance frequency $f_b$ of the front cavity 114 may be no less than 4 kHz. In some embodiments, the resonance frequency $f_1$ of the front cavity 114 may be no less than 6 kHz. In some embodiments, the resonance frequency $f_h$ of the front cavity 114 may be no less than 7 kHz. In some embodiments, the resonance frequency $f_h$ of the front cavity 114 may be no less than 8 kHz.

Referring to FIG. 22, in some embodiments, a position corresponding to the first pressure relief hole 1131 and/or the second pressure relief hole 1132 may be provided with an acoustic resistance net 118, which may be used to adjust an amplitude at the resonance frequency of the rear cavity, and may also play a dustproof and waterproof role. In some embodiments, the position of the sound outlet 112 may also be provided with an acoustic resistance net 118, which may be used to adjust an amplitude of the corresponding resonance peak of the front cavity 114, and may also play a dustproof and waterproof role.

In some embodiments, the acoustic resistance net 118 may include a yarn mesh, a steel mesh, or a combination thereof. In some embodiments, an acoustic resistance rate provided in the front cavity 114 may be the same as an acoustic resistance rate provided in the rear cavity 116, i.e., the acoustic resistance net 118 provided at the sound outlet 112 may have the same acoustic resistance rate as the acoustic resistance net 118 provided at the at least one pressure relief hole (e.g., the first pressure relief hole 1131 and/or the second pressure relief hole 1132). For example, in order to facilitate structural assembly (e.g., to reduce material types and/or avoid mixing) and increase consistency in appearance, the same acoustic resistance net 118 may be provided at the sound outlet 112 and the at least one pressure relief hole. In some embodiments, the acoustic impedance rate of the acoustic resistance net 118 provided in the front cavity 114 may also be different from that of the acoustic resistance net 118 provided in the rear cavity 116, i.e., the acoustic impedance rate of the acoustic resistance net 118 provided at the sound outlet 112 may be different from that of the acoustic resistance net 118 provided at the at least one pressure relief hole. For example, a preset output effect may be achieved by setting the acoustic resistance nets 118 with different acoustic impedance rates at the front cavity 114 and the rear cavity 116 based on other parameters of the front cavity 114 and the rear cavity 116 (e.g., the area (or the area ratio) of the sound outlet 112 and/or the pressure relief hole(s), the depth of each hole, the aspect ratio, etc.). For example, by setting the acoustic resistance nets 118 with different acoustic impedance rates, the sound pressures at the sound outlet 112 and the pressure relief hole(s) are close to each other, so that the far-field leakage sound can be effectively reduced.

When the other parameters of the acoustic resistance net 118 are constant, the magnitude of its acoustic resistance is related to its thickness, and different thicknesses of the acoustic resistance nets have a certain effect on the acoustic output performance of the corresponding acoustic holes. Therefore, the thickness of the acoustic resistance net 118 is limited by a certain range. In some embodiments, the thickness of the acoustic resistance net 118 provided at the first pressure relief hole 1131 and/or the second pressure relief hole 1132 may be in a range of 35 μm to 300 μm. In some embodiments, the thicknesses of the acoustic resistance nets 118 provided at the first pressure relief hole 1131 and at the second pressure relief hole 1132 may be in a range of 40 μm-150 μm. In some embodiments, the thicknesses of the acoustic resistance nets 118 provided at the first pressure relief hole 1131 and at the second pressure relief hole 1132 may be in a range of 50 μm-65 μm. In some embodiments, the thicknesses of the acoustic resistance nets 118 provided at the first pressure relief hole 1131 and at the second pressure relief hole 1132 may be in a range of 55 μm-62 μm. On the other hand, the greater a distance between a side of the acoustic resistance net 118 toward the exterior of the housing 111 (i.e., an upper surface of the acoustic resistance net 118) and an outer surface of the housing 111 is, the closer the position of the corresponding acoustic resistance net 118 is set to the rear cavity, and the smaller the volume of the rear cavity is. In some embodiments, the distance between the upper surface of the acoustic resistance net 118 provided at the first pressure relief hole 1131 and the outer surface of the housing 1111 may be in a range of 0.8 mm-0.9 mm, and the distance between the upper surface of the acoustic resistance net 118 provided at the second pressure relief hole 1132 and the outer surface of the housing 1111 may be in a range of 0.7 mm-0.8 mm. In some embodiments, the distance between the upper surface of the acoustic resistance net 118 provided at the first pressure relief hole 1131 and the outer surface of the housing 1111 may be in a range of 0.82 mm-0.88 mm, and the distance between the upper surface of the acoustic resistance net 118 provided at the second pressure relief hole 1132 and the outer surface of the housing 1111 may be in a range of 0.72 mm-0.76 mm. In some embodiments, the distance between the upper surface of the acoustic resistance net 118 provided at the first pressure relief hole 1131 and the outer surface of the housing 1111 may be 0.86 mm, and the distance between the upper surface of the acoustic resistance net 118 provided at the second pressure relief hole 1132 and the outer surface of the housing 1111 may be 0.73 mm.

In some embodiments, mesh densities of different types of acoustic resistance nets 118 may also be different, resulting in different acoustic resistances of the corresponding acoustic holes and thus having an impact on the output of the corresponding acoustic cavities. Therefore, the composition and type of acoustic resistance net 118 needs to be designed. In some embodiments, in order to improve structural stability while protecting against water and dust, a steel mesh or a combination of a yarn mesh and a steel mesh may be used at the first pressure relief hole 1131, the second pressure relief hole 1132, and/or the sound outlet 112. In some embodiments, in order to improve the smoothness of the frequency response curve of the sound production component 11 while enabling the sound production component 11 to have a large output sound pressure, the acoustic resistance net 118 provided in the front cavity 114 may include a steel mesh (e.g., an etched steel mesh), and a mesh number of the steel mesh may be in a range of 60-100. In some embodiments, in order to further reduce the acoustic impedance rate of the acoustic resistance net 118 to increase the output sound pressure of the sound production component 11, the acoustic resistance net 118 provided in the front cavity 114 may include a steel mesh, and a mesh number of the steel mesh may be in a range of 70-90. In some embodiments, in order to improve the smoothness of the frequency response curve of the sound production component 11 while enabling the sound production component 11 to have a large output sound pressure, the acoustic resistance net 118 provided in the front cavity 114 may include a yarn mesh and a steel mesh (e.g., an etched steel mesh). The yarn mesh may have an acoustic resistance rate in a range of 2 MKS rayls-50 MKS rayls, and the steel mesh may have a mesh number in a range of 60-100. In some embodiments, in order to improve the smoothness of the frequency response curve of the sound production component 11 while enabling the sound production component 11 to have a large output sound pressure, the acoustic resistance net 118 provided in the front cavity 114 may include a yarn mesh and a steel mesh, the yarn mesh may have an acoustic resistance rate in a range of 5 MKS rayls-20 MKS rayls, and the steel mesh may have a mesh number in a range of 70-90. In some embodiments, in order to improve the smoothness of the frequency response curve of the sound production component 11 while enabling the sound production component 11 to have a large output sound pressure, the acoustic resistance net 118 provided in the front cavity 114 may include a yarn mesh and a steel mesh, the yarn mesh may have an acoustic impedance rate in a range of 6 MKS rayls-10 MKS rayls, and the steel mesh may have a mesh number in a range of 75-85. In some embodiments, when the acoustic resistance net 118 provided in the front cavity 114 includes a steel mesh (e.g., an etched steel mesh) or a combination of a yarn mesh and a steel mesh, the steel mesh may have an acoustic resistance rate in a range of 0.1 MKS rayls-10 MKS rayls. In some embodiments, the steel mesh may have an acoustic resistance rate in a range of 0.1 MKS rayls-5 MKS rayls. In some embodiments, the steel mesh may have an acoustic resistance rate in a range of 0.1 MKS rayls-3 MKS rayls.

Figure 23:
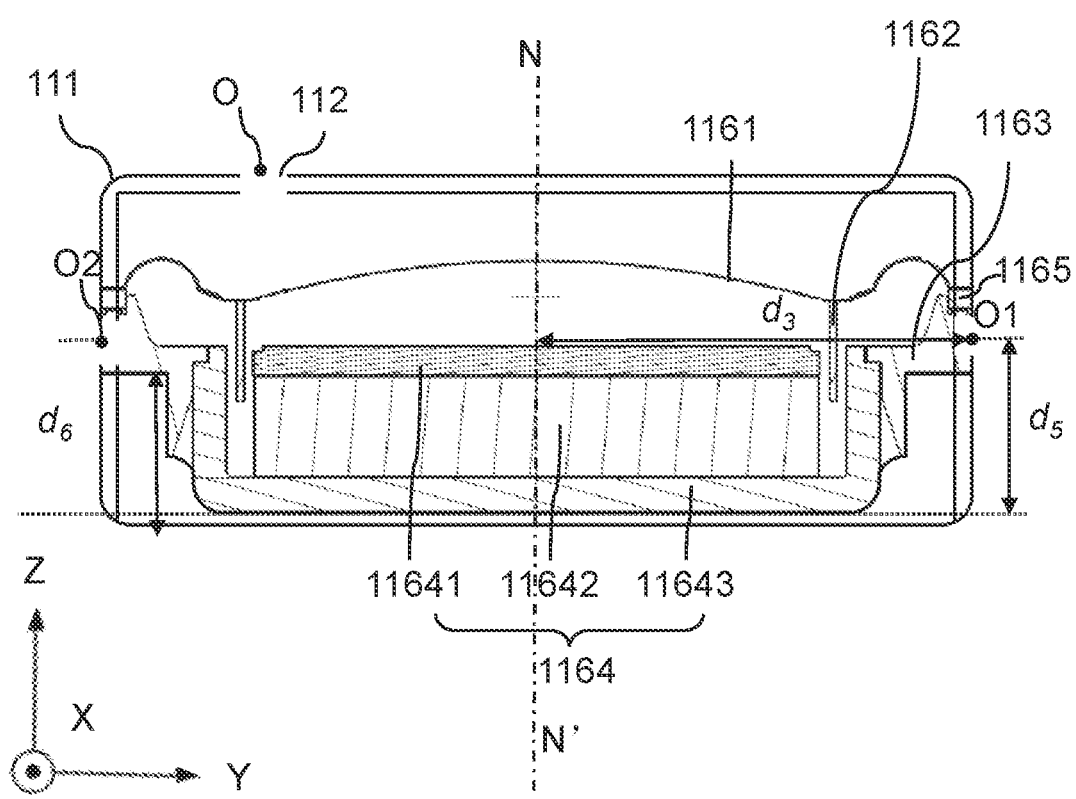
FIG. 23 is a diagram illustrating an exemplary internal structure of a transducer according to some embodiments of the present disclosure.

FIG. 23 is a diagram illustrating an exemplary internal structure of a transducer according to some embodiments of the present disclosure.

As shown in FIG. 23, the housing 111 accommodates the transducer 116. The transducer 116 includes a diaphragm 1161, a voice coil 1162, a cone holder 1163, and a magnetic circuit assembly 1164. The cone holder 1163 is provided around the diaphragm 1161, the voice coil 1162, and the magnetic circuit assembly 1164 to provide a fixing platform for mounting. The transducer 116 may be connected to the housing 111 through the cone holder 1163. The diaphragm 1161 covers the voice coil 1162 and the magnetic circuit assembly 1164 in the Z-direction, and the voice coil 1162 extends into the magnetic circuit assembly 1164 and is connected to the diaphragm 1161. A magnetic field generated after the voice coil 1162 is energized interacts with a magnetic field formed by the magnetic circuit assembly 1164, thereby driving the diaphragm 1161 to produce a mechanical vibration, which in turn produces sound through the dissertation of media such as air, and the sound is output through the sound outlet 112.

In some embodiments, the magnetic circuit assembly 1164 includes a magnetic conduction plate 11641, a magnet 11642, and an accommodation member 11643.

The magnetic conduction plate 11641 and the magnet 11642 are connected with each other. The magnet 11642 is mounted on a bottom wall of the accommodation member 11643 on a side away from the magnetic conduction plate 11641, and the magnet 11642 has a gap between a peripheral side of the magnet 11642 and an inner side wall of the accommodation member 11643. In some embodiments, an outer side wall of the accommodation member 11643 is connected and fixed to the cone holder 1163. In some embodiments, both the accommodation member 11643 and the magnetic conduction plate 11641 may be made of a magnetically conductive material (e.g., iron, etc.).

In some embodiments, a peripheral side of the diaphragm 1161 may be connected to the cone holder 1163 by a fixing ring 1165. In some embodiments, a material of the fixing ring 1165 may include a stainless-steel material or any other metal material to adapt to the processing and manufacturing process of the diaphragm 1161.

Referring to FIG. 22 and FIG. 23, in some embodiments, in order to improve the acoustic output (especially low frequency output) effect of the sound production component 11 and improve the ability of the diaphragm 1161 to push the air, a projection area of the diaphragm 1161 along the Z direction is as large as possible. However, too large the area of the diaphragm 1161 leads to too large a dimension of the transducer 116, which in turn causes too large the housing 111, thus easily causing the housing 111 to collide and rub against the ear, thereby affecting the wearing comfort of the sound production component 11. Therefore, the dimension of the housing 111 needs to be designed. Exemplarily, a short-axis dimension (also be referred to as a width dimension) of the housing 111 in the Y-direction may be determined based on a dimension (e.g., 17 mm) of the inferior concha along the Y-direction, and then a suitable length-to-short ratio (i.e. a ratio of the dimension of the housing 111 in the X-direction to a dimension of the housing 111 in the Y-direction) is selected according to the wearing comfort, so as to determine a long-axis dimension (also be referred to as a length dimension) (e.g. 21.49 mm) of the housing 111 in the X-direction to match the dimension of the inferior concha along the X-direction.

In some embodiments, in order to facilitate the wearing by most users (e.g., to enable most users to wear the earphone 10 with the sound production component 11 at least partially inserted into the inferior concha or against the antihelix region) to form a cavity structure with better acoustics, for example, such that the earphone 10 forms the first leaking structure UC and the second leaking structure LC between the earphone 10 and the user's ear when the earphone 10 is in the wearing state to improve the acoustic performance of the earphone, the dimension of the housing 111 may be in a preset range. In some embodiments, depending on a width dimension range of the inferior concha along the Y-direction, the width dimension of the housing 111 along the Y-direction may be in a range of 11 mm-16 mm. In some embodiments, the width dimension of the housing 111 along the Y-direction may be in a range of 11 mm-15 mm. In some embodiments, the width dimension of the housing 111 along the Y-direction may be in a range of 14 mm-15 mm. In some embodiments, a ratio of the dimension of the housing 111 along the X-direction to the dimension of the housing 111 along the Y-direction may be in a range of 1.2-5. In some embodiments, the ratio of the dimension of the housing 111 along the X-direction to the dimension of the housing 111 along the Y-direction may be in a range of 1.4-4. In some embodiments, the ratio of the dimension of the housing 111 along the X-direction to the dimension of the housing 111 along the Y-direction may be in a range of 1.5-2. In some embodiments, the length dimension of the housing 111 along the X-direction may be in a range of 15 mm-30 mm. In some embodiments, the length dimension of the housing 111 along the X-direction may be in a range of 16 mm-28 mm. In some embodiments, the length dimension of the housing 111 along the X-direction may be in a range of 19 mm-24 mm. In some embodiments, in order to avoid the large volume of the housing 111 affecting the wearing comfort of the earphone 10, a thickness dimension of the housing 111 along the Z-direction may be in a range of 5 mm-20 mm. In some embodiments, the thickness dimension of the housing 111 along the Z-direction may be in a range of 5.1 mm-18 mm. In some embodiments, the thickness dimension of the housing 111 along the Z-direction may be in a range of 6 mm-15 mm. In some embodiments, the thickness dimension of the housing 111 along the Z-direction may be in a range of 7 mm-10 mm. In some embodiments, an area of the inner surface IS of the housing 111 (in the case where the inner surface IS is rectangular, the area is equal to a product of the length dimension and the width dimension of the housing 111) may be 90 mm2-560 mm2. In some embodiments, the area of the inner side surface IS may be considered to approximate the projection area of the diaphragm 1161 along the Z-direction. For example, the area of the inner side surface IS may differ by 10% from the projection area of the diaphragm 1161 along the Z-direction. In some embodiments, the area of the inner side surface IS may be 150 mm2-360 mm2. In some embodiments, the area of the inner side surface IS may be 160 mm2-240 mm2. In some embodiments, the area of the inner side surface IS may be 180 mm2-200 mm2. Based on the principles described in FIG. 10 to FIG. 13, when the earphone 10 is in the wearing state in the manner shown in FIG. 14, on the basis that the dimension of the earphone 10 satisfies the wearing comfort, the acoustic performance of the earphone 10 is superior to the existing open earphones, that is, the dimension of the earphone 10 can be smaller than the existing open earphones while achieving the same excellent acoustic performance.

Referring to FIG. 22 and FIG. 23, in some embodiments, a distance from the center O of the sound outlet 112 along the Z-direction to a bottom surface of the magnetic circuit assembly 1164 may be related to a vibration range of the diaphragm 1161 and a thickness of the magnetic circuit assembly 1164. The vibration range of the diaphragm 1161 may affect the amount of air pushed by the transducer of the sound production component 11. The greater the vibration range of the diaphragm 1161 is, the greater the amount of air pushed by the transducer of the sound production component 11 is, and the higher the sound production efficiency of the sound production component is. The greater the thickness of the magnetic circuit assembly 1164 is, the greater the total weight of the sound production component 11 is, which affects the comfort of the user. In addition, when the thickness of the sound production component in the Z-direction is a constant, the smaller the distance from the center O of the sound outlet 112 along the Z-direction to the bottom surface of the magnetic circuit assembly 1164 is, the larger the volume of the rear cavity may be. At this time, the smaller the resonance frequency of the rear cavity is, the resonance peak of the rear cavity moves to lower frequency, and a smaller range of the flat region of the frequency response curve is. In order to ensure that the sound production efficiency of the sound production component is sufficiently high, that the resonance frequency of the rear cavity is in a suitable frequency range (e.g., 1000 Hz-5000 Hz), and that the user is comfortable enough to wear, considering the structural strength, the difficulty of process implementation, and the overall thickness of the housing 111, the distance from the center O of the sound outlet 112 along the Z-direction to the bottom surface of the magnetic circuit assembly 1164 (i.e., a side of the accommodation member 11643 along the Z-direction away from the sound outlet 112) is in a range of 5.65 mm to 8.35 mm. In some embodiments, the distance from the center of the sound outlet 112 along the Z-direction to the bottom surface of the magnetic circuit assembly 1164 is in a range of 6.00 mm to 8.00 mm. In some embodiments, the distance from the center of the sound outlet 112 along the Z-direction to the bottom surface of the magnetic circuit assembly 1164 is in a range of 6.35 mm to 7.65 mm. In some embodiments, the distance from the center of the sound outlet 112 along the Z-direction to the bottom surface of the magnetic circuit assembly 1164 is in a range of 6.70 mm to 7.30 mm. In some embodiments, the distance from the center of the sound outlet 112 along the Z-direction to the bottom surface of the magnetic circuit assembly 1164 is in a range of 6.95 mm to 7.05 mm.

In some embodiments, in order to increase the resonance frequency of the rear cavity while also having a large sound capacity Ca, the volume V of the rear cavity needs to have a suitable value range. In some embodiments, in order to make the volume of the rear cavity have an appropriate value range, a distance from the center O1 of the first pressure relief hole 1131 to the bottom surface of the magnetic circuit assembly 1164 may be reasonably designed. Referring to FIG. 22 and FIG. 23, when the thickness of the sound production component 11 in the Z direction is constant, the smaller the distance from the center O1 of the first pressure relief hole 1131 to the bottom surface of the magnetic circuit assembly 1164 along the Z direction is, the larger the volume of the rear cavity may be, at which time, the sound capacity Ca of the rear cavity increases, but the corresponding resonance frequency of the rear cavity decreases. In order to ensure that the sound production efficiency of the sound production component 11 is sufficiently high, the resonance frequency of the rear cavity is in a suitable frequency range (e.g., 2000 Hz-6000 Hz), and the user is comfortable enough to wear it, taking into account the structural strength, the difficulty of process realization, and the overall thickness of the housing 111, a distance $d_5$ from the center O1 of the first pressure relief hole 1131 to the bottom surface of the magnetic circuit assembly 1164 (i.e., a side surface of the accommodation member 11643 away from the sound outlet 112 along the Z-direction) along the Z-direction is in a range of 1.31 mm to 1.98 mm. In some embodiments, the distance $d_5$ from the center O1 of the first pressure relief hole 1131 to the bottom surface of the magnetic circuit assembly 1164 along the Z-direction is in a range of 1.31 mm to 1.98 mm. In some embodiments, the distance $d_5$ from the center O1 of the first pressure relief hole 1131 to the bottom surface of the magnetic circuit assembly 1164 along the Z-direction is in a range of 1.41 mm to 1.88 mm. In some embodiments, the distance $d_5$ from the center O1 of the first pressure relief hole 1131 to the bottom surface of the magnetic circuit assembly 1164 along the Z-direction is in a range of 1.51 mm to 1.78 mm. In some embodiments, the distance $d_5$ from the center O1 of the first pressure relief hole 1131 to the bottom surface of the magnetic circuit assembly 1164 along the Z-direction is in a range of 1.56 mm to 1.72 mm. Similarly, in some embodiments, a distance de from the center O2 of the second pressure relief hole 1132 to the bottom surface of the magnetic circuit assembly 1164 along the Z-direction is in a range of 1.31 mm to 1.98 mm. In some embodiments, the distance de from the center O2 of the second pressure relief hole 1132 to the bottom surface of the magnetic circuit assembly 1164 along the Z-direction is in a range of 1.41 mm to 1.88 mm. In some embodiments, the distance de from the center O2 of the second pressure relief hole 1132 to the bottom surface of the magnetic circuit assembly 1164 along the Z-direction is in a range of 1.51 mm to 1.78 mm. In some embodiments, the distance de from the center O2 of the second pressure relief hole 1132 to the bottom surface of the magnetic circuit assembly 1164 along the Z-direction is in a range of 1.56 mm to 1.72 mm.

In some embodiments, with a certain thickness of the sound production component, a difference between the distance from the center O of the sound outlet 112 to the bottom surface of the magnetic circuit assembly 1164 along the Z-direction and the distance from the center O1 of the first pressure relief hole 1131 to the bottom surface of the magnetic circuit assembly 1164 along the Z-direction should not be too large or too small. If it is too large, the volume of the front cavity can be too large, resulting in a smaller resonance frequency of the front cavity; if it is too small, the volume of the front cavity can be too small, resulting in a smaller vibration range of the diaphragm 1161 and affecting the amount of air pushed by the transducer of the sound production component 11, thereby affecting the sound production efficiency of the sound production component 11. In some embodiments, in order to ensure that the sound production efficiency of the sound production component 11 is sufficiently high, the resonance frequency of the rear cavity is in an appropriate frequency range (e.g., 2000 Hz-6000 Hz), and the user is comfortable enough to wear, a distance between the first pressure relief hole 1131 or the second pressure relief hole 1132 and the sound outlet 112 in the Z direction may be limited to achieve a better radio effect of the sound outlet 112 at the ear canal while the sound leakage cancellation effect is good. In some embodiments, a difference between the distance between the center O of the sound outlet 112 and the bottom surface of the magnetic circuit assembly 1164 along the Z-direction and the distance between the center O1 of the first pressure relief hole 1131 and the bottom surface of the magnetic circuit assembly 1164 along the Z-direction is in a range of 3.65 mm to 7.05 mm. In some embodiments, the difference between the distance between the center O of the sound outlet 112 and the bottom surface of the magnetic circuit assembly 1164 along the Z-direction and the distance between the center O1 of the first pressure relief hole 1131 and the bottom surface of the magnetic circuit assembly 1164 along the Z-direction is in a range of 4.00 mm to 6.85 mm. In some embodiments, the difference between the distance between the center O of the sound outlet 112 and the bottom surface of the magnetic circuit assembly 1164 along the Z-direction and the distance between the center O1 of the first pressure relief hole 1131 and the bottom surface of the magnetic circuit assembly 1164 along the Z-direction is in a range of 4.80 mm to 5.50 mm. In some embodiments, the difference between the distance between the center O of the sound outlet 112 and the bottom surface of the magnetic circuit assembly 1164 along the Z-direction and the distance between the center O1 of the first pressure relief hole 1131 and the bottom surface of the magnetic circuit assembly 1164 along the Z-direction is in a range of 5.20 mm to 5.55 mm.

In some embodiments, a distance between the center O1 of the first pressure relief hole 1131 and the bottom surface of the magnetic circuit assembly 1164 along the Z-direction may be the same as a distance between the center O2 of the second pressure relief hole 1132 and the bottom surface of the magnetic circuit assembly 1164 along the Z-direction. In some embodiments, in order to weaken the cancellation effect between the sound emitted by the second pressure relief hole 1132 at the ear canal (i.e., the listening position) with the sound emitted by the sound outlet 112, so as to increase the listening volume, the second pressure relief hole 1132 may be farther away from the sound outlet 112 in the Z-direction relative to the first pressure relief hole 1131. For example, when the difference between the distance between the center O of the sound outlet 112 and the bottom surface of the magnetic circuit assembly 1164 along the Z-direction and the distance between the center O1 of the first pressure relief hole 1131 and the bottom surface of the magnetic circuit assembly 1164 along the Z-direction is in a range of 3.67 mm to 5.57 mm, a difference between the distance between the center O of the sound outlet 112 and the bottom surface of the magnetic circuit assembly 1164 along the Z-direction and the distance between the center O2 of the second pressure relief hole 1132 and the bottom surface of the magnetic circuit assembly 1164 along the Z-direction is in a range of 5.57 mm to 7.04 mm.

In some embodiments, a distance between the center O of the sound outlet 112 and a long-axis center plane of the magnetic circuit assembly 1164 (e.g., a plane NN' perpendicular to an inward surface of the paper as shown in FIG. 23) is in a range of 1.45 mm to 2.15 mm. In the present disclosure, the long-axis center plane of the magnetic circuit assembly 1164 is a plane parallel to the lower side surface LS of the sound production component 11 and passing through the geometric center of the magnetic circuit assembly 1164. In other words, the long-axis center plane of the magnetic circuit assembly 1164 may divide the magnetic circuit assembly 1164 into two identical parts along the X-direction. The distance from the center O of the sound outlet 112 to the long-axis center plane of the magnetic circuit assembly 1164 is also a distance from the center O of the sound outlet 112 along the short-axis direction Y to the long-axis center plane. In some embodiments, the distance from the center O of the sound outlet 112 to the long-axis center plane is in a range of 1.55 mm to 2.05 mm. In some embodiments, the distance from the center O of the sound outlet 112 to the long-axis center plane is in a range of 1.65 mm to 1.95 mm. In some embodiments, the distance from the center O of the sound outlet 112 to the long-axis center plane is in a range of 1.75 mm to 1.85 mm.

In some embodiments, in order to adapt the dimension of the sound production component 11 to the dimension of the inferior concha, the dimension of the sound production component 11 along the Y-direction may be limited. In some embodiments, the dimension of the sound production component 11 along the Y-direction may be determined by the distance between the center O1 of the first pressure relief hole 1131 and the long-axis center plane of the magnetic circuit assembly 1164 (e.g., the plane NN' perpendicular to an inward surface of the paper as shown in FIG. 23). In some embodiments, the distance between the center O1 of the first pressure relief hole 1131 and the long-axis center plane of the magnetic circuit assembly 1164 (e.g., the plane NN' perpendicular to an inward surface of the paper as shown in FIG. 23) may be limited for design purposes. In some embodiments, the distance between the center O1 of the first pressure relief hole 1131 and the long-axis center plane of the magnetic circuit assembly 1164 is in a range of 5.45 mm to 8.19 mm. In the present disclosure, the long-axis center plane of the magnetic circuit assembly 1164 is a plane parallel to the lower side surface LS of the sound production component 11 and passing through the centroid of the magnetic circuit assembly 1164. That is, the long-axis center plane of the magnetic circuit assembly 1164 may divide the magnetic circuit assembly 1164 into two identical parts along the X-direction. The distance between the center O1 of the first pressure relief hole 1131 and the long-axis center plane of the magnetic circuit assembly 1164 is also a distance between the center O1 of the first pressure relief hole 1131 and the long-axis center plane along the short-axis direction Y. In some embodiments, the distance between the center O1 of the first pressure relief hole 1131 and the long-axis center plane of the magnetic circuit assembly 1164 is in a range of 5.95 mm to 8.69 mm. In some embodiments, the distance between the center O1 of the first pressure relief hole 1131 and the long-axis center plane of the magnetic circuit assembly 1164 is in a range of 6.45 mm to 7.19 mm. In some embodiments, the distance between the center O1 of the first pressure relief hole 1131 and the long-axis center plane of the magnetic circuit assembly 1164 is in a range of 6.65 mm to 6.99 mm. Similarly, in some embodiments, a distance between the center O2 of the second pressure relief hole 1132 and the long-axis center plane of the magnetic circuit assembly 1164 is in a range of 5.46 mm to 8.20 mm. In some embodiments, the distance between the center O2 of the second pressure relief hole 1132 and the long-axis center plane of the magnetic circuit assembly 1164 is in a range of 5.96 mm to 8.70 mm. In some embodiments, the distance between the center O2 of the second pressure relief hole 1132 and the long-axis center plane of the magnetic circuit assembly 1164 is in a range of 6.46 mm to 7.20 mm. In some embodiments, the distance between the center O2 of the second pressure relief hole 1132 and the long-axis center plane of the magnetic circuit assembly 1164 is in a range of 6.66 mm to 7.00 mm.

In some embodiments, in order to make the sound outlet 112 close to the ear canal, the sound outlet 112 may be close to the second pressure relief hole 1132 in the Y-direction compared to the first pressure relief hole 1131. By limiting the distance between the first pressure relief hole 1131 or the second pressure relief hole 1132 and the sound outlet 112 in the Y direction, it is possible to achieve a better radio effect of the sound outlet 112 at the ear canal while the far-field sound leakage cancellation is good. In some embodiments, an absolute value of a difference between the distance between the center O of the sound outlet 112 and the long-axis center plane of the magnetic circuit assembly 1164 along the Y-direction and the distance between the center O1 of the first pressure relief hole 1131 and the long-axis center plane along the Y-direction is in a range of 4.0 mm to 6.1 mm. In some embodiments, the absolute value of the difference between the distance between the center O of the sound outlet 112 and the long-axis center plane and the distance between the center O1 of the first pressure relief hole 1131 and the long-axis center plane is in a range of 4.5 mm to 5.5 mm. In some embodiments, the absolute value of the difference between the distance between the center O of the sound outlet 112 and the long-axis center plane and the distance between the center O1 of the first pressure relief hole 1131 and the long-axis center plane is in a range of 4.8 mm to 5.2 mm.

In some embodiments, due to the presence of the pressure relief holes 113 (e.g., the first pressure relief hole 1131 and the second pressure relief hole 1132), the pressure in the rear cavity at a position close to the pressure relief hole 113 is similar to the outside pressure, and a pressure at a position away from the pressure relief hole 113 is higher than the outside pressure. Since the cone holder 1163 is provided with a sound transmission hole (not shown) connecting the rear side of the diaphragm 1161 to the cavity 115, in order to balance the pressure between the rear side of the diaphragm 1161 and the cavity 115, the sound transmission hole on the cone holder may be provided asymmetrically, so as to better balance the airflow. Specifically, at a position farther from the first pressure relief hole 1131 and/or the second pressure relief hole 1132, since the pressure is high, a dimension of the sound transmission hole may be large; and at a position closer to the first pressure relief hole 1131 and/or the second pressure relief hole 1132, since the pressure is low, the dimension of the sound transmission hole may be small. In some embodiments, by adjusting the dimensions (e.g., areas) of the first pressure relief hole 1131, the second pressure relief hole 1132, and/or the sound transmission hole, the vibration of the low frequency of the earphone 10 can smoother. In some embodiments, in order to smooth the pressure in the rear cavity and thus smooth the vibration of the diaphragm, the first pressure relief hole 1131 and the second pressure relief hole 1132 may be set staggered in the X direction. In this case, the projections of the first pressure relief hole 1131 and the second pressure relief hole 1132 on the long-axis center plane are partially overlapped or not overlapped. In some embodiments, an overlapping area of the projection of the first pressure relief hole 1131 and the projection of the second pressure relief hole 1132 on the long-axis center plane is not greater than 10.77 $mm^2$. In some embodiments, the overlapping area of the projection of the first pressure relief hole 1131 and the projection of the second pressure relief hole 1132 on the long-axis center plane is not greater than 6.77 $mm^2$. In some embodiments, the overlapping area of the projection of the first pressure relief hole 1131 and the projection of the second pressure relief hole 1132 on the long-axis center plane is not greater than 4.77 $mm^2$. In some embodiments, the overlapping area of the projection of the first pressure relief hole 1131 and the projection of the second pressure relief hole 1132 on the long-axis center plane is not greater than 2.77 $mm^2$.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

The specific embodiments described in the present disclosure are only exemplary, and one or more technical features in the specific embodiments are optional or additional, and do not constitute the necessary technical features of the inventive concept of the present disclosure. In other words, the scope of protection of the present disclosure covers and is far greater than the specific embodiments.

What is claimed is:

1. An earphone, comprising:
    a sound production component including:
        a transducer including a diaphragm used to produce a sound under an action of an excitation signal; and
        a housing, the housing forming a cavity used to accommodate the transducer; and
    a suspension structure, wherein in a wearing state, the suspension structure is used to place the sound production component at a position near but not blocking an ear canal, wherein
    an inner side surface of the housing facing an auricle is provided with a sound outlet that is configured to transmit a sound generated at a front side of the diaphragm to the ear canal,
    at least another side surface of the housing is provided with a first pressure relief hole that is configured to guide a sound generated at a rear side of the diaphragm out of the housing, and
    a distance between a center of the sound outlet and a midpoint of an upper boundary of the inner side surface is greater than a distance between a center of the first pressure relief hole and the midpoint of the upper boundary of the inner side surface.

2. The earphone of claim 1, wherein a ratio of the distance between the center of the sound outlet and the midpoint of the upper boundary of the inner side surface to the distance between the center of the first pressure relief hole and the midpoint of the upper boundary of the inner side surface is in a range of 1.3 to 2.1.

3. The earphone of claim 1, wherein a ratio of a ratio of an area of the sound outlet to a depth of the sound outlet to a ratio of an area of the first pressure relief hole to a depth of the first pressure relief hole is in a range of 1.10 to 1.75.

4. The earphone of claim 1, wherein a ratio of an area of the sound outlet to an area of the first pressure relief hole is in a range of 0.5 to 1.5.

5. The earphone of claim 1, wherein in the wearing state, a ratio of a distance between a projection point of the center of the sound outlet on a sagittal plane and a centroid of a projection of an ear canal opening of the ear canal on the sagittal plane to a distance between a projection point of the center of the first pressure relief hole on the sagittal plane and the centroid of the projection of the ear canal opening on the sagittal plane is in a range of 0.10-0.35.

6. The earphone of claim 1, wherein the suspension structure includes an ear hook, in the wearing state,
- a first portion of the ear hook is hung between an ear and a head of a user,
- a second portion of the ear hook extends towards a side of the auricle away from the head and connects to the sound production component, and
- a ratio of a distance between the center of the sound outlet and an upper vertex of the ear hook to a distance between the center of the first pressure relief hole and the upper vertex of the ear hook is in a range of 1.10 to 1.70.

7. The earphone of claim 1, wherein the transducer further includes a magnetic circuit assembly, the magnetic circuit assembly is used to provide a magnetic field, and an absolute value of a difference between a distance between the center of the sound outlet and a long-axis center plane of the magnetic circuit assembly and a distance between the center of the first pressure relief hole and the long-axis center plane is in a range of 4.0 mm to 6.1 mm.

8. The earphone of claim 7, wherein a difference between a distance between the center of the sound outlet and a bottom surface of the magnetic circuit assembly and a distance between the center of the first pressure relief hole and the bottom surface of the magnetic circuit assembly is in a range of 3.65 mm to 7.05 mm.

9. The earphone of claim 1, wherein the at least another side surface of the housing is further provided with a second pressure relief hole, and an area of the first pressure relief hole is larger than an area of the second pressure relief hole.

10. The earphone of claim 9, wherein a distance from the center of the sound outlet to a perpendicular bisection-plane of a line segment connecting the center of the first pressure relief hole and a center of the second pressure relief hole is in a range of 0 mm-2 mm.

11. The earphone of claim 10, wherein the first pressure relief hole is provided on an upper side surface of the housing and the second pressure relief hole is provided on a lower side surface of the housing.

12. The earphone of claim 9, wherein, in the wearing state, a ratio of a distance between a projection point of the center of the sound outlet on a sagittal plane and a projection point of a ⅓ point of an lower boundary of the inner side surface on the sagittal plane to a distance between a projection point of the center of the second pressure relief hole on the sagittal plane and the projection point of the ⅓ point of the lower boundary of the inner side surface on the sagittal plane is in a range of 0.65-1.05.

13. The earphone of claim 9, wherein an angle between a line connecting the center of the sound outlet to the center of the first pressure relief hole and a line connecting the center of the sound outlet to the center of the second pressure relief hole is in a range of 46.40° to 114.04°.

14. The earphone of claim 9, wherein a ratio of a distance between the center of the sound outlet and the center of the first pressure relief hole to a distance between the center of the sound outlet and the center of the second pressure relief hole is in a range of 0.9 to 1.1.

15. The earphone of claim 9, wherein a ratio of the area of the sound outlet to a total area of the first pressure relief hole and the second pressure relief hole is in a range of 0.1 to 0.99.

16. The earphone of claim 15, wherein the diaphragm divides the cavity into a front cavity and a rear cavity corresponding to the front side and the rear side of the diaphragm, respectively, wherein a ratio of a resonance frequency of the front cavity to a resonance frequency of the rear cavity is in a range of 0.1 to 5.

17. The earphone of claim 9, wherein a ratio of the area of the sound outlet to a total area of the first pressure relief hole and the second pressure relief hole is in a range of 1 to 10.

18. The earphone of claim 17, wherein the diaphragm divides the cavity into a front cavity and a rear cavity corresponding to the front side and the rear side of the diaphragm, respectively, wherein a ratio of a resonance frequency of the front cavity to a resonance frequency of the rear cavity is in a range of 0.5 to 10.

19. The earphone of claim 9, wherein a ratio of a sound pressure at the sound outlet to a total sound pressure at the first pressure relief hole and at the second pressure relief hole is in a range of 0.4 to 0.6.

20. The earphone of claim 9, wherein a ratio of a difference between the area of the first pressure relief hole and the area of the second pressure relief hole to the area of the sound outlet is in a range of 2.5 to 3.9.

* * * * *